(12) United States Patent
Janssen et al.

(10) Patent No.: US 6,427,504 B1
(45) Date of Patent: *Aug. 6, 2002

(54) KEY ASSEMBLY FOR VEHICLE IGNITION LOCKS

(75) Inventors: David C. Janssen, Whitefish Bay; Ronald J. McGuire, Pewaukee; William P. Schuster, Germantown, all of WI (US)

(73) Assignee: Strattec Security Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/014,311

(22) Filed: Jan. 27, 1998

Related U.S. Application Data

(63) Continuation-in-part of application No. 08/503,429, filed on Jul. 17, 1995, now Pat. No. 6,035,677, which is a continuation-in-part of application No. 08/112,094, filed on Aug. 26, 1993, now Pat. No. 5,433,096.

(51) Int. Cl.[7] ............................................. E05B 19/04
(52) U.S. Cl. ........................ 70/278.3; 70/395; 70/408; 70/413
(58) Field of Search ................... 70/408, 278.1, 70/278.2, 278.3, 278.4, 278.5, 278.6, 278.7, 395, 413, 276, 277, 279–283, 279.1, 283.1

(56) References Cited

U.S. PATENT DOCUMENTS

| 917,894 | A | 4/1909 | Pusterla | 70/408 |
| 3,347,072 | A | 10/1967 | Rose | |
| 3,392,559 | A | 7/1968 | Hedin et al. | |
| 3,579,183 | A | 5/1971 | Lipschutz | 340/52 |
| 3,660,624 | A | 5/1972 | Bell | 200/44 |
| 3,689,885 | A | 9/1972 | Kaplan et al. | 340/152 T |
| 3,732,465 | A | 5/1973 | Palmer | 317/134 |

(List continued on next page.)

FOREIGN PATENT DOCUMENTS

| DE | 2614310 | 10/1977 | 70/408 |
| EP | 0351183 | 1/1990 | 70/277 |
| EP | 0401541 | 12/1990 | |
| EP | 559160 | 9/1993 | |
| EP | 648589 | 4/1995 | |
| EP | 0713944 A1 | 5/1996 | |
| FR | 2411290 | 8/1979 | 70/408 |
| GB | 2039321 | 8/1980 | 70/408 |
| GB | 2155988 | 10/1985 | 70/395 |
| GB | 2158870 A | 11/1985 | |
| GB | 2187227 | 9/1987 | |
| JP | 2-20780 | 1/1990 | |
| JP | 4011179 | 1/1992 | 70/395 |
| JP | 4038382 | 2/1992 | 70/395 |
| JP | 4080482 | 3/1992 | 70/277 |
| JP | 4093481 | 3/1992 | 70/277 |
| JP | 60-199622 | 10/1998 | |
| WO | WO88/00635 | 1/1988 | |
| WO | WO95/32348 | 11/1995 | |

*Primary Examiner*—Lloyd A. Gall
(74) *Attorney, Agent, or Firm*—Michael Best & Friedrich LLP

(57) ABSTRACT

A method of decreasing resonant frequency shifting of an electrical circuit mounted on a vehicle key includes providing a frame in an opening in the head portion of a vehicle key and locating the transponder in the frame. The frame comprises substantially rigid non-metallic material, and the frame includes a support structure for supporting the transponder while decreasing forces produced on the transponder by thermal expansion and contraction of the head portion of the key, thereby decreasing shift in the resonance of the electrical circuit of the transponder. The frame, the transponder and the head portion of the key are overmolded providing an outer covering that encloses and protects the transponder.

18 Claims, 34 Drawing Sheets

U.S. PATENT DOCUMENTS

| | | | |
|---|---|---|---|
| 3,752,960 A | 8/1973 | Walton | 235/61.11 H |
| 3,786,659 A | 1/1974 | Elder et al. | 70/395 |
| 3,859,624 A | 1/1975 | Kriofsky et al. | 340/38 L |
| 3,883,629 A | 5/1975 | Garner et al. | 294/55 |
| 3,964,024 A | 6/1976 | Hutton et al. | 340/152 J |
| 4,142,674 A | 3/1979 | Walton | 235/492 |
| 4,176,782 A | 12/1979 | Fukuda et al. | 235/449 |
| 4,189,712 A | 2/1980 | Lemelson | 340/149 A |
| 4,192,400 A | 3/1980 | McEwan | 180/287 |
| 4,200,227 A | 4/1980 | Lemelson | 235/382 |
| 4,250,533 A | 2/1981 | Nelson | 361/172 |
| 4,262,632 A | 4/1981 | Hanton et al. | 119/1 |
| 4,267,494 A | 5/1981 | Matsuoka et al. | 318/568 |
| 4,291,237 A | 9/1981 | Kitano | 307/10 AT |
| 4,297,569 A | 10/1981 | Flies | 235/443 |
| 4,298,792 A | 11/1981 | Granholm et al. | 235/375 |
| 4,326,125 A | 4/1982 | Flies | 235/443 |
| 4,327,353 A | 4/1982 | Beard et al. | 340/64 |
| 4,337,462 A | 6/1982 | Lemelson | 340/572 |
| 4,361,153 A | 11/1982 | Slocum et al. | 128/419 R |
| 4,366,466 A | 12/1982 | Lutz | 340/64 |
| 4,415,893 A | 11/1983 | Roland et al. | 340/825.31 |
| 4,420,794 A | 12/1983 | Anderson | 361/419 |
| 4,435,649 A | 3/1984 | Vandigriff | 307/10 AT |
| 4,438,426 A | 3/1984 | Adkins | 340/64 |
| 4,471,343 A | 9/1984 | Lemelson | 340/571 |
| 4,532,932 A | 8/1985 | Batty, Jr. | 128/631 |
| 4,603,563 A | 8/1986 | Mochida et al. | 70/276 |
| 4,663,952 A | 5/1987 | Gelhard | 70/278 |
| 4,712,398 A | 12/1987 | Clarkson et al. | 70/276 |
| 4,726,205 A | 2/1988 | Allerdist et al. | 70/408 X |
| 4,738,334 A | 4/1988 | Weishaupt | 180/287 |
| 4,748,834 A | 6/1988 | Herriott | 70/413 |
| 4,848,115 A | 7/1989 | Clarkson et al. | 70/276 |
| 4,868,409 A | 9/1989 | Tanaka et al. | 307/10.5 |
| 4,922,736 A | 5/1990 | Tanaka et al. | 70/395 X |
| 4,936,896 A | 6/1990 | Takatsuka | 70/413 X |
| 4,947,662 A | 8/1990 | Imedio | 70/395 |
| 4,998,952 A | 3/1991 | Hyatt, Jr. et al. | 70/395 |
| 5,003,801 A | 4/1991 | Stinar et al. | 70/278 |
| 5,005,393 A | 4/1991 | Ewalds et al. | 70/277 |
| 5,012,236 A | 4/1991 | Troyk et al. | 340/825.54 |
| 5,029,459 A | 7/1991 | Almblad | 70/408 X |
| 5,038,590 A | 8/1991 | Sawyer et al. | 70/408 X |
| 5,084,699 A | 1/1992 | DeMichele | 340/825.54 |
| 5,095,309 A | 3/1992 | Troyk et al. | 340/825.54 |
| 5,111,199 A | 5/1992 | Tomoda et al. | 340/825.72 |
| 5,117,097 A | 5/1992 | Kimura et al. | 70/278 X |
| 5,121,102 A | 6/1992 | Stricklin, Jr. | 340/521 |
| 5,195,341 A | 3/1993 | Nieuwkoop | 70/278 |
| 5,307,658 A | 5/1994 | Kokubu et al. | 70/427 |
| 5,311,757 A | 5/1994 | Spahn | 70/408 |
| 5,337,588 A | 8/1994 | Chhatwal | 70/408 X |
| 5,351,042 A | 9/1994 | Aston | 340/825.31 |
| 5,433,096 A | 7/1995 | Janssen et al. | 70/408 X |
| 5,592,169 A | 1/1997 | Nakamura et al. | 341/173 |
| 5,632,168 A | 5/1997 | Yano | 70/278 |
| 5,727,408 A | 3/1998 | Mizuno et al. | 70/408 X |
| 5,732,579 A * | 3/1998 | D'Hout et al. | 70/408 X |
| 5,768,925 A * | 6/1998 | Ozawa et al. | 70/408 |
| 5,775,148 A * | 7/1998 | Layton et al. | 70/408 |
| 5,819,564 A * | 10/1998 | Watanuki | 70/408 X |
| 5,974,844 A * | 11/1999 | Harrelson et al. | 70/408 |
| 6,035,677 A * | 3/2000 | Janssen et al. | 70/408 X |
| 6,164,101 A | 12/2000 | Kito et al. | 70/278.3 |
| 6,308,542 B1 | 10/2001 | Bolton | 70/408 |

\* cited by examiner

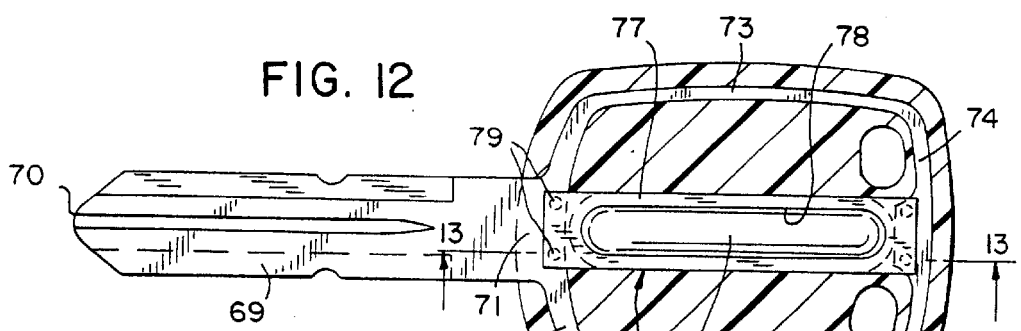
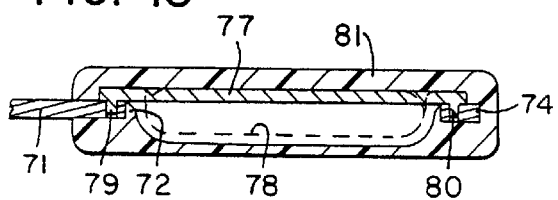
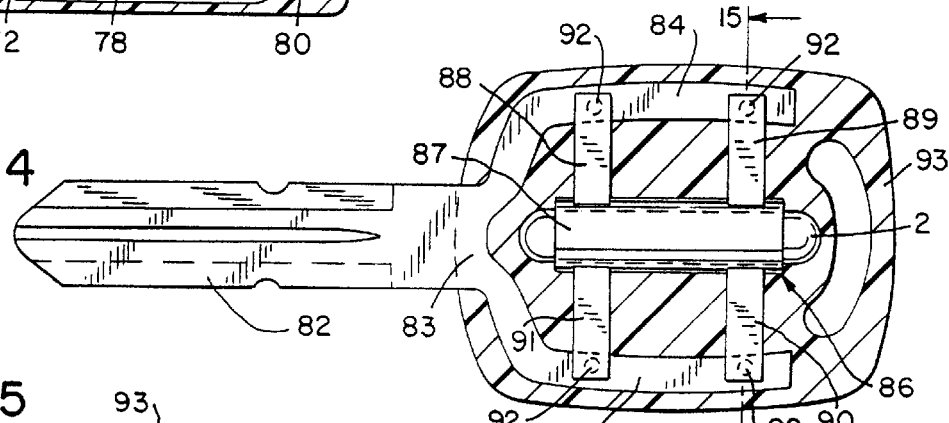
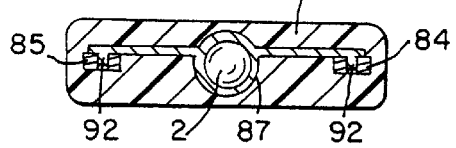
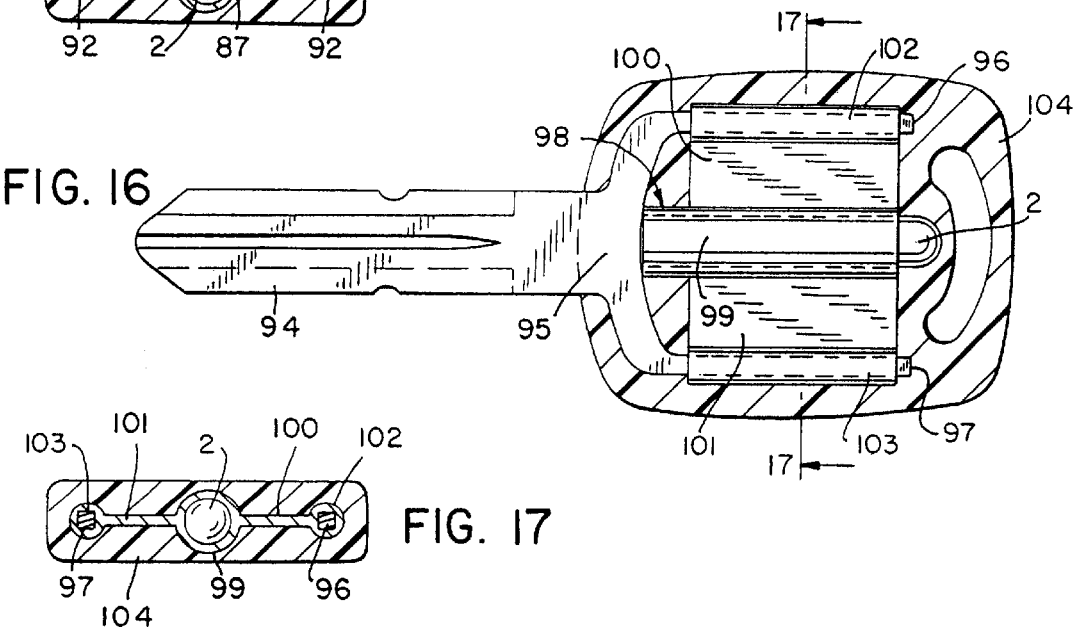

FIG. 18
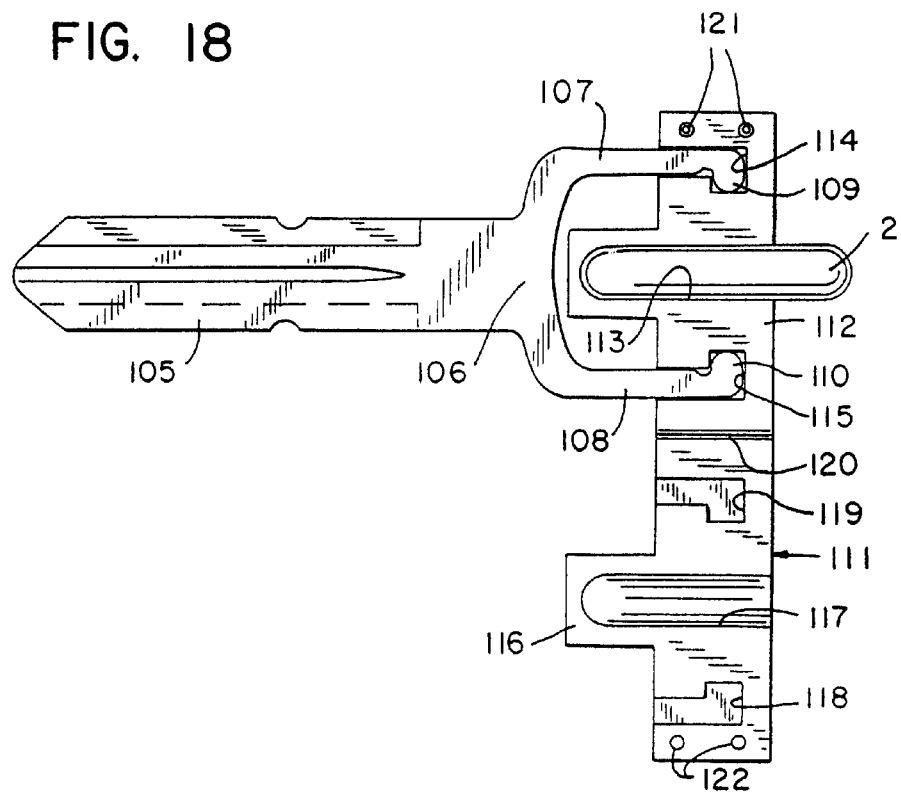
FIG. 19
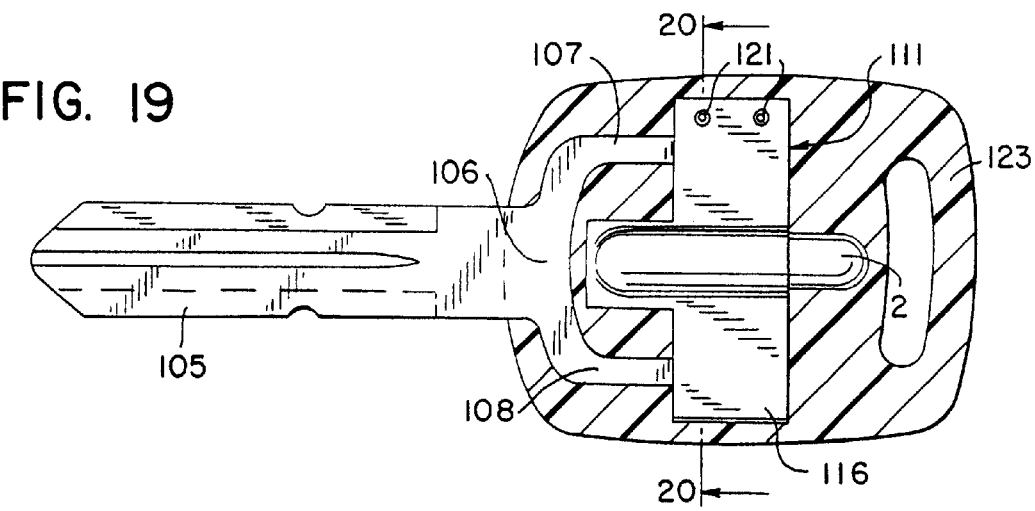
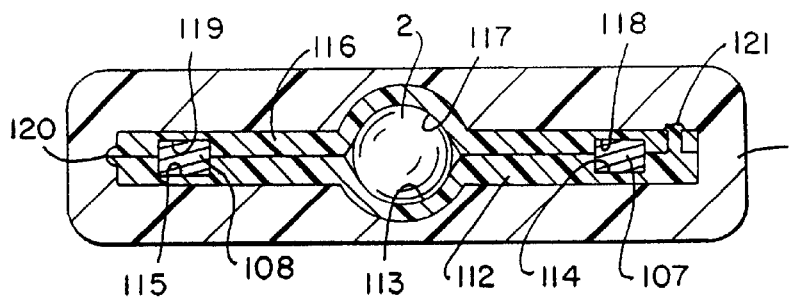
FIG. 20

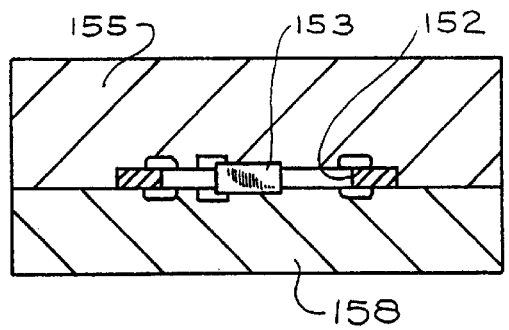
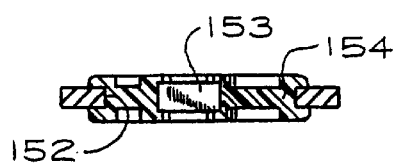
Fig. 33  Fig. 34
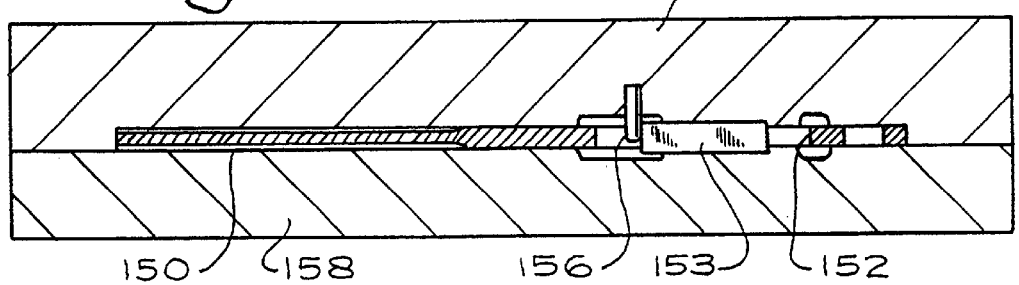
Fig. 35
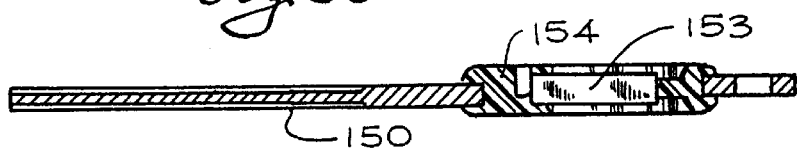
Fig. 36
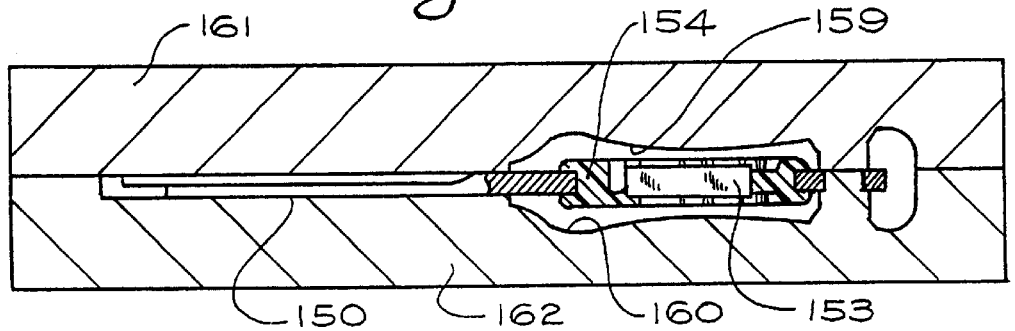
Fig. 37
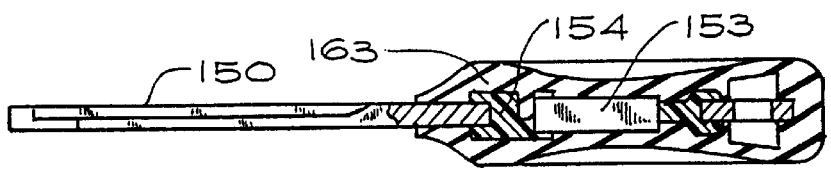
Fig. 38

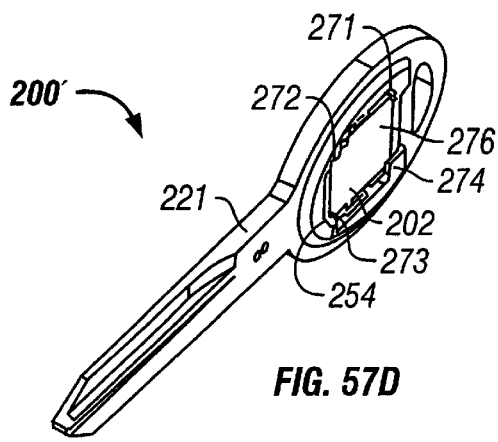
FIG. 57D
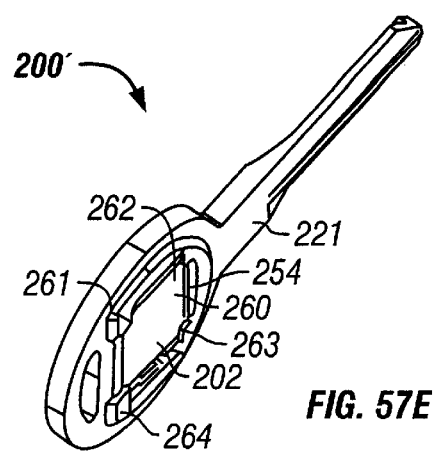
FIG. 57E
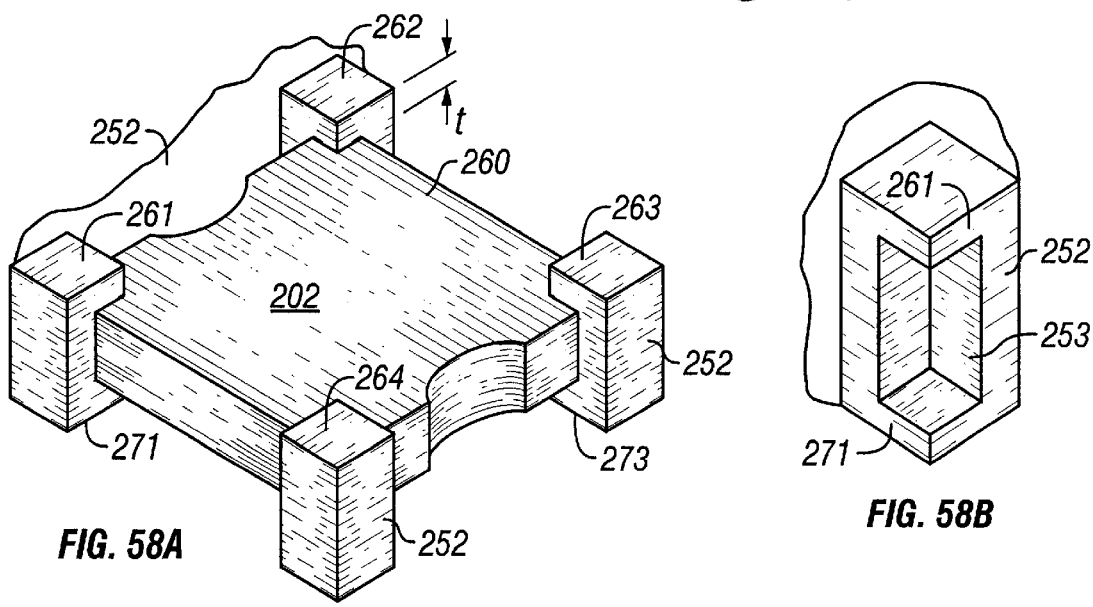
FIG. 58A
FIG. 58B
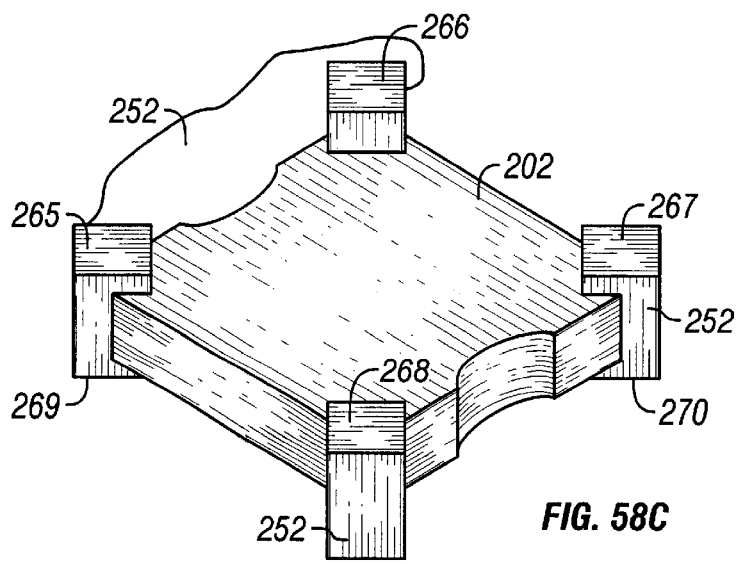
FIG. 58C

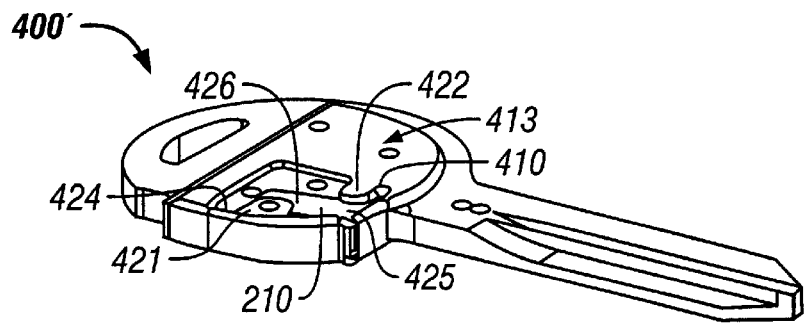
FIG. 62E
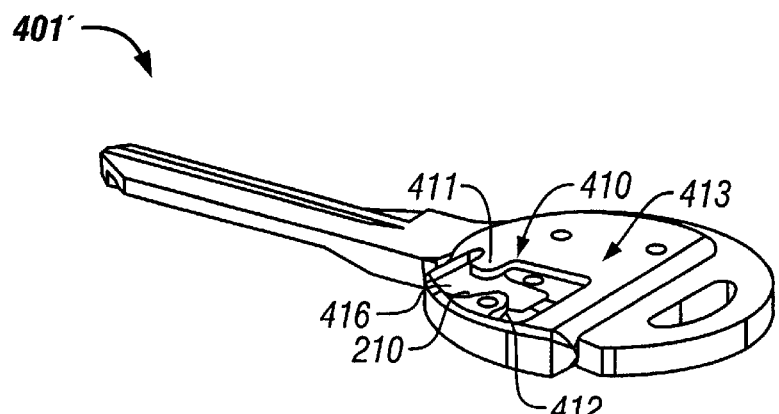
FIG. 62F
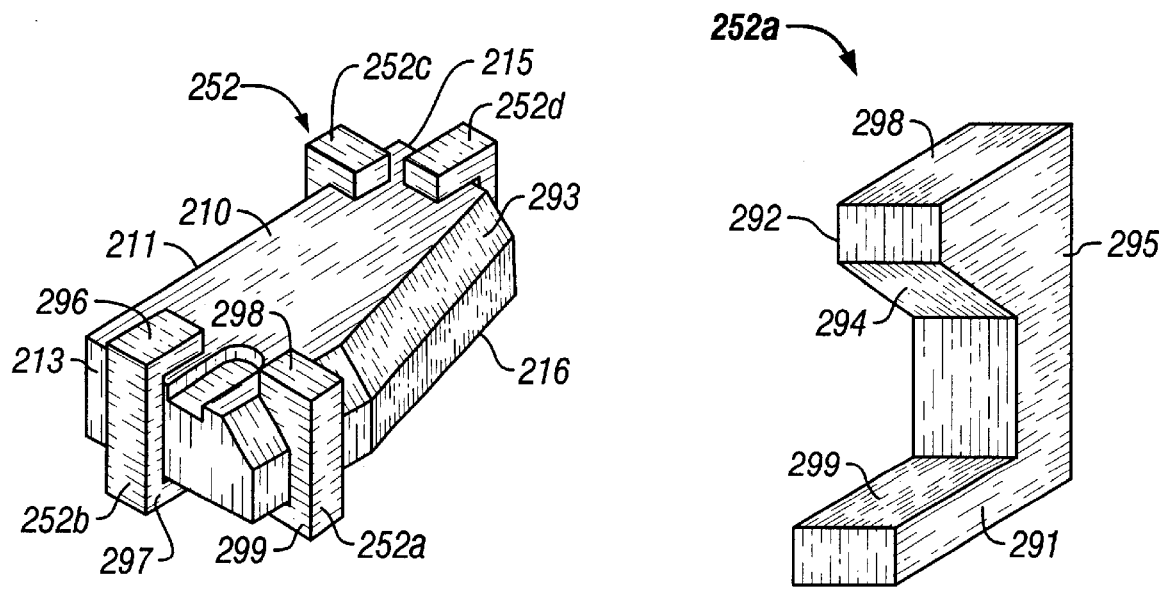
FIG. 63A
FIG. 63B

KEY ASSEMBLY FOR VEHICLE IGNITION LOCKS

RELATED APPLICATIONS

This application is a continuation-in-part of U.S. patent application Ser. No. 08/503,429, filed Jul. 17, 1995, now U.S. Pat. No. 6,035,677, which is a continuation-in-part of U.S. patent application Ser. No. 08/112,094, filed Aug. 26, 1993 which is now U.S. Pat. No. 5,433,096.

BACKGROUND OF THE INVENTION

The present invention relates to an automobile security system, and more particularly, to a key assembly for use in a vehicle ignition and lock unit.

Various types of security systems used in conjunction with the ignition circuit of a vehicle are known in the art. Many of these systems include anti-theft and/or anti-tampering mechanisms which are incorporated to deter the unauthorized use of vehicles. An electronic vehicle ignition lock is a component of some of these systems which can increase vehicle security and even lower insurance rates in some countries.

An electronic interlock system uses a coded activation signal which enables a vehicle operator to run a vehicle. Coded activation signals are generally read electronically within an ignition lock and subsequently sent to an electronic control module. The electronic control module controls engine operation and enables the vehicle to run only if the correct activation signal is received. Therefore, an electronic interlock system prevents a vehicle from running even if the ignition lock is bypassed or pulled. This system makes vehicle theft more difficult and time consuming.

The ignition keys employed for use with electronic interlock systems traditionally contain mechanical and/or electronic interlock codes. One such system incorporates a resistor pellet in the ignition key. The resistor pellet provides a resistor of a resistance such that when the ignition key is inserted into and rotated within a vehicle's ignition cylinder unit, an electrical current is applied through the resistor. A decoding circuit determines if the resistance of the resistor pellet in the ignition key is within a predetermined resistance "window." If the resistance provided by the resistor pellet in the ignition key is within the predetermined resistance range, the vehicle will run. To the contrary, if the resistance falls outside of the predetermined resistance window, the vehicle will not run. Examples of these interlock systems and associated keys are illustrated in U.S. Pat. Nos. 4,250,482, 5,083,362 and 5,156,032.

In another electronic interlock system, radio frequency identification (RFID) is used in the enabling or disabling of engine operation. An RFID interlock system consists of a reader which sends a signal to an antenna associated with a transponder that is mounted in a key. The transponder includes a transponder circuit, which can comprise an integrated circuit or discrete components, and a resonant circuit formed by a capacitor and an inductor or coil. The signal energizes the transponder, and the transponder responsively transmits a unique identification code back to the reader which decodes the identification code. If the signal transmitted by the transponder represents a valid identification code, the reader transmits this information to the vehicle's electronic control module thereby enabling engine operation. However, if the signal is not a valid identification code, the reader causes the electronic control module to prevent engine operation. Typically, the antenna associated with the transponder produces a relatively high energy electromagnetic field which is coupled to the coil of the transponder and converted to a DC voltage which is used to power the electronic circuits of the transponder. The transponder transmits its unique identification code in the form of a low energy radio frequency signal that is received and decoded by the reader as described above.

Precisely because RFID electronic interlock systems are such effective security devices, it is critical that these systems work dependably in all the conditions a vehicle might encounter. The result of an RFID system failure is that a vehicle owner, or other person properly in possession of the keys for a given vehicle, is stranded and unable to bypass the interlock system to operate the vehicle. Electronic interlock systems are industry specified. Industry test configurations and requirements reflect conditions and circumstances which RFID interlock systems might actually encounter and, therefore, are a fairly reliable indicator of the dependability of the security systems.

Older RFID systems used transponder chips that are packaged in glass vials, often containing silicone, in an effort to protect the electronic components contained within the vials. Developments in the electronic industry have resulted in transponders that are overmolded with plastic and such transponders have gained wide acceptance in RFID interlock systems for vehicles. Recently, the inventors have discovered that harsh operating conditions affect the performance of RFID interlock systems in which the transponders are packaged in plastic material. However, RFID systems employing such transponders molded in key heads meet industry requirements, only when used with relatively expensive receivers.

One of the most popular configurations of transponders currently available is produced by Texas Instruments, Inc., as Texas Instruments, Inc. part number RI-TRP-W9WK. Another popular transponder configuration is that manufactured by Motorola, as Motorola part no. 05504-001. Both transponders include an overmold of a plastic material with electronic components located substantially within the overmold.

SUMMARY OF THE INVENTION

The inventors have found a problem involving a shift in inductance of the coil and the capacitance of the capacitor of the resonant circuit of the transponder which affects the operation of RFID security systems which occurs when the transponders are used in conjunction with prior key assembly designs. A shift in the inductance and capacitance of the transponder's resonant circuit changes the resonant frequency of the transponder which can result in failure of the transponder to receive the interrogation signal being transmitted, or in the weakening of the strength of the signal sent to the receiver so that the receiver cannot detect signals transmitted by the transponder. The end result is that the vehicle engine cannot be started and/or run using the ignition or otherwise. The shift is believed to result from mechanical and/or thermal effects which produce forces upon the transponder, ultimately shifting the resonant frequency of the transponder. The greatest shift in resonant frequency, occurs in cold temperatures. For the Motorola and Texas Instruments, Inc. transponders, resonant frequency shift can be up to about 7 KHz, depending upon material in which the transponder is molded.

Decreasing, with the ultimate goal of completely eliminating, the amount of resonant frequency shift associated with the transponder eradicates the problem described herein above concerning RFID ignition lock systems. Testing has demonstrated that shifting in the resonance of the transponder is reduced when there is minimum contact between the transponder and any substantially rigid material that supports the transponder in the key assembly. Testing also has demonstrated that reducing the mass of the substantially rigid material that is located adjacent to the transponder in the key assembly reduces the shift. These favorable results are believed to be attributable to minimizing external forces applied to the transponder by limiting the force transmitting ability of the substantially rigid material structure adjacent to the transponder.

In accordance with the invention, both mechanical and thermal considerations are incorporated into improving the key assembly design to make RFID systems more dependable. Mechanical considerations are addressed in the structural design of the key assembly, and thermal considerations are addressed through the careful selection of construction materials and structural design, so that a delicate balance is achieved in the improved key design provided by the invention.

Achieving a balance between the mechanical and thermal considerations is critical because of their interrelated nature. Constructing the key head of a relatively hard material alleviates mechanical problems concerning key head deformation or failure from shear or torsional forces. However, the nature of harder plastic material is such that it tends to cause higher forces to be applied to the transponder under temperature excursions. Correspondingly, using a relatively soft plastic material to construct the key head tends to abate thermally-related problems because such material is less likely to produce high forces on adjacent components than does a harder material. However, the softer material is more prone to mechanical deformation by externally applied forces. This softer material can also adversely impact the structural integrity of the key head. The present invention attains a delicate equilibrium between minimization of the adverse effects of thermal expansion and contraction and mechanical stability.

The operating characteristics of transponders can be changed by forces caused by thermal expansion and contraction, and by impact force and compressive force occurring during manufacturing of the key assembly, especially during the molding processes. Two procedures have been found by the inventors to alleviate damage due to impact force applied to the transponder during the molding process. These procedures include the use of a specially gated, two-step molding process for producing the key assembly and the use of a novel frame and mounting structure for supporting the transponder.

The present invention addresses a number of concerns that affect the operation of the transponder. One concern is breakage or other damage to the transponder due to mechanical forces applied to the transponder during the molding processes. Another concern is damage that can result due to the heat that is applied to the transponder during the molding process. A further concern is damage that can be caused by the shrinking or contracting of the undermold and/or overmold material during cooling of the key assembly following the molding operation. Yet another concern is changes in operating conditions, including but not limited to changes in temperature, in the daily operation of a key assembly that includes a transponder.

More specifically, the inventors have invented a method for molding the key assembly for vehicle ignition locks equipped with RFID systems that substantially eliminates the problem of resonant frequency shift. In accordance with highly preferred embodiments of the present invention, the transponder is first surrounded by an undermold using injection molding techniques. The undermold comprises a relatively hard plastic material which surrounds and protects the transponder from certain outside forces along its weakest axes and holds the transponder in the proper location within the key. Voids can be formed in the undermold during the first stage of the process. Then, the key assembly is overmolded, providing an outer covering that encloses and protects the transponder. During overmolding of the key assembly, the voids formed in the undermold provide a space for the overmold material to fill, which further secures the top and bottom center portions of the overmold, thereby increasing the integrity of the overmold and ensuring that the overmold of the key assembly will not separate and disfigure the key.

Further in accordance with the invention, the injection molding process is conducted so as to minimize impact forces applied to the transponder during the molding process. Preferably, the undermold material is injected, in liquid form, through a gate that directs the material against a corner of the transponder causing the material to be split into two portions. Consequently, the liquid material that forms the undermold encircles the transponder as the material is being injected producing substantially even hydrostatic pressures. Encircling the transponder with the liquid material (which will eventually harden to form the undermold of the key assembly), substantially prevents the application of impact forces directly to the planar surfaces of the transponder, with an attendant reduction in the potential for damage to the transponder which could cause the device to fail.

In accordance with a feature of the invention, during the injection molding process, strategically located voids are formed in the undermold. These voids, which can be extremely small, eliminate pressure differentials which can otherwise develop between the adjacent portions of the mold. Eliminating the potential for a pressure differential prevents the transponder from shifting or cracking within the key assembly during overmolding.

Another benefit of molding the key assembly in two stages, namely first undermolding and subsequently overmolding, is that while the plastic is cooling following the injection molding process, overall heat and compressive force imposed on the transponder are substantially reduced. While the harder plastic material undergoes a greater degree of compression during cooling, the impact on the transponder is minimized because less material is used in forming the undermold.

Moreover, the component tending to cause a shift in the resonance of transponders for key assemblies used in RFID systems is substantially eliminated using the overmolding process provided by the invention. The softer plastic material which is used to form the overmold portion of the key head tends to abate thermal problems because the overmold material is less inclined to exert pressure and distort the transponder to the degree that harder material would. However, softer material is more prone to mechanical deformation by shear or torsional forces.

A further benefit of the present invention is the use of an injection molding device which supports and contains the transponder within the key assembly along its weakest axis to prevent cracking, fracturing, and other adverse effects, any of which can contribute to failure. The mold plates forming the molds that are used in molding the undermold and the overmold of the key assembly further serve to reduce, even prevent thermal excursion during manufacture of the key assembly because the mold plates function as heat sinks. The mold plates absorb auxiliary heat and thermal energy so that the affects of the heat upon the transponder in both the undermold and overmold processes are substantially reduced. Preferably, the mold plates comprise a relatively massive material with good heat transfer characteristics.

The improved process for manufacturing RFID systems incorporating known transponders, such as those produced by Texas Instruments, Inc. and Motorola, minimizes the impact and compressive force applied along the weak axis (or axes in the case of the Motorola device) of the transponder and, thus, reduces the chance that the transponder will fail.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 12 is a side view with parts in cross section of a sixth embodiment of the key assembly of the present invention;

FIG. 13 is a cross-sectional view taken along the plane of the line 13—13 in FIG. 12;

FIG. 14 is a side view with parts in cross section of a seventh embodiment of the key assembly of the present invention;

FIG. 15 is a cross-sectional view taken along the plane of the line 15—15 in FIG. 14;

FIG. 16 is a side view with parts in cross section of an eighth embodiment of the key assembly of the present invention;

FIG. 17 is a cross-sectional view taken along the plane of the line 17—17 in FIG. 16;

FIG. 18 is a side view of a ninth embodiment of the key assembly of the present invention;

FIG. 19 is a side view with parts in cross section of the key assembly of FIG. 18 with the carrier closed and the key head shown in cross section;

FIG. 20 is a cross-sectional view taken along the plane of the line 20–20 in FIG. 19;

FIG. 33 is a cross-sectional view taken along the plane of the line 33—33 in FIG. 32;

FIG. 34 is a cross-section view similar to FIG. 33 illustrating the carrier molded in place;

FIG. 35 is a cross-sectional view taken along the plane of the line 35—35 in FIG. 32;

FIG. 36 is a view similar to FIG. 35 except illustrating the carrier molded in place;

FIG. 37 is a cross-sectional view of the mold illustrating the key, a carrier and a transponder within the mold just prior to overmolding;

FIG. 38 is a cross-sectional view illustrating the key head of FIG. 37 after overmolding;

FIGS. 57A–57E illustrate the key assembly of FIGS. 56A–56E prior to applying the overmold;

FIGS. 58A–58C are enlarged views illustrating a frame structure including generally rectangular-shaped tabs for supporting the transponder of the key assembly shown in FIGS. 56A–56E;

FIG. 62E is a bottom perspective view of the key assembly of FIG. 62A;

FIG. 62F is a top perspective view of the key assembly of FIG. 62A;

FIGS. 63A and 63B illustrate a further embodiment for a frame structure for the key assembly shown in FIGS. 61A–61E wherein the undermold defines tabs conformed to the configuration of a wedge-type transponder.

FIG. 64F is an isometric view of the support structure of the key assembly of FIG. 64E;

DETAILED DESCRIPTION OF THE PREFERRED EMBODIMENTS

Figure 1:
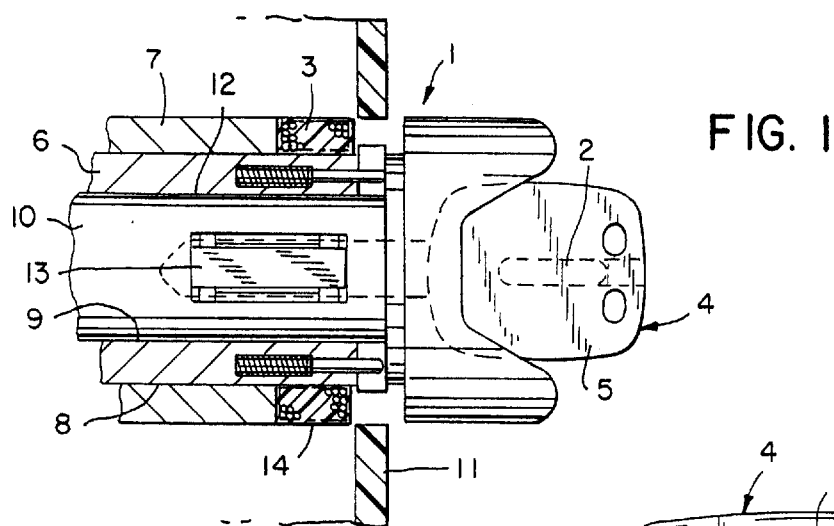
FIG. 1 is a fragmentary side view of a vehicle ignition lock incorporating an RFID electronic interlock system.

Referring now to the drawings and more particularly to FIG. 1, a vehicle ignition lock incorporating an RFID electronic interlock is indicated generally at 1. The major components of the RFID interlock preferably comprise a transponder 2, shown mounted on a key, an antenna 3, and a reader (not shown). The reader is typically contained within an RFID ignition module (not shown) which also preferably contains logic circuits and a control circuit. The antenna 3 can be formed by a wire coil, for example, and preferably is located in the ignition lock 1. The transponder 2 is mounted on a key which together with the transponder 2 form a key assembly 4. The reader of the RFID electronic interlock can be similar to the RFID interlock that is disclosed in U.S. Pat. No. 5,433,096, which is assigned to the assignee of this patent application.

The function of the major components of the RFID system is known in the art and, accordingly, will not be described in detail. Briefly, the transponder 2 is adapted to respond to a radio frequency signal transmitted by the reader and transmit a unique identification code back to the reader. The radio frequency signal transmitted by the reader is coupled to the transponder via the antenna 3. The transponder also produces an electromagnetic field for radiating radio frequency signals generated by the transponder back to the reader via antenna 3. The reader converts the radio frequency signal from the transponder 2 to a digital signal for processing by the logic circuits. The logic circuits verify that the identification code is valid for the vehicle. When a valid identification code is detected, the reader generates an enable signal for a vehicle engine control module (not shown) which controls engine operation including, for example, fuel injection and ignition spark generation. If, on the other hand, the identification signal is determined to be invalid, the logic circuits control the engine control module so that engine operation is not enabled. The vehicle battery (not shown) provides power for the automobile security system.

Figure 52:
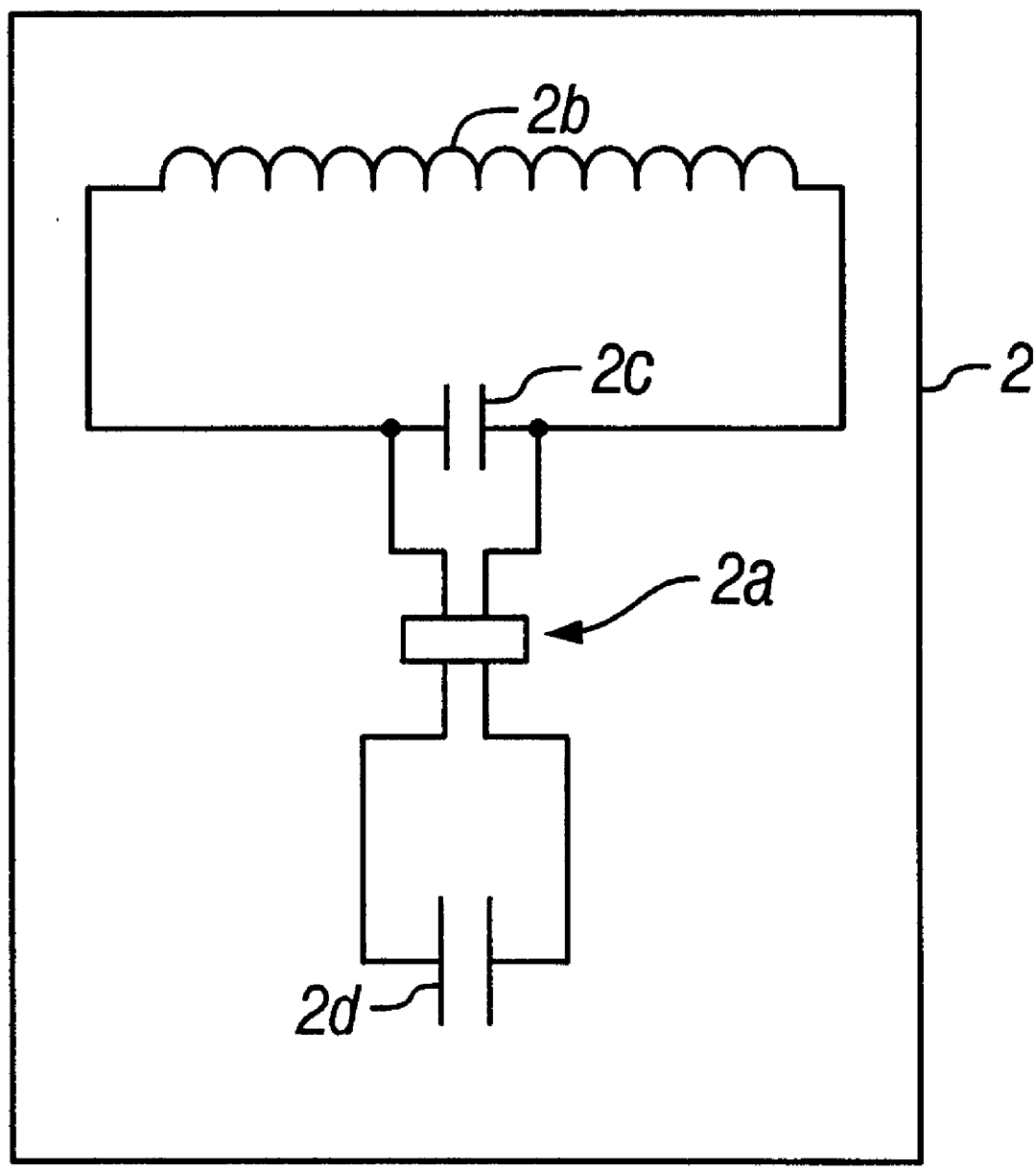
FIG. 52 is a simplified representation of a transponder of the key assembly provided by the invention.

Considering the transponder 2 in more detail, the transponder 2 is mounted in the head 5 of the key 4 and in one embodiment, includes an approximately 3.8×22 millimeter glass encapsulated, encrypted transponder, such as those available from Texas Instruments under Model No. RI-TRP-BRHP. Referring also to FIG. 52, in its simplest form, the transponder 2 includes electronic circuits 2a and a coil 2b. Preferably, the transponder 2 includes a capacitor 2c that is connected in parallel with the coil 2b. In one preferred embodiment, the electronic circuits 2a of the transponder are fabricated as an integrated circuit. However, the electronic circuits of the transponder circuits can be formed as discrete components. The transponder 2 can be anything that is capable of receiving and sending signals. Also, in some applications, the transponder can function as a transmitter that is energized to transmit an identification signal or the like in response to application of an RF signal to the transponder, as for example, in result of insertion and/or rotation of the key assembly into the ignition lock.

Referring again to FIG. 1, in one preferred embodiment, the reader is energized in response to inserting the key assembly 4 into the ignition lock 1 and turning the key to the start position, causing battery voltage to be applied. When battery voltage is applied, the RFID ignition module is energized and causes the reader to send out a 134.2 KHz pulse. By way of example, the pulse can last approximately 50 milliseconds. The pulse is applied to the antenna 3 and coupled to the coil of the transponder circuit. In the transponder, the pulse is converted to a DC voltage by a rectifier circuit (not shown). The DC voltage is regulated down, stored on a small capacitor 2d and used to supply the electrical circuits of the transponder 2. When the pulse terminates, the transponder transmits an identification code. Typically, the identification code is a unique factory programmed 64 bit code. The transponder transmits the identification code in the form of frequency shift keying. The antenna 3 receives the modulated identification code sent by the electrical circuit and the identification code is decoded by the reader which translates the frequency signal to a digital identification code and sends the digital identification code to the logic circuit. Only after the digital signal is verified as the valid identification code will engine operation be enabled. An invalid identification code will prevent engine operation. Once all data have been sent, the storage capacitor on the transponder containing electrical circuit discharges and the electrical circuit resets for the next read cycle. The total read cycle lasts approximately 120 milliseconds. While in one preferred embodiment the information transmitted by the transponder is a multi-digit identification code, encryption (challenge response) methods can be used and the signal verification process can include multiple handshakes, for example.

The ignition lock 1 preferably includes a hollow cylindrical sleeve 6 fixed within a housing 7. The housing 7 can comprise a steering column of a vehicle, although those of ordinary skill in the art will recognize that numerous acceptable mounting locations are available. The sleeve 6 includes a cylindrical outer surface 8 and a cylindrical inner surface 9 to receive an elongated rotatable cylinder 10. As shown in FIG. 1, the rearward end of the cylinder 10 is to the left while the forward end of cylinder 10 is to the right in FIG. 1 adjacent to a wall 11 of the steering column housing. The cylinder 10 includes a cylindrical outer surface 12 which rotationally interfaces with the inner surface 9 of the sleeve 6. The key assembly 4 rotates the cylinder 10 from an off position to a start position when the cylinder 10 is rotated in a clockwise direction from the position shown in FIG. 1. Once rotated into the start position, upon release of the key, the cylinder 10 is rotated back in a counterclockwise direction from the start position to a run position in the conventional manner.

The cylinder 10 can include a plurality of axially spaced tumblers (not shown) which engage with the notches in the key assembly 4 and cooperate conventionally with a side bar 13. Although the ignition lock 1 is illustrated as including a side bar 13, alternative embodiments of the present invention may incorporate non-side bar locks. For example, locks which use only tumblers to engage the cylinder 10 and the sleeve 6.

As shown in FIG. 1, the antenna 3 is integrally molded within an annular module 14. The antenna 3 is preferably located at the forward end of the sleeve 6 and the cylinder 10. Locating the antenna 3 as illustrated in FIG. 1 limits the effects of the metallic composition of the sleeve 6 and the cylinder 10 from interfering with the electromagnetic field radiating from the antenna 3. The antenna 3 is preferably wrapped about the sleeve 6 and the cylinder 10 to form an annular coil with a central opening coaxial with the longitudinal axis of the ignition lock 1. The annular module 14 preferably forms an annular ring with an inner diameter dimensioned to mechanically fit with the outer surface 8 of the sleeve 6. Thus, the annular module 14 slides over the forward end of the sleeve 6 and is received and fixedly mounted on the sleeve 6 in a convenient manner. For example, as evident to those of ordinary skill in the art, the annular module 14 may be staked or snapped in place to ensure that the annular module is integrally mounted on the sleeve 6. It is pointed out that instead of the single antenna 3 illustrated in FIG. 1, the RFID interlock system alternately can include an exciter coil and a receiving coil similar to the two-coil antenna that is commercially available from Hughes Identification Devices under Model No. HS51051 hand held reader.

Figure 2:
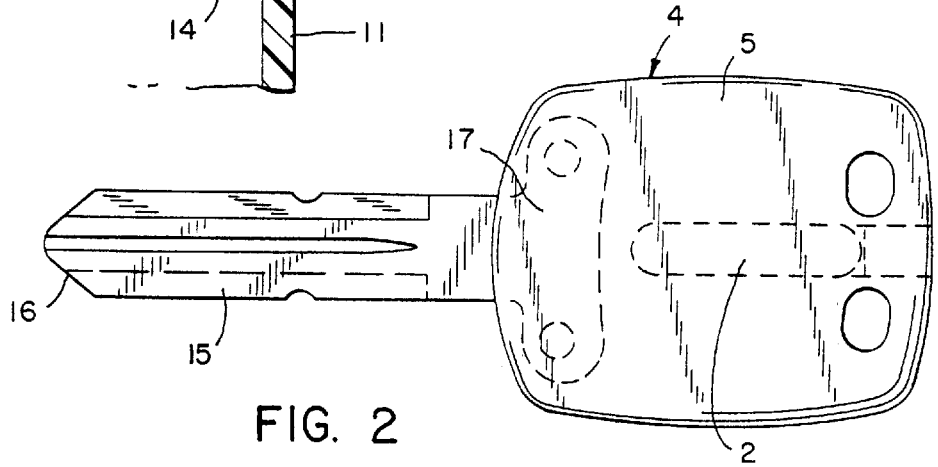
FIG. 2 is an enlarged side view of a first embodiment of a key assembly utilized in the electronic interlock system of FIG. 1.
Figure 3:
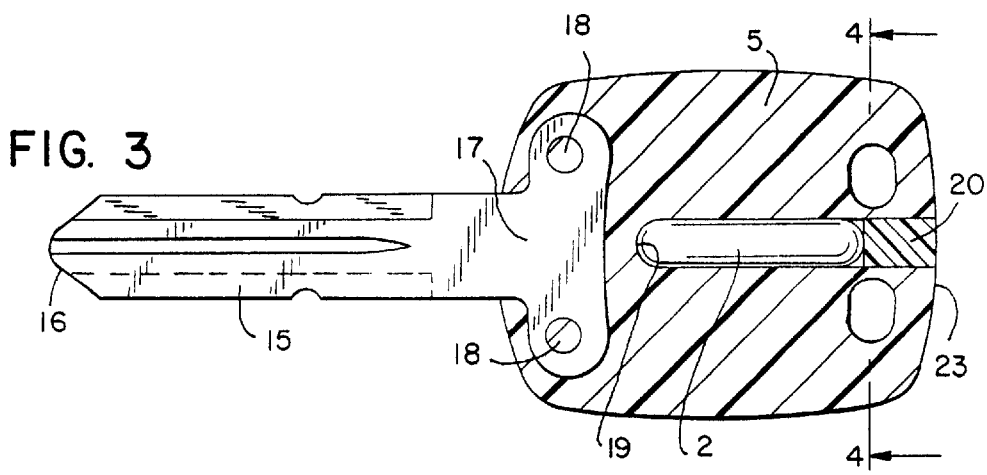
FIG. 3 is a cross-sectional view of the key assembly of FIG. 2.
Figure 4:
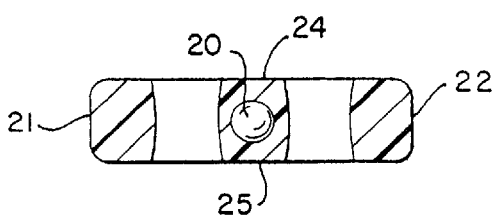
FIG. 4 is a cross-sectional view taken along the plane of the line 4—4 in FIG. 3.

Referring now to FIGS. 2–4, there is illustrated a first embodiment for mounting the transponder 2 in the key head 5 of the key assembly 4. As shown, the key assembly 4 includes an elongated shank 15 having a toe end 16 and a heel end 17. The key head 5 preferably is integrally coupled to the heel end 17 of the shank 15 with pins 18 formed while the key head 5 is molded. As best shown in FIG. 3, the transponder 2 is mounted in a bore 19 formed in the key head 5. The bore is dimensioned to receive the transponder and a plug 20 is adapted to close off the bore 19. The bore 19 includes a blind end adapted to engage the transponder and an open end which opens to one end of the key head 5. As best shown in FIG. 3, the blind end of the bore 19 is spaced from the heel end 17 of the shank 15 and the longitudinal axis of the bore 19 is preferably aligned with the elongated shank 15. As shown, the bore 19 opens to the rear end of the key head 5. Alternatively, the open end of the bore 19 may open to any surface of the key head 5 including a top surface 21, a bottom surface 22, a rear surface 23, or opposite sides 24, 25. Preferably, the plug 20 and the key head 5 comprise the same plastic material, for example, Polypropylene Himont 7523. The bore 19 can further comprise a cushioning material such as a silicone compound supplied after the transponder has been inserted.

Figure 5:
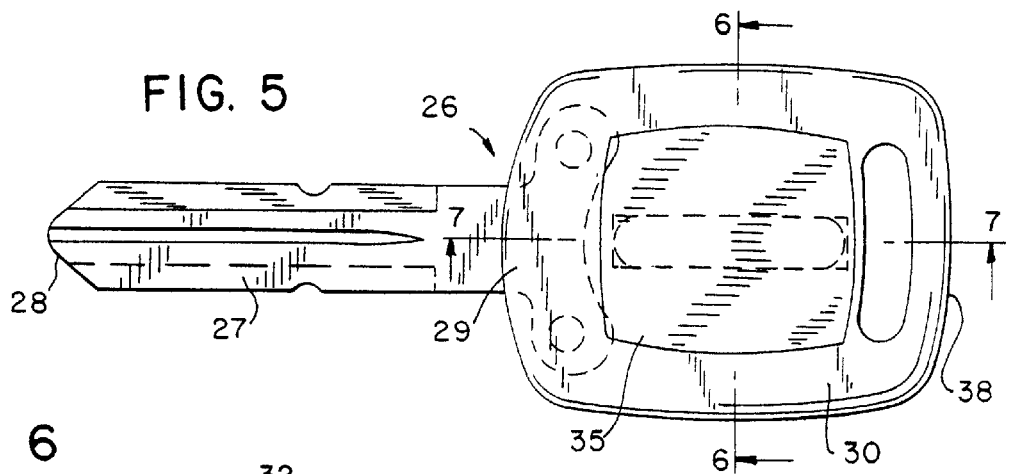
FIG. 5 is side view of a second embodiment of the key assembly of the present invention.
Figure 6:
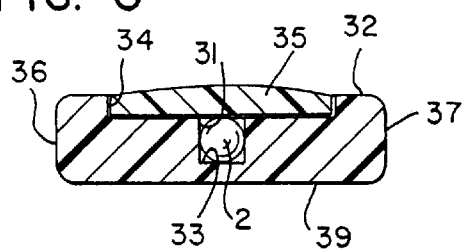
FIG. 6. is a cross-sectional view taken along the plane of the line 6—6 in FIG. 5.
Figure 7:
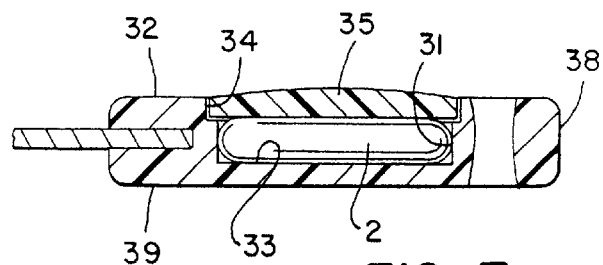
FIG. 7 is a sectional view taken along the plane of the line 7—7 in FIG. 5.

FIGS. 5–7 illustrate a second embodiment of the key assembly of the present invention wherein the key assembly 26 includes the shank 27 having the toe end 28 and the heel end 29, and the key head 30 constructed of a plastic material integrally molded on the heel end 29 in the same manner as illustrated and described in FIG. 3. In this alternative embodiment, however, the transponder 2 is mounted within an opening comprising a substantially T-shaped recess 31 formed in one side 32 of the key head 30. The recess 31 is dimensioned to substantially correspond with the dimensions of the transponder 2. Additionally, a cushioning material, such as a silicone compound, may be supplied in the recess 31 at the time the transponder is installed. The recess 31 preferably has a closed bottom end 33 and an open top end 34 which opens to the side 32 of the key head 30. FIG. 6 illustrates the plug 35 which is preferably an adhesive-backed panel member which covers the transponder 2 and is received within the open top end 34 so that the side 32 is relatively smooth for the key assembly 26. One of ordinary skill in the art will recognize that, although the recess 31 is illustrated as opening toward the side 32 of the key head 30, the recess 31 can open to any surface of the key head 30 including the top surface 36, the bottom surface 37, the rear surface or the other side surface 39 in addition to the side 32. The plug 35 can be any desired configuration, but incorporates a "medallion" or logo of the vehicle manufacturer in preferred embodiments of the present invention.

Figure 8:
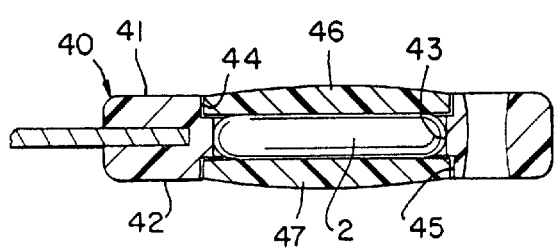
FIG. 8 is a cross-sectional view of a third embodiment of the key assembly of the present invention.

Yet a third embodiment of the present invention is illustrated in FIG. 8. The key assembly of FIG. 8 is substantially similar to the key assembly of FIGS. 5–7, however, the opening which receives the transponder 2 extends completely through the key head 40 from one side 41 to the opposite side 42. As best shown in FIG. 8, the opening formed in the key head 40 includes a central section 43 for receiving the transponder 2 and a pair of opposite outer sections 44, 45 opening to opposite sides 41, 42, respectively, of the key head 40. A cushioning material such as a silicone compound may also be supplied in the central section 43 when the transponder 2 is installed. In this embodiment, the plugs 46, 47 for the openings extending through the key head 40 comprises a pair of adhesive-backed plugs 46, 47 received by the outer sections 44, 45 for covering the openings in the key head 40 such that the transponder 2 is positioned between the plugs 46, 47. The plugs 46, 47 of preferred embodiments of the present invention include medallions or logos which can be seen from opposite sides 41, 42 of the key head 40.

Figure 9:
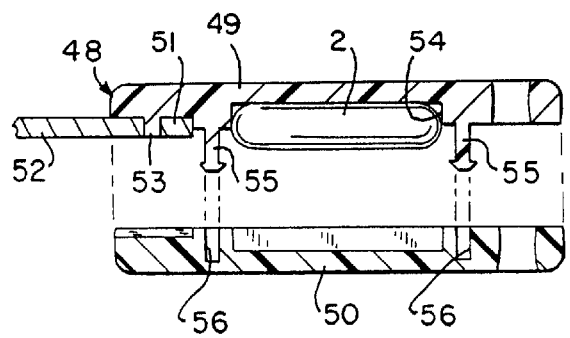
FIG. 9 is an exploded cross-sectional view of a fourth embodiment of the key assembly of the resent invention.

A fourth embodiment of the present invention is illustrated in FIG. 9. In this embodiment, the key head 48, is formed in two parts—specifically, a base member 49 and a cover member 50. As best shown in FIG. 9, the base member 49 is coupled to the heel end 51 of the key shank 52 with pins 53. The transponder 2 is received by the recess 54 formed in the base member 49 dimensioned in accordance with the dimensions of the transponder 2. Again, a cushioning material such as a silicone compound may also be supplied in the recess 54 of the transponder. In this embodiment of the present invention, the cover member 50 serves to plug the recess 54 itself. Accordingly, the cover member 50 attaches to the base member 49 with a snap lock assembly comprising fingers 55 projecting from the base member 49 and passageways 56 formed in the cover member 50 to receive the fingers 55. Thus, the cover member 50 assembles on the base member 49 merely by aligning the fingers 55 in the passageways 56 and forcing the base member 49 and the cover member 50 together to position the transponder 2 there between in the recess 54. Alternatively, the cover member 50 can be sonic welded to the base member 49 or adhesively coupled to the base member 49.

Figure 10:
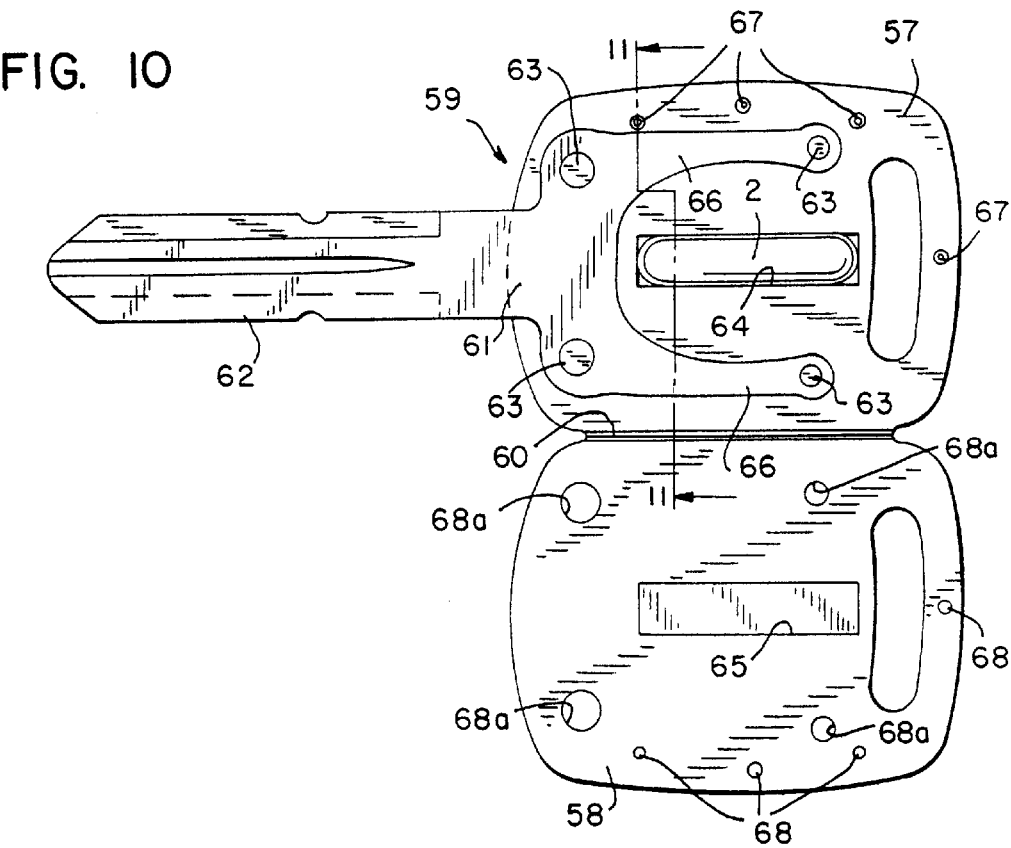
FIG. 10 is a side view of a fifth embodiment of the key assembly of the present invention.
Figure 11:
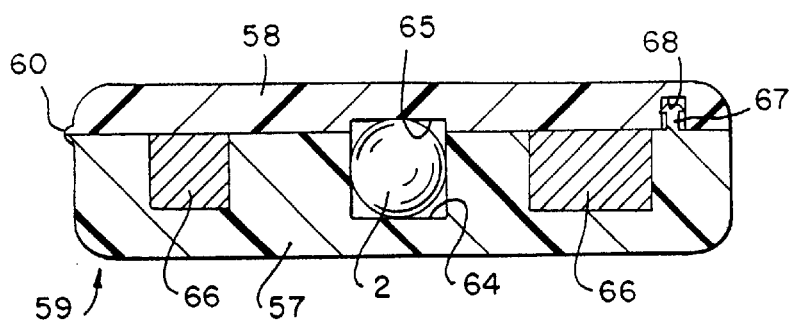
FIG. 11 is a sectional view taken along the plane of the line 11—11 in FIG. 10.

FIGS. 10 and 11, illustrate a fifth embodiment of the key assembly of the present invention. While this embodiment is similar to the embodiment of FIG. 9, the base member 57 and the cover member 58 of the key head 59 are interconnected with a living hinge 60 along the bottom edges of the base member 57 and the cover member 58. As illustrated, the base member 57 is integrally attached to the heel end 61 of the key shank 62 via pins 63. The heel end 61 preferably comprises a substantially U-shaped frame member with opposing legs 66. The transponder 2 mounts within the recess 64 formed in the base member 57 which, like embodiments described herein above, is dimensioned to receive the transponder 2. A cushioning material, such as a silicone compound, can also be supplied in the recess 64 when the transponder 2 is installed. The transponder 2 is preferably oriented along a longitudinal axis disposed in alignment with the key shank 62, and accordingly, the corresponding recess 65 is formed in the cover member 58 so that the transponder is properly aligned with the key shank 62. Similar to the embodiment depicted in FIG. 9, the base member 57 and the cover member 58 couple with a snap lock assembly comprising fingers 67 projecting from the base member 57 and received within the passageways— formed in the cover member 58. This construction permits the cover member 58 to pivot toward the base member 57 until the fingers 67 are received within the passageways 68 and the pins 63 are received within blind holes 68a so that the transponder 2 is positioned between the base member 57 and the cover member 58. This is best shown in FIG. 11. The cover member 58 may alternatively be sonic welded to the base member 57 or the base member 57 and cover member 58 can be attached adhesively.

Referring now to FIGS. 12 and 13, a sixth embodiment of the key assembly of the present invention is illustrated. As shown, the key shank 69 includes a toe end 70 and a heel end 71. The heel end 71 includes an open rectangular-shaped frame member forming a loop consisting of legs 72–75 which encircle a carrier 76 for the transponder 2. The carrier 76 includes a flat base 77, a component receiving recess 78 formed in the base 77 and a means for attaching the base 77 to the heel end 71. As best shown in FIG. 13, the recess 78 is elongated and dimensioned to substantially match the dimensions of the transponder 2 so that the transponder is oriented along a longitudinal axis disposed in alignment with the longitudinal axis of the key shank 69. Also shown best in FIG. 13, the base 77 of the carrier 76 is attached to the heel end 71 of the key shank 69 by pins 79 at one end of the carrier 76 which are received within the leg 72 and a pair of pins 80 at the opposite end of the carrier 76 which are received within another leg 74. The pins 79, 80 are received within corresponding openings formed in the legs 72 and 74 to temporarily mount the carrier 76 and the transponder 2 to the heel end 71 of the key shank 69. Thereafter, the key head 81 is integrally molded over the heel end 71, the legs 72–75, and the carrier 76, securing the transponder 2 to the key.

A seventh embodiment of the present invention is illustrated in FIGS. 14–15. In this embodiment, the key shank 82 includes a substantially U-shaped heel end 83 comprising a pair of opposing and spaced-apart legs 84, 85. The mounting arrangement for the transponder 2 comprises the carrier 86 with a hollow cylindrical base 87 dimensioned to receive the transponder 2, and four wing members 88, 89, 90, 91 extending from the base 87 to attach the base 87 carrying the transponder 2 to the legs 84, 85 of the heel end 83 of the key shank 82. As best shown in FIG. 15, each wing member 88, 89, 90, 91 is preferably integral with the base 87 at one end and includes a pin 92 at its outermost end to be coupled with the legs 84, 85 of the substantially U-shaped frame member of the heel end 83. Thus, the carrier 86 is mounted on the legs 84, 85 of the substantially U-shaped frame member with pins 92 inserted into corresponding openings in the legs 84, 85 to initially attach the carrier 86 and the transponder 2 in place. Thereafter, the key head 93 is preferably integrally molded over the carrier 86, the heel end 83, and the legs 84, 85 to affix the transponder 2 in a position oriented along a longitudinal axis aligned with the longitudinal axis of the key shank 82.

FIGS. 16–17 depict an eighth alternative embodiment of the present invention. In this embodiment, the key shank 94 includes the substantially U-shaped heel end 95 with the pair of opposite spaced-apart legs 96, 97 as described herein above. In this embodiment, the mounting arrangement for the transponder 2 again comprises the carrier 98. The carrier 98 comprises a hollow cylindrical base 99 dimensioned to receive the transponder 2 and two wing members 100, 101 extending from the base 99 which attach the base 99 carrying the transponder 2 to the legs 96, 97 of the heel end 95 of the key shank 94. As shown best in FIG. 16, each wing member 100, 101 is integral at one end with the base 99 and includes cylindrical sleeves 102, 103 which slidably receive the legs 96, 97 of the substantially U-shaped frame member. The key head 104 is preferably integrally molded over the heel end 95, the carrier 98 and the legs 96, 97 to affix the transponder 2 in position oriented along a longitudinal axis in alignment with the longitudinal axis of the key shank 94.

Referring now to FIGS. 18–20, a ninth embodiment of the key assembly of the present invention is illustrated. In this embodiment, the key shank 105 includes the heel end 106 formed as a substantially U-shaped frame member having the pair of opposing spaced-apart legs 107, 108 as described herein above. The ends of the legs 107, 108 preferably include bases 109, 110 to mount the carrier 111. The carrier 111 comprises a substantially flat base 112, the recess 113, the pair of leg receiving recesses 114, 115 formed in the base 112 and disposed on opposite sides of the component receiving recess 113 for receiving the legs 107, 108 as well as the bases 109, 110. The carrier 111 further includes the cover member 116 which cooperates with the base member 112 to enclose recesses 113, 114, 115 and to mount the transponder 2 therein. Since the transponder 2 is oriented along the longitudinal axis aligned with the longitudinal axis of the elongated key shank 105, the cover member 116 includes recesses 117, 118, 119 corresponding to the recesses 113, 114, 115, as best shown in FIG. 20. The base member 112 and the cover member 116 are preferably pivotally connected together by means of a hinge 120 extending along their bottom sides. For the purpose of attaching the base member 112 and cover the member 116 together to position the transponder 2 between them, the base member 112 includes a pair of projecting pins 121, and the cover member 116 includes a pair of corresponding passageways 122 which, as shown best in FIG. 20, provide a snap-lock assembly for interconnecting the members 112, 116. Thereafter, the key head 123 is preferably integrally molded over the carrier 111 and the legs 107, 108 and the heel end 106 of the key shank 105 to fixedly secure the transponder 2 in its desired location with respect to the key shank 105.

Figure 21:
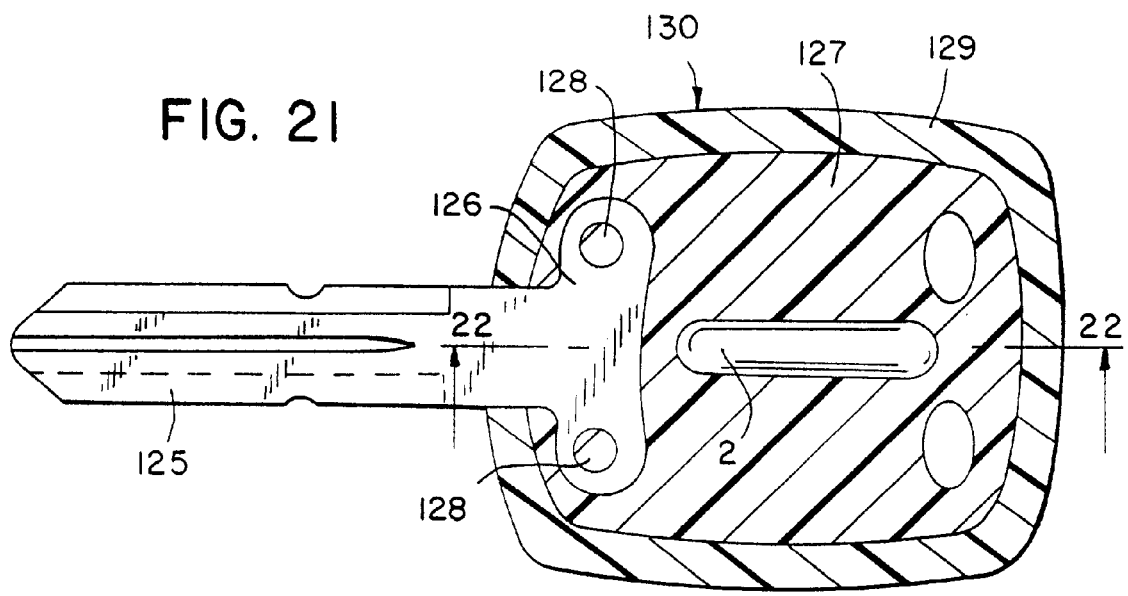
FIG. 21 is a side view with parts in cross section of a tenth embodiment of the key assembly the present invention.
Figure 22:
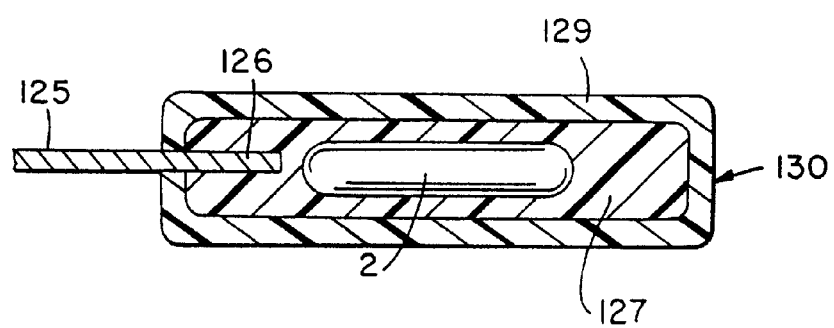
FIG. 22 is a cross-sectional view taken along the plane of the line 22—22 in FIG.21.
Figure 23:
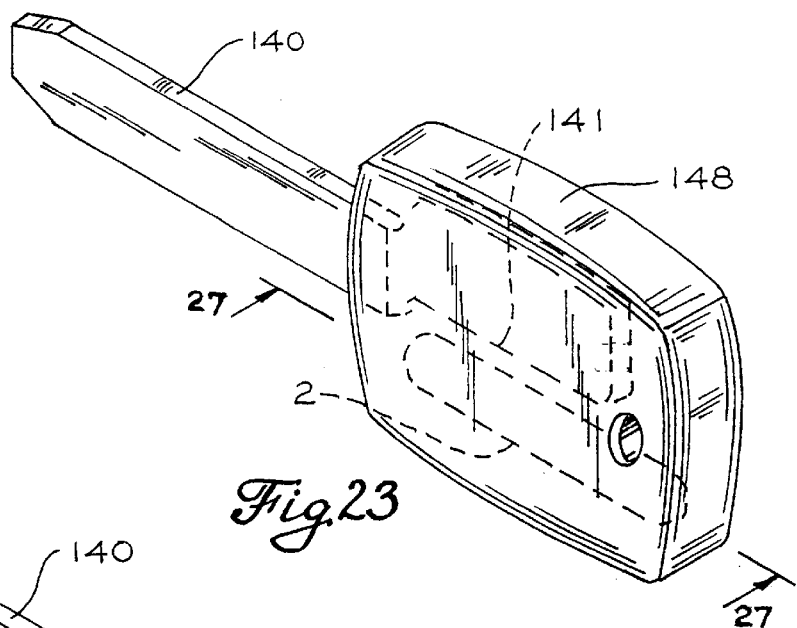
FIG. 23 is a perspective view of an eleventh embodiment of the key assembly of the sent invention.

FIGS. 21–22 illustrate a tenth embodiment of the key assembly of the present invention. In this alternative embodiment of the prevent invention, the key shank 125 includes the heel end 126 which is integrally attached to a carrier or undermold 127 for the transponder 2 by pins 128 preferably formed while the undermold 127 is formed. In other words, the undermold 127 is integrally molded around the transponder 2 and is preferably simultaneously attached to the heel end 126. Thereafter, the key shank 125 and the undermold 127, with the transponder 2 therein, are molded within an overmold 129 composed of a plastic material so that the undermold 127 and the overmold 129 form the key head 130. The material for the overmold in one alternative embodiment of the present invention 129 is the same material used for the undermold 127, although those of ordinary skill in the art will recognize that the undermold 127 and the overmold 129 do not have to be the same material.

Figure 24:
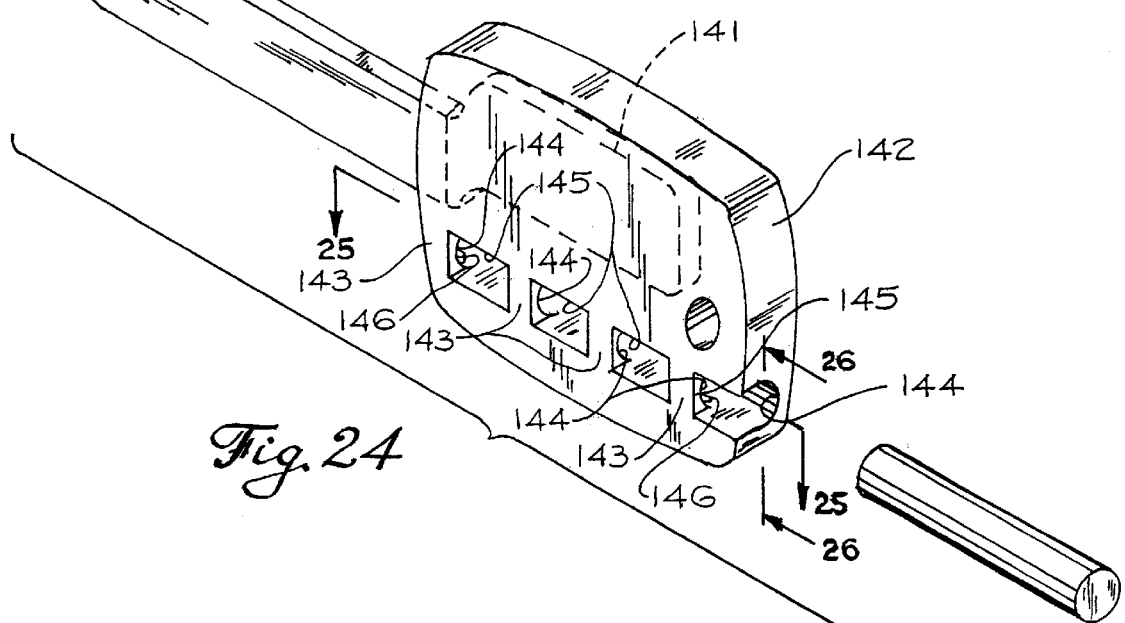
FIG. 24 is an exploded perspective view of the key assembly of FIG. 23 illustrating the manner of assembling a transponder and molded carrier.
Figure 25:
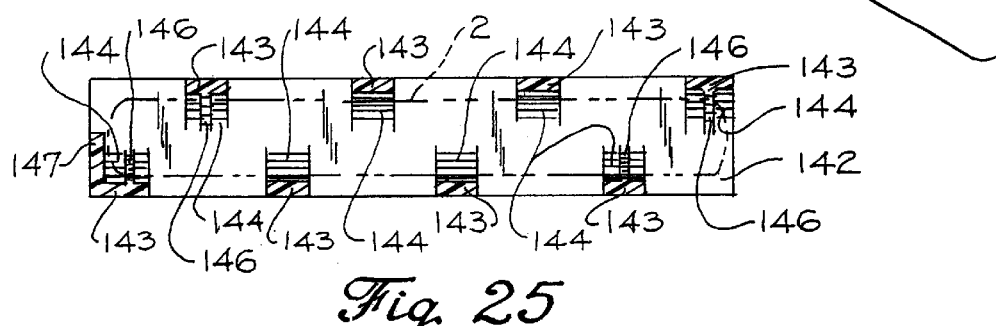
FIG. 25 is a cross-sectional view taken along the plane of the line 25—25 and FIG. 24.
Figure 26:
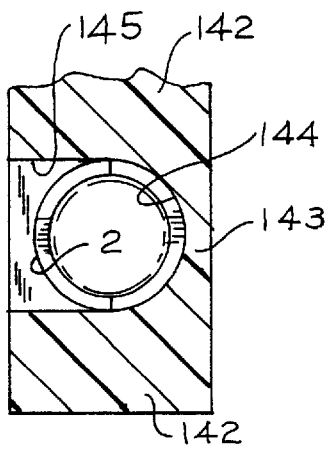
FIG. 26 is a fragmentary cross-sectional view taken along the plane of the line 26—26 in FIG. 24.
Figure 27:
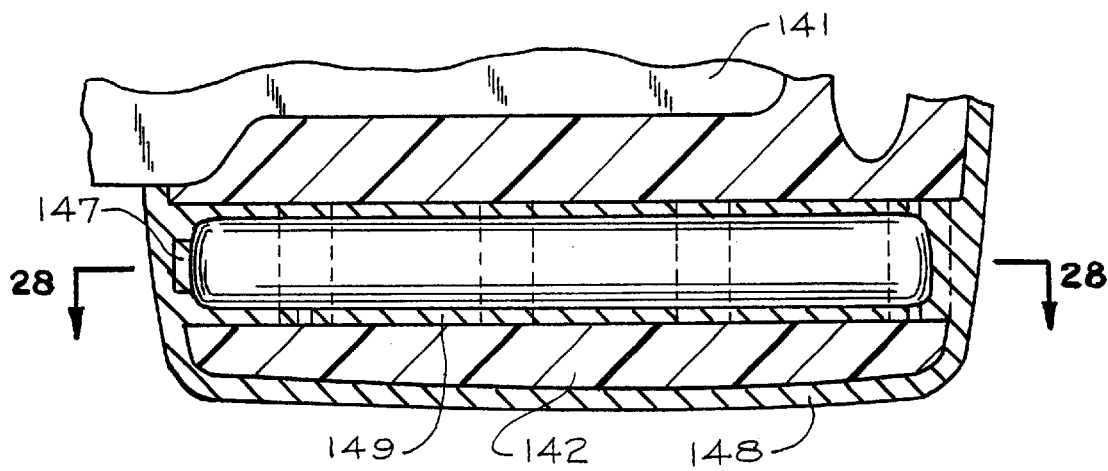
FIG. 27 is a fragmentary cross-sectional view taken along the plane of the line 27—27 in FIG. 3 illustrating the carrier and overmold.

Referring now to FIGS. 23–29, an eleventh embodiment of the key assembly for the present invention is illustrated. In this alternative embodiment, the key shank 140 comprises the heel end 141 which is integrally attached, by molding, to the undermold 142 containing the transponder 2. In this embodiment, the undermold 142 is preferably integrally molded around the heel end 141 of the key, and during the molding process simultaneously forms a cage for slidably receiving the transponder 2. This embodiment is best shown in FIG. 24. Thereafter, an overmold is formed to encase the key 140 and the undermold 142 with the transponder 2 within the cage as best illustrated in FIG. 27. The plastic material for the overmold, as well as the undermold 142, can be the same or different, but preferably the undermold 142 comprises a relatively hard plastic material and the overmold comprises a softer material. More specifically, the undermold material can be a high flow polypropylene having a melt index on the order of about 16–24, or a hydrocarbon resin material. The overmold material can be a soft polyvinylchloride (PVC) having a melt index on the order of about 60 to 80, or a thermoplastic rubber, such as that commercially available under the trade name Santoprene, for example.

Figure 29:
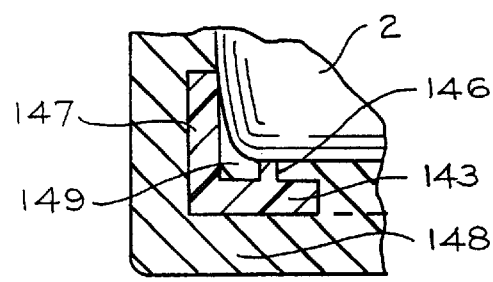
FIG. 29 is an enlarged fragmentary cross-sectional view illustrating a stop for properly positioning the transponder.

The cage illustrated in FIG. 24 for the transponder 2 is simultaneously formed with the undermold 142 and includes a longitudinal opening for receiving the transponder 2 formed by a plurality of spaced bars 143 each having an outer surface preferably flush with the outer surface of the undermold 142 and an inner arcuate surface 144 which conforms to the cylindrical circumference of the transponder 2 (best shown in FIG. 26). A plurality of openings 145 are formed opposite the arcuate surfaces 144 of each bar 143 in order to accommodate the male components of the mold and to receive the softer overmold material during the overmolding process as described below. As best shown in FIGS. 24, 25, 28 and 29, the two bars 143 adjacent each end of the undermold 142 preferably include a thin flexible membrane integrally formed therewith for engaging the transponder 2 and flexibly supporting the transponder 2 within the undermold 142. The membranes 146 preferably hold the transponder 2 in a position spaced inwardly from the arcuate surfaces to enable the softer overmold material to flow between the outer surface of the transponder 2 and the arcuate surfaces to provide cushioning for the transponder 2. A resilient stop 147 is formed at the end of the undermold 142 to engage the end of the transponder 2 and preferably to ensure that the transponder 2 is properly located within the cage formed by the undermold 142, as best shown in FIG. 29.

Figure 28:
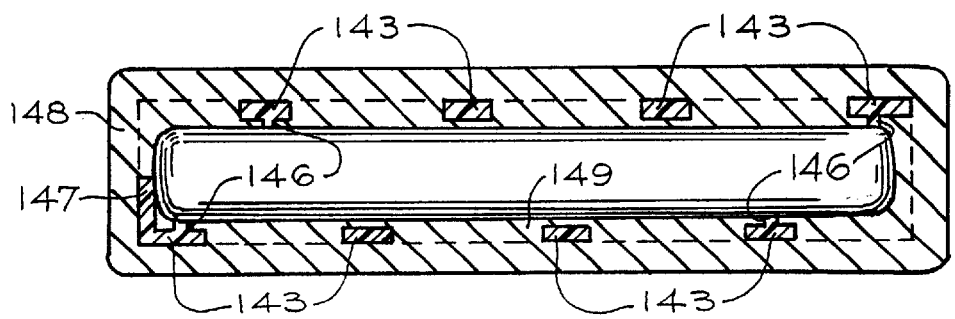
FIG. 28 is a cross-sectional view taken along the plane of the line 28—28 in FIG. 27.
Figure 30:
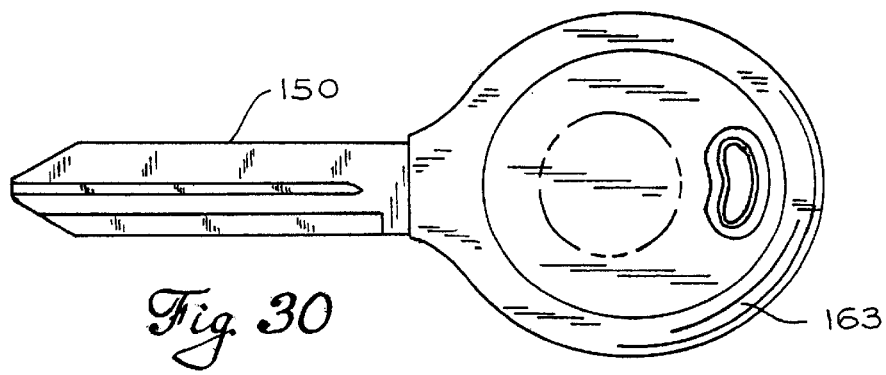
FIG. 30 is a side view of a twelfth embodiment of the key assembly of the present invention.
Figure 31:
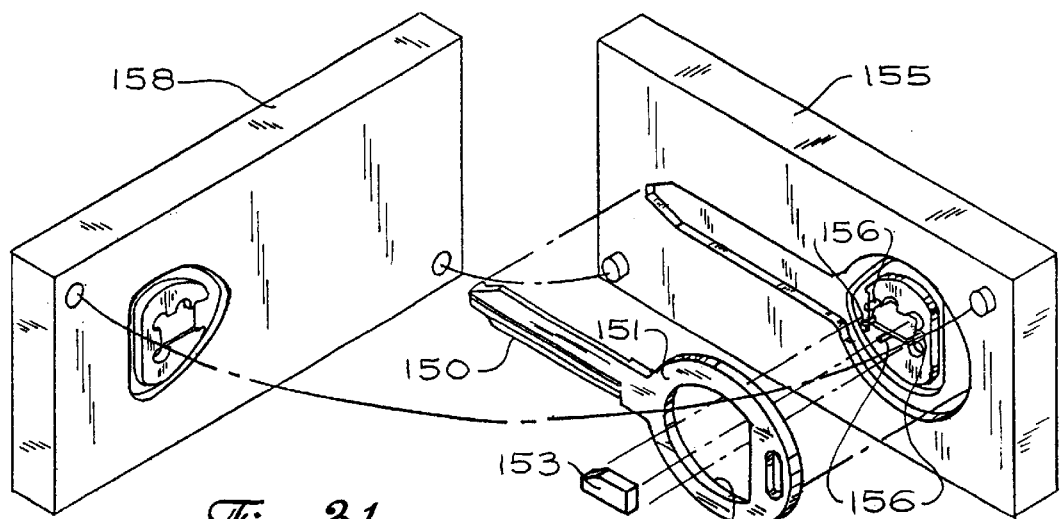
FIG. 31 is an exploded perspective view illustrating a key, a transponder and mold for forming the carrier for the transponder.
Figure 32:
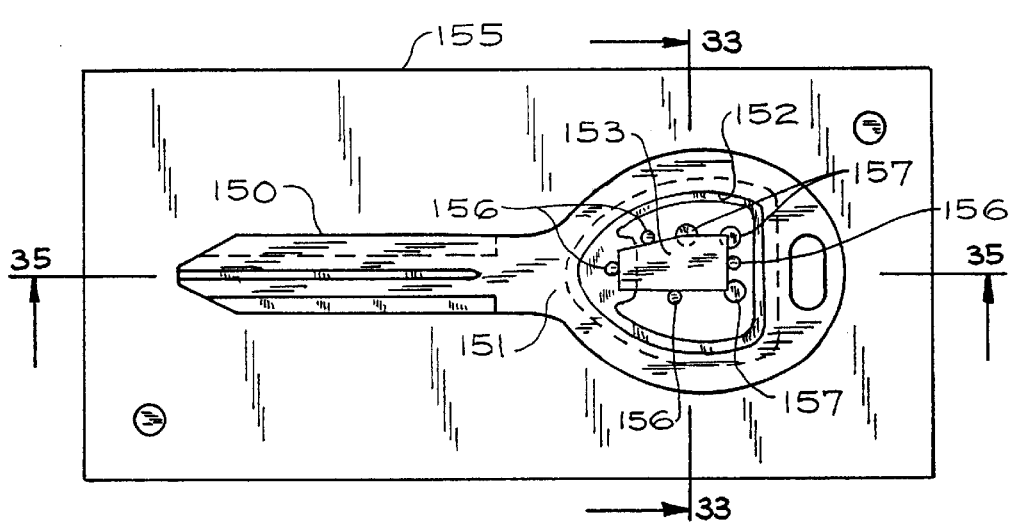
FIG. 32 is a plan view illustrating the key and the transponder in position just prior to mold the carrier.
Figure 39:
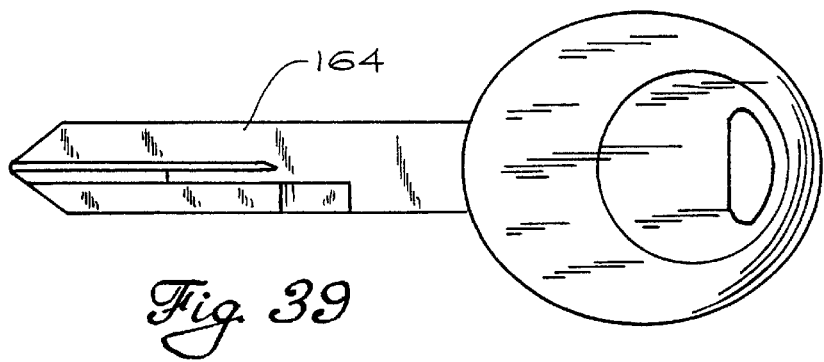
FIG. 39 is a side view of a thirteenth embodiment of the key assembly of the present invention.
Figure 40:
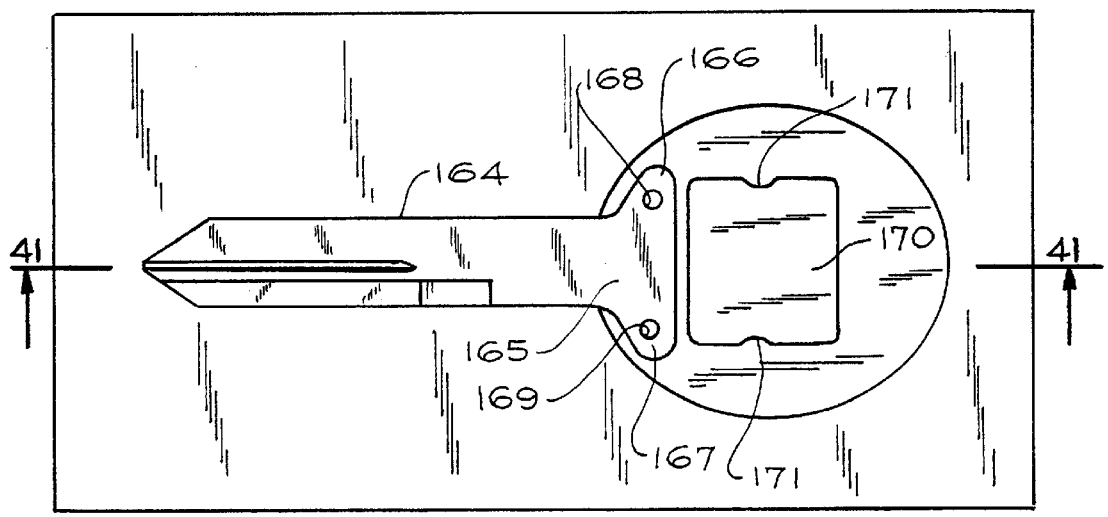
FIG. 40 is a side view of the key and the transponder within a mold plate prior to molding carrier for the transponder.

Referring now to FIGS. 27 and 28, the overmold is illustrated as comprising an outer shell 148 and a generally cylindrical layer 149 which surrounds the transponder 2. The outer shell 148 and the cylindrical layer 149 thus preferably provide a cushioning layer of material for the transponder 2 which prevents the transponder 2 from shattering or breaking in the event the key assembly of the present invention is accidentally dropped.

Referring now to FIGS. 30–38, a twelfth embodiment of the key assembly of the present invention is illustrated. In this alternative embodiment, the key shank 150 includes the heel end 151 formed as a substantially circular frame member having a central opening 152 for receiving the transponder 153 therein. In this alternative embodiment, the transponder 153 is substantially rectangular in shape in contrast to its being cylindrical in shape for previous embodiments. As best shown in FIGS. 31–36, the undermold 154 is formed around the transponder 153 and simultaneously attached to the substantially circular heel end 151 of the key shank 150. To accomplish this, the key shank 150 is positioned within a mold plate 155 such that the transponder 153 is within the central opening 152, best shown in FIGS. 31 and 32. The transponder 153 preferably is held in position in this central opening by four pins 156 which prevent the transponder 153 from moving forwardly, rearwardly, upwardly or downwardly. In order to prevent the transponder 153 from moving laterally, a plurality of raised bosses 157 can be employed. After a second mold plate 158 is closed to encompass the key shank 150 and the transponder 153 substantially, as shown in FIG. 33, plastic is injected into the mold to form the undermold 154, as shown best in vertical section in FIG. 34 and in longitudinal section in FIG. 36. Thereafter, the key shank 150, the heel end 151, the transponder 153 and the undermold 154 are preferably inserted into a second mold, as shown in FIG. 37, preferably having cavities 159, 160 formed in corresponding plates 161, 162. Plastic material is then injected into the mold cavities 159, 160 to form the overmold 163 which surrounds the transponder 153.

Figure 41:
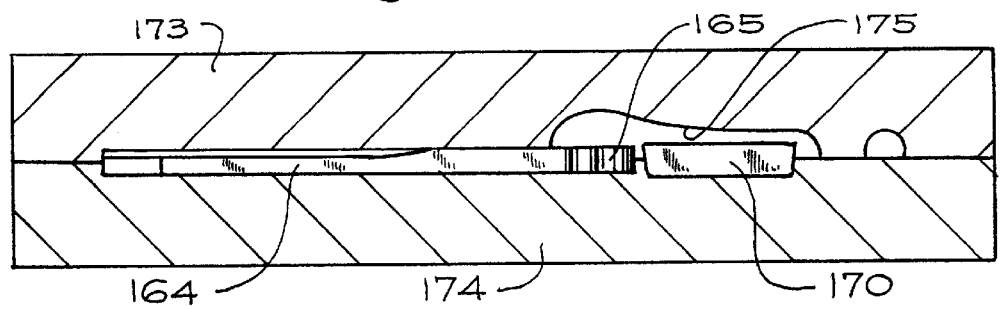
FIG. 41 is a cross-sectional view taken along the plane of the line 41—41 in FIG. 40.
Figure 42:
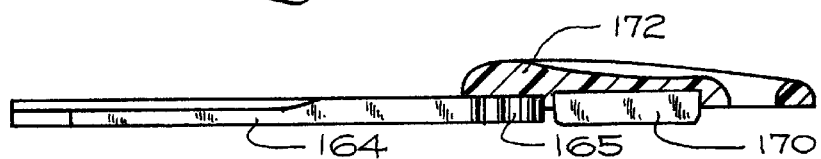
FIG. 42 is a cross-sectional view illustrating the key, the transponder and the carrier for the transponder after molding of the carrier.
Figure 43:
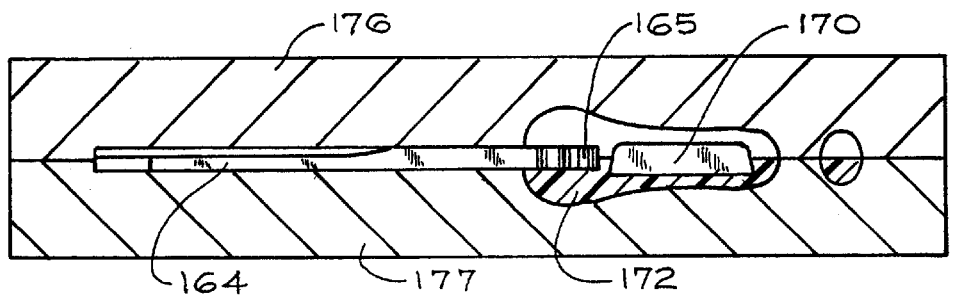
FIG. 43 is a cross-sectional view illustrating the key, the transponder and the carrier inserted within a mold prior to molding the completed key head.
Figure 44:
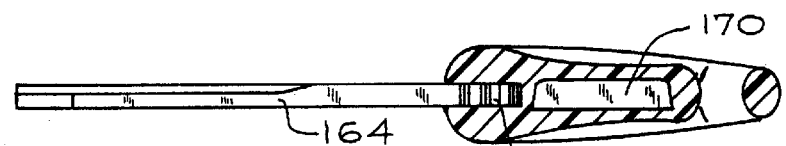
FIG. 44 is a cross-sectional view of the head portion of a key illustrating the completely molded head.

Referring now to FIGS. 39–44, a thirteenth embodiment of the key assembly of the present invention is illustrated. In this embodiment, the key shank 164 includes a shortened heel end 165 further comprising a pair of oppositely extending legs 166, 167. Each leg 166, 167 includes a corresponding opening 168, 169 formed therein. In this alternative embodiment of the present invention, the transponder 170 is substantially rectangular in shape and includes a pair of opposite, arcuate-shaped notches 171 formed on the upper and lower edges of this transponder 170. As best shown in FIGS. 41 and 42, the edges of the transponder 170 are slightly tapered from one side to the other. Transponder 170 is attached to the heel end 165 of the key shank 164 by a carrier 172, formed substantially as shown in FIG. 42, and forms half of the key head. To form the carrier 172, the transponder 170 and the key shank are substantially positioned between a pair of mold plates 173, 174 and mold plate 173 has a cavity 175 formed therein in the shape of one half of the desired configuration for the carrier 172 of the key head. After the plastic material is injected, the transponder 170 is attached to the key heel end 165 and simultaneously substantially one half of the grip portion of the key assembly is formed. The transponder 170 is preferably connected to the carrier 172 by molding the plastic material over the tapered edges of the transponder 170. The connection between the key shank 164 and the carrier 172 is enhanced because plastic material flows into the openings 168, 169 formed in the legs 166, 167 of the heel end 165. Thereafter, the other half of the grip portion of the key head is formed by placing the carrier 172, the transponder 170 and the key shank 164 into a mold containing plates 176, 177 as shown in FIG. 43. After molten plastic is injected and cooled, the completed key assembly produced is as illustrated in FIG. 44.

Referring now to FIGS. 45–51, a fourteenth embodiment of the key assembly of the present invention is shown. In this embodiment, the key shank 178 includes a shortened heel end 179 having opposite legs 180, 181 with respective openings 182, 183 formed through the legs 180, 181 of the shank similar to the key assembly previously described and illustrated in FIG. 40. The transponder 184 has a configuration identical to that described, with respect to the transponder 170 and is preferably integrally attached to this heel end 179 by an undermold 185. The undermold 185 is preferably integrally molded around the transponder 184 which is held in position by pins 196, 197 and is simultaneously attached to heel end 179 using a plastic material which preferably fills the openings 182, 183 in a manner similar to that previously described with respect to FIGS. 39–44. In this alternative embodiment of the present invention, however, the undermold 185 merely functions to interconnect the transponder 184 with the heel end 179.

Figure 49:
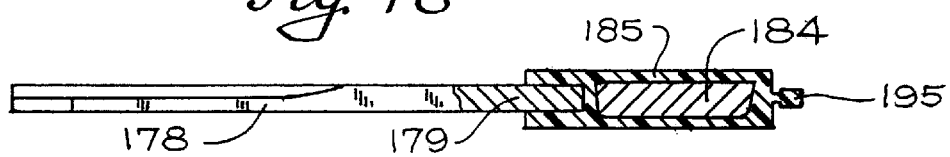
FIG. 49 is a longitudinal view similar to FIG. 48 after molding of the carrier.
Figure 50:
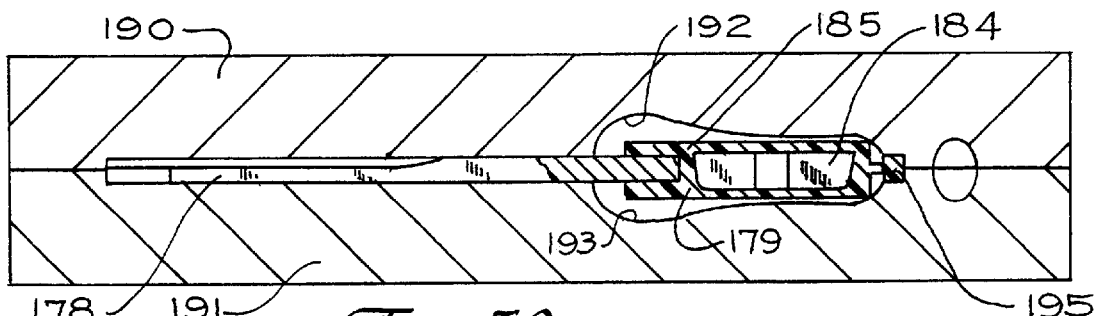
FIG. 50 is a view similar to FIG. 48 showing the key shank, the transponder and carrier positioned within a mold prior to overmolding the head portion of the key.
Figure 51:
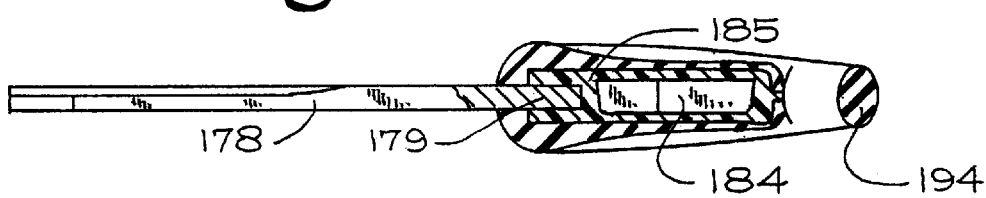
FIG. 51 is a longitudinal cross-sectional view of the key assembly of the fourteenth embodiment.

This is accomplished by placing the head portion of the key 178 and the transponder 184 within the mold plates 186, 187 and injecting molten plastic material to fill cavities 188, 189 to form the undermold 185, substantially as shown in FIG. 49. When forming the undermold 185, a tab 195 is preferably simultaneously formed along the edge of the undermold 185 that is opposite the key shank 178. Thereafter, the head of the key 178, the transponder 184, and the undermold 185 are placed into a second mold including mold plates 190 and 191. The mold plates 190 and 191 have respective mold cavities 192 and 193 conforming to the desired shape for the grip portion of the key assembly. Then, the mold is closed and plastic material is injected into the mold cavities 192 and 193, forming the overmold around the heel end 179, the transponder 184, and the undermold 185 to form the grip portion 194 for the key assembly, as illustrated in FIG. 51. The tab 195 functions to prevent the undermold 185 from flexing or moving with respect to the key shank 178 while the mold cavities 192 and 193 are being filled. Preferably, the tab 195 is broken off after formation of the key assembly is completed.

Background of the Problem

The inventors have discovered that a problem which affects the operation of RFID security systems involves a shift in resonant frequency of the transponder 2 (FIG. 52). Such a shift in the resonant frequency ultimately results in failure of the transponder to receive radio frequency signals being transmitted by the reader, or in the signals being transmitted to the receiver by the transponder being of weakened strength, resulting in the inability of the receiver circuit of the reader to detect the signals transmitted by the transponder. In either case, the security interlock system will prevent the vehicle engine from being enabled using the ignition key or otherwise. The shift in resonance is believed to result from mechanical effects which produce large and/or unevenly distributed mechanical forces on the transponder. These forces can affect the performance of the transponder by shifting the inductance of the coil 2b or capacitance of the capacitor 2c of the resonant circuit of the transponder 2 (FIG. 52).

These undesirable mechanical forces can be produced during use of the key assembly and/or as the result of ambient conditions. Moreover, these mechanical forces can result from conventional manufacturing techniques used to produce the key assembly. The most problematic forces are those produced by severe temperatures and/or by temperature changes which thermodynamically affect the mechanical structure of the transponder of the key assembly or the mechanical structure of the key assembly. Decreasing, with the ultimate goal of completely eliminating, the amount of resonance shift associated with the transponder can eliminate reliability problems described herein above concerning RFID ignition lock systems.

In known RFID ignition key assemblies, the head portion of the key assembly and the transponder mounted therein are enclosed within a relatively hard or rigid plastic material, typically polypropylene, that also secures the transponder to the key. The inventors have discovered that minimizing the amount of contact between the transponder and the rigid material used to secure the transponder to the key can reduce shift in resonance. Moreover, the inventors have found that reducing the bulk or mass of the rigid plastic material that is located adjacent to the transponder in the key assembly can also reduce the shift in resonance.

The problem involving a shift in resonance of the transponder's resonant circuit identified herein above has both mechanical and thermal considerations. While both mechanical and thermal considerations are incorporated in the present invention to decrease or substantially eliminate such shift in resonance to make the RFID system more dependable, these aspects of the problem have conflicting solutions. Thus, mechanical considerations are addressed primarily in the structural design of the key assembly, including the shape of the key used in the key assembly and the configuration of the undermold. Thermal considerations are addressed through careful selection of materials, structure and manufacturing processes so that adverse effects on the transponder of thermal expansion and contraction are minimized. As will be shown, preferred embodiments of the transponder mounting arrangement according to the invention balance structural support for the transponder with considerations that minimize degradation to radio frequency signal transmission.

As is indicated above, the present invention addresses a number of concerns that affect operation of the transponder. One concern is breakage or other degradation of the transponder due to mechanical forces that are applied to the transponder during the molding processes. Another concern is degradation of the transponder that could result due to the heat that is applied to the transponder during the molding process. A further concern is degradation that can be caused by shrinking or contracting of the undermold and/or overmold material during cooling of the key assembly following the molding operation.

Figure 53:
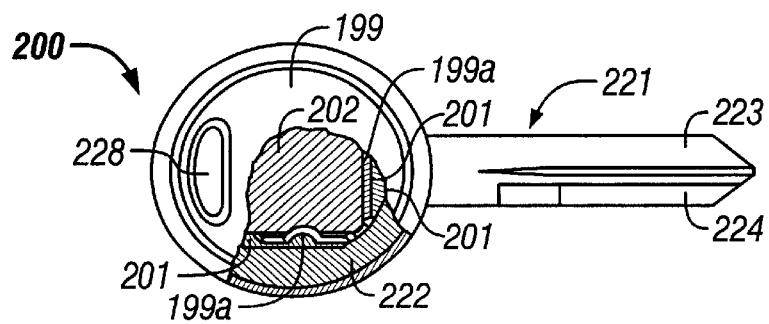
FIG. 53 is a view of the key assembly of a fifteenth embodiment, partially broken away to show the transponder mounted on the key and the undermold that affixes the transponder to the key of the key assembly.

Briefly, FIG. 53 illustrates another alternative embodiment of a key assembly 200 provided by the invention. In accordance with the invention, a transponder 202 is mounted to a key, such as the key 221 shown in FIG. 55A, using a two-stage process in which first an undermold 201 is formed and then an overmold 199 is formed. The undermold 201 frames and supports the transponder 202 within the head portion 222 of the key 221. The undermold 201 maintains the transponder substantially immobile within the key. In addition, the undermold 201 forms a base onto which the overmold 199 is subsequently molded. The overmold 199, which is shown partially broken away in FIG. 53, covers or encloses the transponder 202, the undermold 201 and the head portion 222 of the key. In addition, as will be described, portions of the overmold material, indicated by the reference numeral 199a, fill voids that are created in the undermold 201 between the head portion 222 of the key and the transponder 202 during the process of forming the undermold. This two-step molding process ensures proper filling of surface blemishes caused by gating, locating or other initial molding and mounting considerations. In this embodiment, preferably the undermold 201 comprises a relatively hard plastic material, such as a high flow polypropylene, and the overmold 199 comprises a softer material, such as PVC, or a thermoplastic rubber such as that commercially available under the trade name Santoprene.

The transponder mounting arrangement according to the invention provides a compromise between: a) factors related to providing a mechanically sound package; and b) factors related to minimizing thermodynamic effects and to the effects of mechanical forces applied to the key assembly, particularly the transponder and its associated mounting structure. To these ends, the relatively hard plastic undermold material 201 is used to secure the transponder to the key. However, as will be described, a point contact approach is used to minimize the amount of contact between the relatively hard undermold material and the transponder. In addition, the bulk or mass of the undermold material is minimized at points for those portions of the undermold material that are disposed adjacent to and/or in contact with the transponder. This is accomplished, for example, by configuring the undermold material as relatively thin strips that extend along the periphery of the transponder, and/or by providing voids or recesses along the periphery of the transponder. Filling such voids or the gaps between the thin strips with the relatively soft material that forms the overmold portion of the key assembly (as will be shown) can reduce degradation of the RFID signal.

In accordance with another aspect of the invention, mechanical forces that are applied to the key assembly during use of the key assembly, as well as under certain other conditions, are redistributed in such a way as to minimize the affect of such forces on the performance of the transponder. The redistribution of mechanical forces is provided by the transponder mounting arrangement of the undermold portion of the key assembly as will be described in detail. This is a particularly important aspect of the invention with respect to ensuring the integrity of the transponder. Thus, in accordance with the invention, the undermold is configured to minimize the application of mechanical forces where the transponder is weakest. This reduces the likelihood of deterioration of or damage to the transponder and consequential shift in the resonance of the transponder.

Transponder Configurations

To better understand the mechanics of the problem, it is helpful to have a basic knowledge of the fundamental types of transponders that are used in the industry. Most commercially available transponders have generally flat, elongated or rectangular packages which do not provide a completely rigid structure, and as such, are capable of being flexed to some extent. In many applications, the transponder components are mounted on a printed circuit board or other relatively rigid support and the transponder is contained within an enclosure which affords a degree of protection against deformation of the transponder in use, e.g., glass vials. This is generally not the case, however, for the transponders that are used in key assemblies for RFID systems and the like, and in which forces applied to the key are coupled or translated to the transponder through its enclosure, i.e., overmolded plastic case. Such forces can result in temporary or permanent deformation of the transponder, which can affect the performance of the electronic circuits of the transponder. The susceptibility of the overmolded plastic cased transponder to these forces is dependent upon several factors, including the physical layout of the electronic circuits of the transponder, the nature of the mechanical mounting of the transponder to the key, and the direction of the forces applied to the transponder.

Referring to FIG. 52, typically, the transponder circuit 2a is located at one side of the package and the coil 2b is located at the opposite side of the package. The region of the package that is held rigid due to mounting can affect the performance of the transponder when undesirable stress forces are applied to the package for any reason. The transponder is most vulnerable to impact forces that are applied where the transponder is weakest. For example, breakage or other damage to the transponder can occur due to mechanical forces that are applied to the transponder during the molding processes. Moreover, damage to the transponder can result due to temperature excursions during manufacture of the key assembly. For example, because the plastic material must be injected in liquid form during the molding operation, the heat applied to the transponder during the molding process can damage to the transponder. In addition, damage to the transponder can be caused by shrinking or contracting of the undermold material during cooling of the key assembly following the molding operation. Moreover, temperature excursions can result in to a change in operating characteristics of the transponder. Finally, post-molding temperature excursions can cause shrinkage or expanding of the molded material(s), producing mechanical forces on the transponder.

Figure 54A:
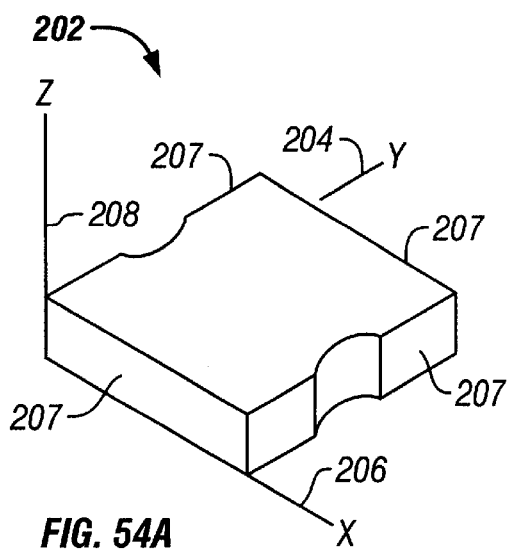
FIG. 54A is an enlarged, isometric view of one embodiment of a transponder for the key assembly of the invention.

Referring to FIG. 54A, there is illustrated an enlarged isometric view of a transponder 202 that has one of the transponder configurations that are commonly used for RFID applications. Transponders having this configuration are commercially available from Motorola, Inc., as part no. 05504-001. The transponder 202 is generally rectangular in shape and is overmolded with a plastic material. By way of example, transponder 202 typically is approximately ¾ inch along its long or "y" axis, indicated by reference numeral 204 in FIG. 54A, and approximately ½ inch along its short or "x" axis, indicated by reference numeral 206. The transponder 202 is approximately ⅛ inch thick along its "z" axis 208. The transponder 202 has a compact rectangular side profile, with the side surfaces 207 being relatively long and relatively thin. This configuration makes the transponder susceptible to deformation along both the x axis and the y axis because the x axis and the y axis are the weakest axes for transponders having the configuration of the transponder 202 depicted in FIG. 54A.

As will be readily apparent to those of ordinary skill in that art, because of the length and relative thinness of the transponder 202 along its x and y axes, the application of forces along either of those axes due to a bending moment caused by a force directed along the weak axis, will subject the transponder to potentially damaging forces. Such forces can deform the transponder to such an extent as to impair the operational state of the transponder, and possibly even fracture the transponder. Therefore, in accordance with the invention, the undermold that is provided for securing transponders that are configured substantially as the transponder 202 depicted in FIG. 54A, is designed to minimize, and preferably eliminate to the extent possible, the application of forces near opposing edges of the transponder both along the y axis and along the x axis.

Figure 54B:
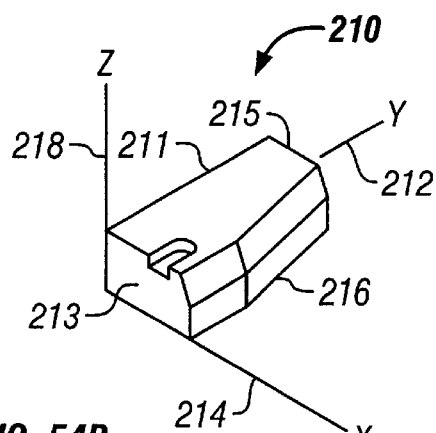
FIG. 54B is an enlarged, isometric view of another embodiment of a transponder for the key assembly of the invention.

Referring to FIG. 54B, there is shown an enlarged isometric view of a transponder 210 that has another popular configuration that is commonly used for RFID applications. Examples of transponders having this configuration are produced by Texas Instruments, Inc., and are commercially available as Texas Instruments, Inc. part no. RI-TRP-W9WK, which is a read/write transponder, and Texas Instruments, Inc. part no. RI-TRP-B9WK, which is an encrypted transponder. The transponder 210, which is commonly referred to as a "wedge" transponder, is generally trapezoidal in shape. The transponder 210 is approximately ½ inch in length along one side 211 which extends along the "y" axis, indicated by reference numeral 212 in FIG. 54B. The transponder 210 is approximately ¼ inch in width along one end 213, extending along its short or "x" axis, indicated by reference numeral 214, and tapers along side 216 to approximately 3/16 inch in width at the opposite end 215, which also extends along the x axis 214. The transponder 210 is approximately ⅛ inch thick along its "z" axis 218. Transponders that have the configuration of transponder 210 are most susceptible to deterioration and damage as the result of mechanical forces directed along the y axis which is represented by reference numeral 212 in FIG. 54B. The Texas Instruments, Inc. type transponder has advantages and disadvantages that are similar to those for the Motorola, Inc. style transponder illustrated in FIG. 54A. Therefore, the undermold or support structure for holding transponders configured substantially as the transponder 210 depicted in FIG. 54B, is designed to minimize, and preferably eliminate to the extent possible, the application of forces along the y axis thereof.

Key Shapes

A further consideration is that the configuration of the transponder that is used dictates to some extent the configuration of the key that is used for a given key assembly. The configuration of the key can provide structural stability for the entire key assembly. The selection of the configuration of the key which provides the basic support structure for the key assembly requires a tradeoff. On the one hand, a key having a large amount of metal provides a more rigid structure that better withstands the torsional forces that are applied to the key assembly in use, and during thermal expansion and contraction, and results in a smaller portion of the force being translated through the key to the transponder mounted thereon. On the other hand, a larger amount of metal results in a higher susceptibility to detuning the transponder and interference with the signal by the metal key material.

In preferred embodiments of the present invention, the head and the blade of the key preferably are made of a substantially rigid metal as is the convention in the automotive industry. Brass is the most common metal used to construct vehicle ignition keys because of its manufacturability, cost and compatibility with the tumblers of the lock.

Figure 55A:
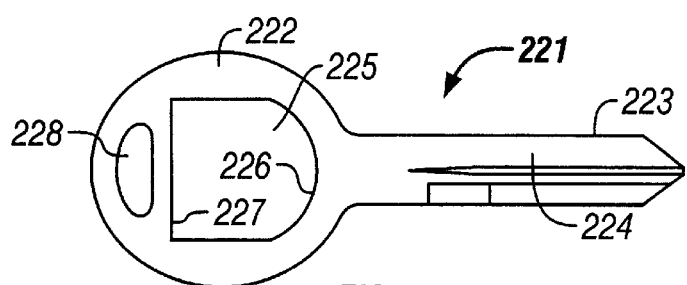
FIGS. 55A–55E illustrate various embodiments for the head portions for keys for key assemblies provided in accordance with the invention.
Figure 55B:
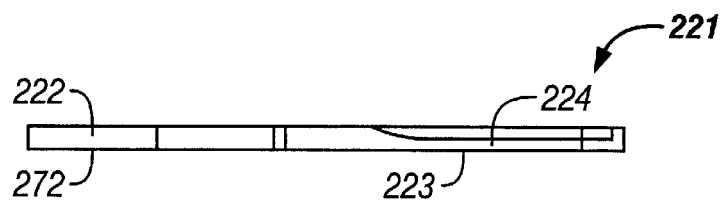

One preferred embodiment of the key 221 is shown in FIGS. 55A and 55B. The key 221 includes a head portion 222 and a blade or shank portion 223. The shank portion 223 of the key is milled at 224 to match the keyway and can include bits in the conventional manner to engage tumblers in the ignition lock. As is shown in FIG. 55B, the thickness of the rigid metal portions of the head portion 222 and the shank portion 223 of the key 221 are substantially uniform except, of course, at locations at which the milling 224 has been preformed to accommodate the keyway of the ignition lock for a particular vehicle with which the key is used.

The head portion 222 of the key 221 is generally oval in shape and contains an opening 225 that is located substantially in the center of the head portion 222. The opening 225 in the head portion 222 has a generally D-shaped configuration and extends axially from the head portion 222 to the shank portion 223 of the key 221, with the curved side 226 of the opening 225 being located proximal to the blade of the key and the opposing straight side 227 of the opening being located distal of the blade. The opening 225 is large enough to allow a transponder, such as transponder 202 (FIG. 54A), to be placed within the opening 225 spaced from the metal portion of the key 221. One preferred placement of a transponder 202 within the head portion 222 of the key 221 is shown in FIGS. 53 and 56C, for example.

Figure 56A:
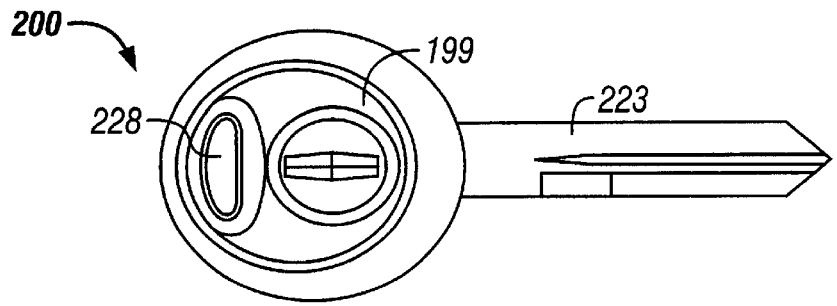
FIGS. 56A–56G illustrate the fifteenth embodiment of the key assembly provided by the invention, and shown in FIG. 53.
Figure 56B:
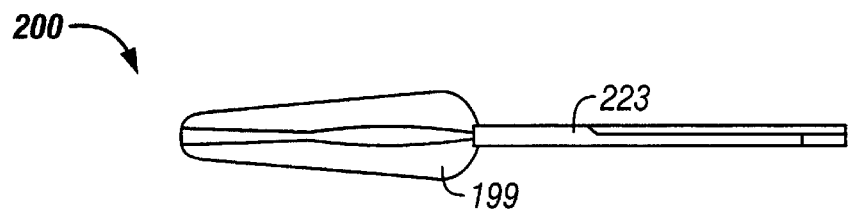
Figure 56C:
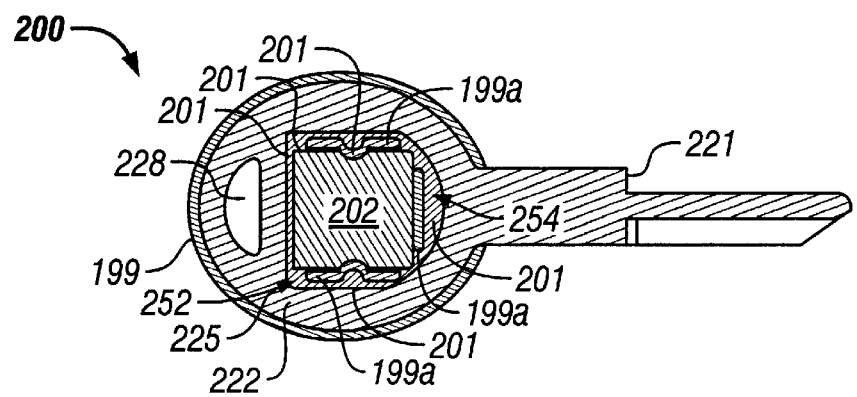

Referring also to FIG. 56C, in a highly preferred embodiment of the invention, the opening 225 (FIG. 55A) in the head portion 222 of the key 221 is large enough to provide at least 5 mm of clearance on each side of the transponder coil. As is known, metal interferes with the transmission of radio frequency signals under some circumstances, and the gap provided between the sides of the transponder 202 and the metal of the key 221 reduces the extent to which the metal material of the key interferes with transmission of radio frequency signals by circuits of the transponder and the reception of radio frequency signals by the circuits of the transponder. The gaps between the sides of the transponder and the key are filled in part with undermold material 201, and in part by overmold material portions 199a, as is shown in FIG. 56C, for example.

Referring to FIGS. 55A and 56A, in preferred embodiments of the present invention, a slot 228 is provided in the head portion 225 of the key on the side of the head opposite the shank portion of the key. The slot 228 permits the key assembly to be placed on a key ring or key chain and stored with the vehicle operator in a conventional manner. Preferably, the slot 228 is relatively small as compared to the opening 225 provided in the head portion of the key.

The D-shape configuration of the opening 225 in the head portion 222 of the key 221 is preferable because this configuration permits numerous configurations for the undermold of the present invention as will be discussed below. Additionally, the D-shaped configuration of the head of the key provides a more rigid key assembly because the underlying metal portion defines the support structure. The key assembly is configured as a closed loop that extends around the entire finger grip portion of the key and completely encircles the transponder 202 mounted on the key as is shown in FIG. 56C. Thus, this key configuration better absorbs torsional and bending forces applied to the key assembly in use.

While in one preferred embodiment shown in FIG. 55A, the opening in the head portion of the key 221 has a generally D-shaped configuration that is particularly suitable for mounting the transponder 202, the opening in the head of the key can be configured to accommodate any number of different configurations of transponders, such as the transponder 210 shown in FIG. 54B, for example. Thus, in accordance with a further embodiment shown in FIG. 55C, the key 231 includes a head portion 232 that is substantially solid, but which is shaped to define an open portion or notch 233, i.e., providing a part of the head of the key in which there is no metal. The shank portion 223 includes a milling 224 in the manner of key 221 shown in FIG. 55A. The thickness of the rigid metal portions of the head portion 232 and the shank portion 223 of the key 231 are substantially uniform except, of course, at locations at which the milling 224 has been preformed. The open portion 233 of the metal head portion of the key comprises approximately a quarter segment, i.e., about 90° or less, of the generally oval peripheral edge of the key head portion. In this embodiment, the head portion 232 of the shape of the head portion of the key resembles a question mark ("?"). The mounting area for the transponder, such as transponder 210 shown in FIG. 54B, is defined by the relatively small open portion 233 (90° or less) of the head portion of the key 231. One example of a key assembly 400 including such a transponder 210 is shown in FIGS. 61A–61E. Because most of the head portion 232 of the key 231 is solid, except for the region 233, the key provides a degree of resistance against shear and torsional forces. Consequently, this key head configuration, like that for the key 221 of FIG. 55A, reduces susceptibility to force problems because of the relatively solid head configuration which increases structural strength and reduces the forces transmitted and imposed upon the transponder. Further openings 234 are preferably provided through the head portion 232 to facilitate interconnection of the two halves of the overmold during fabrication of the key assembly 400 including the key 231 as will be described.

Figure 55C:
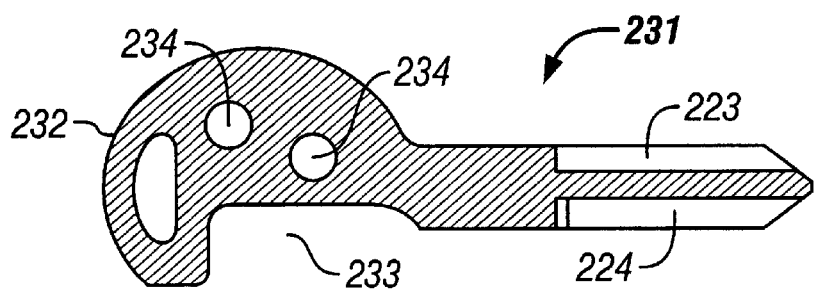
Figure 55D:
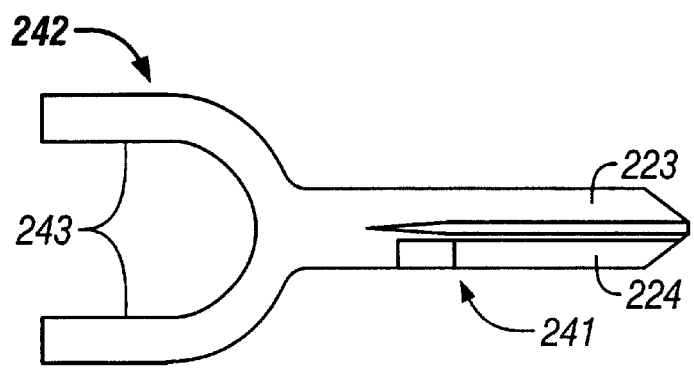
Figure 55E:
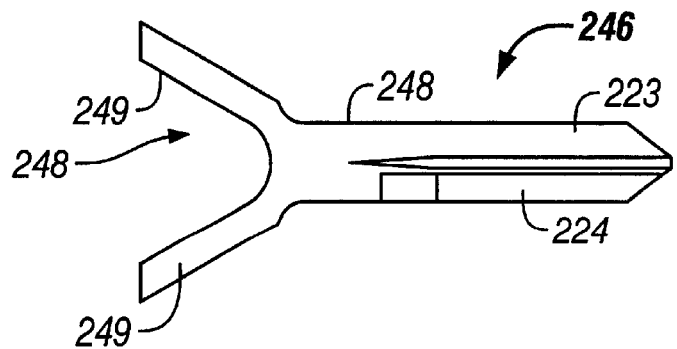

Referring to FIG. 55D, in an alternative embodiment of the key 241, the head portion 242 comprises two arcuate arms 243 that extend away from the shank portion 223 of the key. The arcuate arms 243 provide increased structural strength for the key assembly and reduce the transmission of forces to the transponder as compared to key assemblies employing the generally T-shaped key shown in FIG. 45, for example. In accordance with yet another embodiment of a key 246, which is shown in FIG. 55E, the head portion 248 of the key is substantially Y-shaped and includes two arms 249 that extend beyond the base of the shank portion 223 of the key in the manner of arms 243 of key 241 (FIG. 55D). A key ring opening or slot can be formed in the overmold of the key assembly of the present invention as will be discussed herein below.

It is pointed out that keys having various configurations for the key head portions have been illustrated for the purpose of showing the latitude in support structures, i.e., keys, that can be used in producing the key assembly in accordance with the invention. It will be apparent to those of ordinary skill in the art that a number of other alternative support structures, such as those shown in FIGS. 1–51, can be used in the key assembly of the present invention. Moreover, any of the alternative key configurations discussed above can be modified to further include the slot for placing the key assembly of the present invention on a key ring or other comparable storage device.

Force Distribution

Referring again to FIG. 53, the following description provides additional structural and functional detail of the undermold of a key assembly, such as the undermold 201 for the key assembly 200. Additional detail is provided regarding the manner in which the undermold is configured to offset mechanical considerations that contribute to shift in the resonance of a transponder, such as a transponder 202 having a physical layout shown in FIG. 54A, for example. Although the following description refers to the transponder 202, the description also applies to transponders having other configurations, such as the transponder 210 shown in FIG. 54B of the key assembly 400 shown in FIGS. 65A–65B, for example, or undermold structures used in these embodiments.

As has been stated above, preferred embodiments of the mounting arrangement according to the present invention balance structural support for the transponder with considerations that minimize interference with radio frequency signal transmission. To this end, the mounting arrangement for key assembly 200, which includes an undermold 201 and an overmold 199, provides a compromise between providing a mechanically sound package and minimization of adverse thermal effects. This compromise takes into account the effects of external mechanical forces applied to the key assembly, and in particular to the transponder 202 and its associated mounting structure, e.g., the undermold 201 provided by the invention.

The force and redistribution provided by the undermold 201 of the key assembly 200 is a particularly important aspect of the invention with respect to ensuring the integrity of the transponder 202. The undermold 201 is formed of a material that is suitable for rigidly attaching the transponder to the key and consequently comprises a material that is harder than the material of the overmold 199 for this preferred embodiment. In accordance with one aspect of the invention, the undermold 201 contacts the transponder 202 along surfaces of the transponder such that forces applied along the weaker axis, or axes of the transponder are distributed so as to minimize the magnitude of the force applied at any point along a weak axis of the transponder.

The overmold 199, which encloses the transponder 202, the undermold 201 and the head portion 222 of the key 221, is preferably formed of a material that is softer than the material of the undermold 201 to reduce external forces applied to the transponder by the substantially rigid undermold material. Preferably, the undermold and the overmold are formed using a two-step injection molding process as will be described.

Embodiments With Support Structure

Referring to FIGS. 56A–56E, which illustrate further views of the embodiment of the key assembly 200 shown in FIG. 53, the key assembly 200 includes the transponder 202 of FIG. 54A and the key 221 of FIG. 55A, and accordingly, corresponding elements have been given the same reference numerals as in FIGS. 54A and 55A. The undermold 201 frames and supports the transponder 202 within the head portion 222 of the key 221. The undermold 201 is formed of a relatively hard plastic material, such as a high flow polypropylene as described above, and rigidly attaches the transponder 202 to the key, maintaining the transponder substantially immobile within the key. The overmold 199 is formed of a material such as a soft PVC or a thermoplastic rubber, such as that commercially available under the trade name Santoprene, for example, or other similar material that is softer than the material of the undermold.

More specifically, FIGS. 57A–57E illustrate the key assembly 200 prior to the formation of the overmold and in FIGS. 57A–57E, this key "sub-assembly" has been given the reference numeral 200'. The undermold 201, which couples the transponder to the head of the key, comprises a frame or support structure 252 and a mounting structure 254. In this embodiment, the undermold 201 is designed such that the surface area of the relatively "hard" plastic material that forms the frame structure 252 that physically contacts the transponder 202 is minimized. In addition, the mass of "hard" plastic material that forms the mounting structure 254 generally is spaced from the transponder and the portion of the "hard" material that is located in the proximity of the transponder is kept as small as possible.

To these ends, the frame structure 252, by which the transponder 202 is held in position relative to the head portion of the key, comprises a plurality of tabs 261–264 and 271–274, shown in FIGS. 57D and 57E, for example. The design configuration of the tabs 261–264 and 271–274 of the undermold and their locations around the periphery of the transponder are dictated by the configuration of the transponder as well as the shape of the key. For the embodiment illustrated in FIGS. 56A–56G, the tabs are located at the corners of the generally rectangular transponder. In this embodiment, the frame structure 252 includes a first series of the tabs 261–264 located at the corners of the planar surface 260 of the transponder 202 and a second series of the tabs 271–274 located at the corners of the opposing planar surface 276 of the transponder. As is discussed above, the weak axes for the transponder 202 extend along both the x axis and the y axis. Because both the x and y axes are weak axes for this transponder configuration, the frame structure is configured to minimize the effect on the transponder of any forces directed along both the y axis and the x axis.

Each of the tabs provides substantially point contact with the transponder 202 for the undermold material. The tabs 261–264 and 271–274 are preferably produced as an integral portion of the undermold. Moreover, in accordance with the invention, the relatively massive sections of the "hard" plastic material, specifically those sections which form the mounting structure 254 of the undermold, are spaced apart from the transponder. Keeping the majority of the "hard" plastic material of the undermold spaced from the transponder reduces the likelihood that the mechanical expansion and contraction of the "hard" plastic material surrounding the transponder will affect the transponder and, consequently, the likelihood that the integrity or operability of the electrical circuits and/or the coil associated with the circuits of the transponder 202 will be degraded.

The frame structure 252 of the undermold retains the transponder 202 on the key 221 while decreasing shift in the resonance of the transponder 202. The frame structure 252 supports the transponder 202 such that mechanical forces imposed upon the transponder 202 are minimized and properly distributed, whether such forces result from forces applied to the exterior of the key assembly or are produced by thermal expansion or contraction of the overmold or undermold. This reduces the likelihood of deterioration of the transponder which could otherwise affect the performance of the transponder, as for example, by producing a shift in the inductance of the coil of the transponder. The preferable placement of the tabs of the frame structure 252 relative to the transponder varies depending on the configuration of the transponder and the configuration of the head of the key.

Figure 57A:
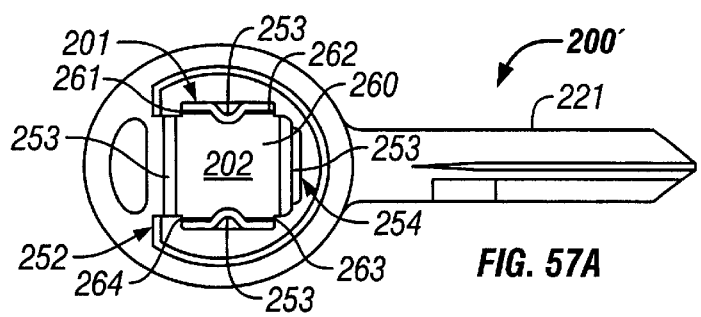

In some preferred embodiments of the invention that include key assembly 200, the undermold 201 does not completely cover the transponder 202. Rather, as shown in FIG. 57C, the frame structure of the undermold 201, represented by tabs 261, 262 and 271, 272, for example, overlies and/or contacts only very small portions of the opposing planar surfaces 260 and 276 of the transponder 202.

Figure 45:
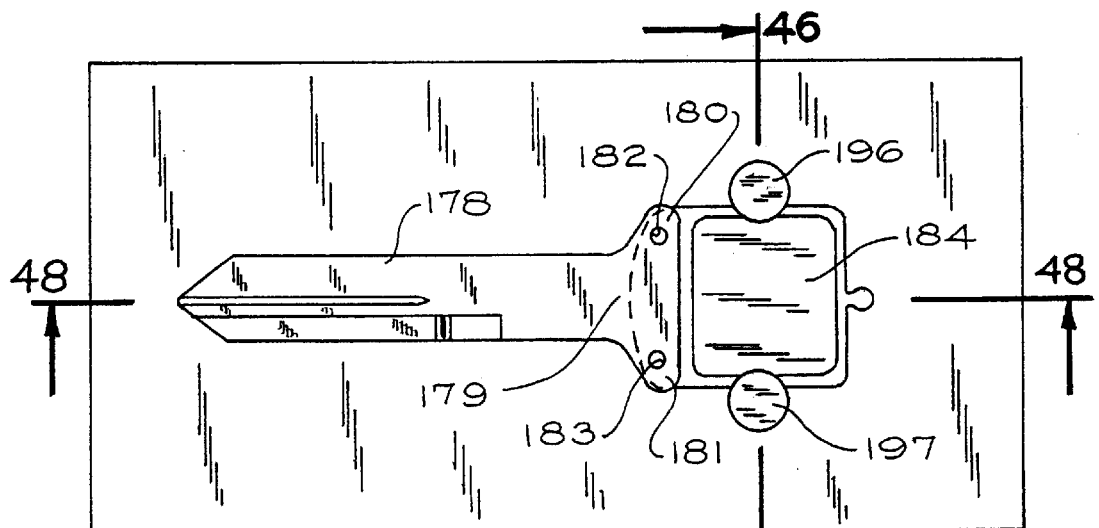
FIG. 45 illustrates a key and transponder within a mold prior to molding the carrier for a fourteenth embodiment of the key assembly of the present invention.
Figure 46:
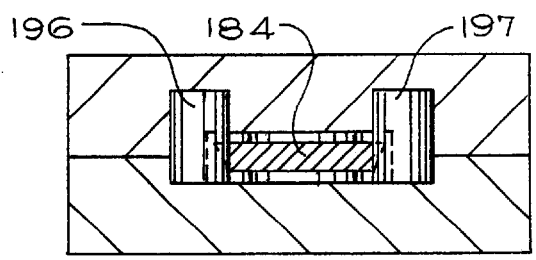
FIG. 46 is a cross-sectional view taken along the plane of the line 46—46 in FIG. 45.
Figure 47:
FIG. 47 is a view similar to FIG. 46 illustrating the transponder connected to the key by a molded carrier.
Figure 48:
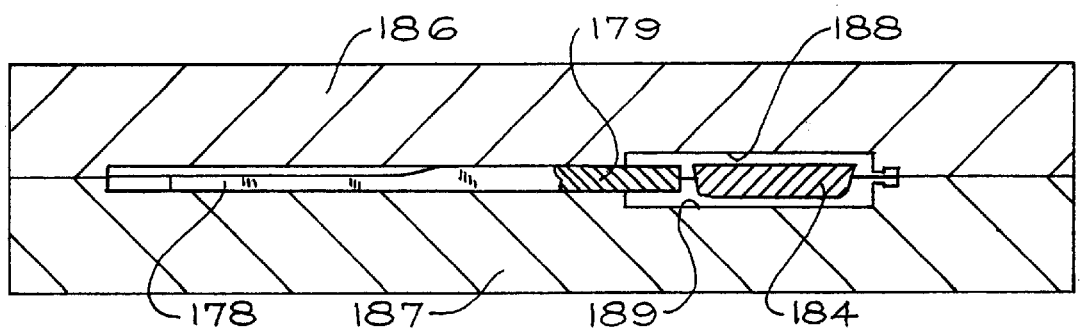
FIG 48 is a longitudinal cross-sectional view taken along the plane of the line 4—48 in FIG. 5 prior to molding the carrier.
Figure 57B:
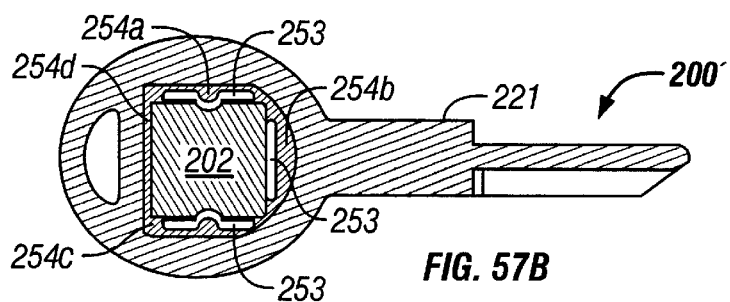
Figure 57C:
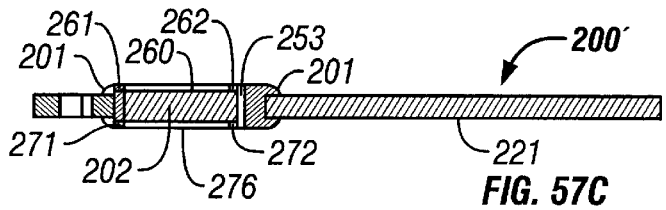

Moreover, the mounting portion 254 of the undermold 201, as represented in FIG. 57B by portions 254a, 254b, 254c and 254d, is disposed along the peripheral edge portions of the transponder, in contact therewith or spaced apart from the transponder as will be shown. Stated in another way, with respect to the rigid undermold material 201, a point contact method is used for securing the transponder to the key and a minimal amount of the undermold material is located in contact with or adjacent to the transponder of the key assembly. The frame structure securely holds the transponder, but can only apply a minimal amount of force to the transponder. As a result, undesirable externally applied forces which are applied to the key are strategically and deliberately directed to reduce their effect on the transponder. In some preferred embodiments, the mounting structure 254 also defines at least a portion of the outer surface of the key assembly that is gripped by a user of the key assembly. Moreover, the use of the hard overmold enables truncation of the metal portion of the key, as for key 179 (FIG. 45).

Figure 56D:
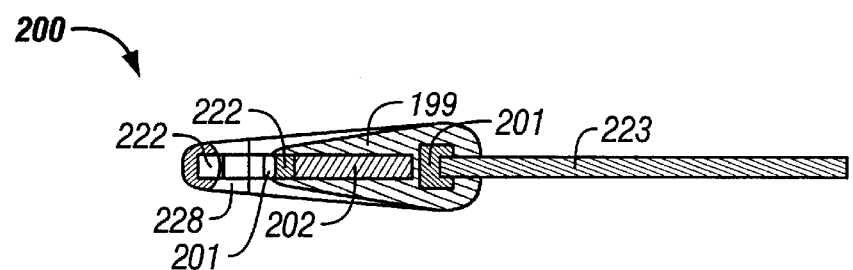
Figure 56E:
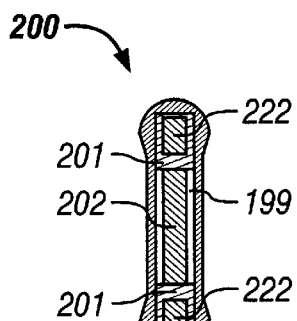
Figure 56F:
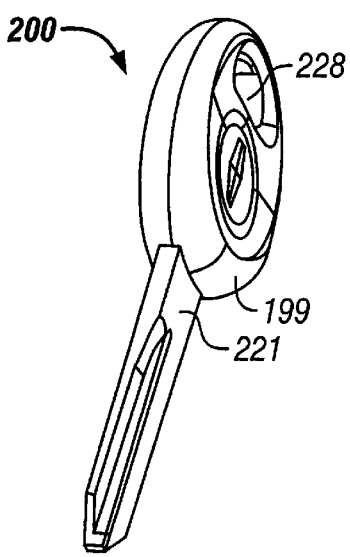
Figure 56G:
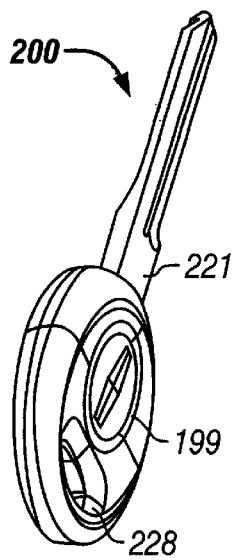

Thus, the undermolding process secures the transponder 202 to the key 221. The overmolding process encloses or encapsulates the transponder and also defines the primary finger gripping surface for a user of the key assembly as shown in FIGS. 56F and 56G. In addition, the overmolding step covers cavities or marks left by transponder positioners in the mold and flaws, such as blemishes, pinholes, and the like in the undermold. The use of the two-stage process minimizes the amount of contact between the transponder 202 and the relatively hard undermold material that supports the transponder during the second stage of the process. The first stage of the two-stage process includes forming the undermold 201 for framing and supporting the transponder within the head of the key. The second stage of the process includes overmolding the transponder and the undermold 201 with the overmold material 199. As shown in FIGS. 56C and 56D, the overmold 199 covers the transponder 202, the undermold 201 and the head portion of the key. Portions of the overmold material, indicated by the reference numeral 199a, fill the voids that are created in the undermold material 201 during the process of forming the undermold.

Consequently, this reduces the effects of expansion and contraction of the plastic components surrounding the transponder. Thermal expansion and contraction of the plastic components surrounding the transponder have been found to be a significant factor in causing deterioration of transponders, resulting in a shift in inductance of the transponder coil and/or a shift in the capacitance of the capacitor, in turn causing a shift in resonant frequency for the transponder circuit. The inventors have determined that the use of point contact methods for supporting the transponder on the key helps preserve the integrity and operational state of the transponder in the event of thermal expansion and contraction of the plastic of the undermold 201 and the overmold 199. The invention preserves the transponder's integrity, regardless of whether the expansion or contraction is initiated by molding thermal excursion or by environmental thermal excursion. Molding thermal excursion generally produces expansion and contraction of a plastic material during injection molding operations. Environmental thermal excursion occurs as the result of environmental conditions during use of the key assembly.

FIGS. 58A and 58B show a simplified representation of the transponder 202 and the frame structure 252 of the undermold which are shown enlarged to illustrate the relationship between the frame structure 252 and the transponder 202. In FIG. 58A, each of the rectangular solids represents a portion of the frame structure 252 and these portions of the frame structure are formed integrally with the mounting structure 254 as is shown in FIGS. 57A, 57D and 57E, for example. The tabs have relatively thin planar surfaces that extend coincident to the surface of the transponder lying along the y axis as defined in FIG. 54B. The thickness "t" of the tabs preferably is less than about 0.050 inch. Moreover, in one preferred embodiment, the tabs are constructed such that for each pair of tabs, such as tab pair 261 and 271, one of the tabs 261 engages the planar surface 260 of the transponder and the other tab 271 of the pair engages the opposing planar surface 276 of the transponder as can be seen by comparing FIGS. 57D and 57E. Consequently, the tabs provide support on the plane of the surface 260 and on the plane of the surface 276 of the transponder. Also, the tabs 261, 262, 263 and 264, as well as complementary tabs 271, 272, 273 and 274, are preferably located at corners of the transponder. This tab placement is often preferable because it evenly distributes, over a wide area of the transponder, any force which is transmitted to or imposed upon the transponder along either the x axis, along the y axis, or along both axes.

Alternatively, the tabs can be placed differently if sensitive components such as coils are located at the corners of the transponder. For example, the frame structure 252 can include tabs 265–268 which are rotated about 45° from the orientation for the tabs 261–264 of FIG. 58A, as is shown in FIG. 58C. Each of the tabs 265–268 has an associated tab, such as tabs 269 and 270 for tabs 265 and 267, respectively, which define tab pairs which engage the opposing planar surfaces of the transponder in the manner described above with reference to FIG. 58A.

Referring to FIGS. 57C, 57D and 57E, the tabs 261–264 and 271–274 are preferably formed in pairs by the injection molding process. Molding the tabs coincident to one another on the opposing planar side surfaces 260 and 276 of the transponder 202 helps maintain an even force distribution on the transponder. In addition, maintaining the relatively thin cross-section of the tabs and lessens the degree of expansion and contraction that the tabs undergo both during fabrication of the key assembly and in use of the key. The cross-section of the tabs of the undermold is preferably in the range of approximately 0.020–0.050 inch. In this range, the tabs are small enough to minimize forces and other mechanical effects on the transponder due to expansion or contraction of the undermold material as the result of molding thermal excursion or environmental thermal excursion in use of the key assembly.

Referring again to FIGS. 57A–57E, in accordance with a further aspect of the invention, spaces or voids 253 are provided in the mounting structure 254 of the undermold 201. In this preferred embodiment, the voids 253 are formed in portions 254a–254c of the undermold between three sides of the transponder 202 and the bulk portion of the undermold material as shown in FIG. 57B, for example. The voids 253 are formed during the injection molding process, and are produced by inserts provided in the mold tools as will be described. One function of the voids 253 is to allow expansion and contraction of the undermold and/or the overmold during the molding process.

The two-stage process, including producing an undermold and subsequent producing of an overmold, permits the voids to be located strategically in the undermold, which in one preferred embodiment illustrated in FIGS. 57A–57E, for example, forms voids 253 in the undermold material between the forward end of the transponder and the front edge of the heel end of the key 221 and between the sides of the transponder and the side portions of the heel end of the key 221. These voids 253, which can be extremely small, serve to eliminate the potential for pressure differentials which might otherwise develop and result in breakage of the transponder during the overmolding process. When the key subassembly 200' (FIG. 57A) is overmolded, these voids 253 provide space for portions of the overmold plastic to fill. These voids 253 form regions into which the liquid plastic material can flow during the overmolding process, binding the two sides of the overmold together ensuring that the overmold portion of the key assembly does not expand following removal of the key assembly from the mold, which could result in disfiguring of the key assembly 200. In addition, this functions to secure together the center of the front and back sides of the overmold, thereby increasing the integrity of the overmold.

Further Embodiments of the Undermold

Figure 59A:
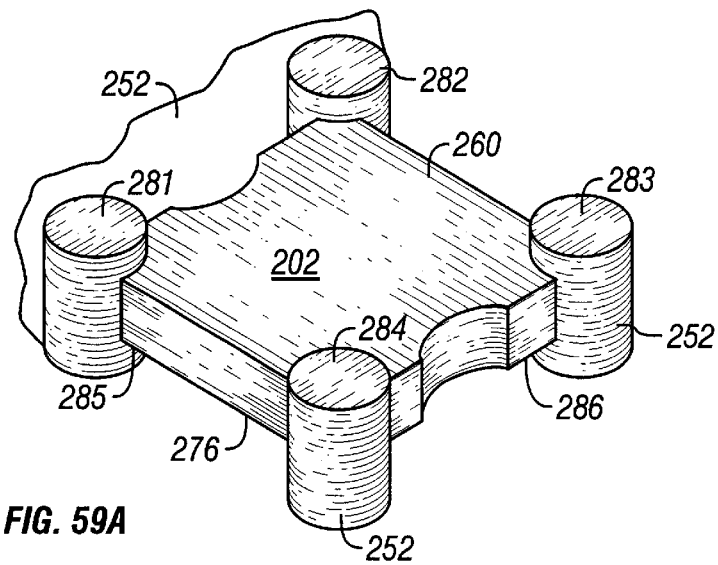
FIGS. 59A–59F are enlarged views illustrating a further embodiment for a frame structure shown in FIGS. 58A–58B and 56A–56E, with FIGS. 59A–59B and 59E–59F showing generally cylindrical-shaped tab defining structures for supporting the transponder, and with FIGS. 59C–59D showing generally rectangular-shaped tab defining structures located offset relative to the corners of the transponder.
Figure 59B:
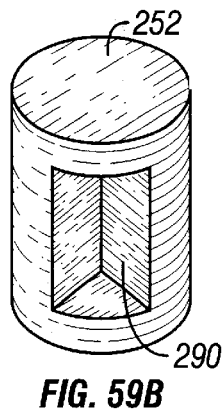

While for the embodiment shown in FIGS. 57A–57E, the tabs 261–264 are flat elements which are generally rectangular in shape, the tabs can also take other shapes. For example, with reference to FIG. 59A, which is a view similar to FIG. 58A, in accordance with a further embodiment, the frame structure 252 which physically contacts the transponder 202 comprises a plurality of generally cylindrically shaped portions of the frame structure, which define four tabs, such as tabs 281–284, which contact the planar surface 260 of the transponder, and four tabs, two of which 285 and 286 are shown in FIG. 59A, which engage the planar surface 276 of the transponder 202. Each tab is located at a corner of the transponder in the manner of the embodiment of FIG. 57A. Each of the cylindrically shaped portions of the frame structure is molded over the corner of the transponder, forming a recessed portion 290 as shown in FIG. 59B, Moreover, the tabs can have a teardrop shape to prevent warping of the tabs. For such configuration, the tab is oriented with its narrow tip or end extending into overlying engagement with a planar surface of the transponder.

Figure 59C:
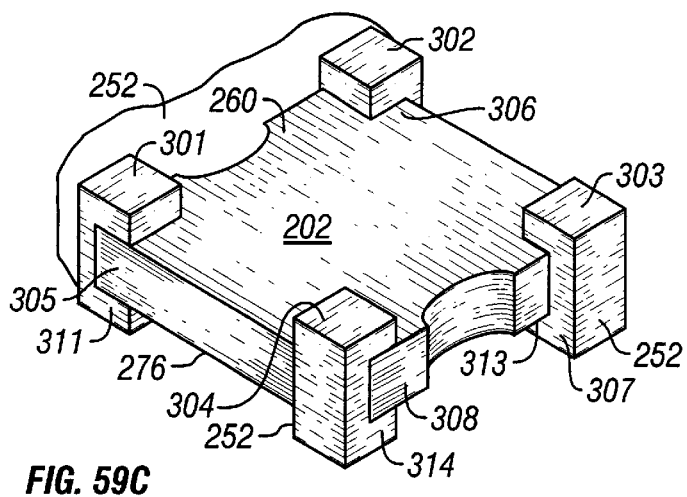
Figure 59D:
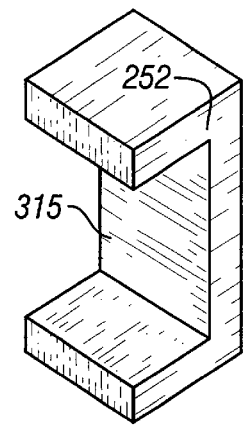

Referring now to FIG. 59C, in accordance with a further preferred embodiment, the undermold support structure 252, which physically contacts the transponder 202, comprises a plurality of tabs 301–304 which are generally rectangular in cross section and located to overlie the planar surface 260 of the transponder at adjacent corners 305–305 of the transponder in a manner similar to that for the embodiment of FIG. 57. However, each tab is offset from the edge and overlies a portion of the end, in the manner shown for tabs 302 and 304. In addition, tabs 301 and 303 are located on opposite sides of the transponder, and the tabs 302 and 304 are located at opposite ends of the transponder. Four mating tabs, such as tabs 311, 313 and 314 shown in FIG. 59C, are provided to engage the planar surface 276 of the transponder. As is shown in FIG. 59D, each rectangular portion of the frame structure 252 has a recess 315 that is generally rectangular in cross section and which is dimensioned to receive one of the corners of the transponder.

Figure 59E:
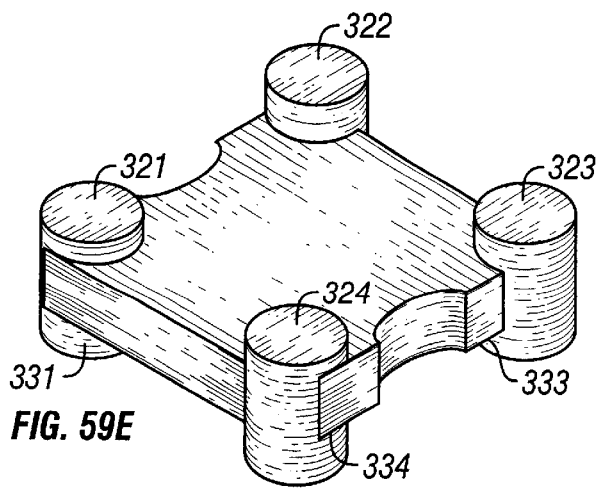
Figure 59F:
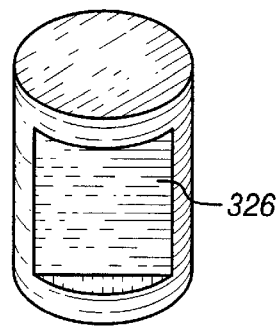

The tabs of the embodiment of the undermold shown in FIG. 59A also can be located offset relative to the corners to extend along sides near the corners in the manner of tabs 321–324 and tabs 331, 333 and 334 as shown in FIG. 59E. For such embodiment, the section of frame structure has a cutout portion in the form of a chord 326 as shown in FIG. 59F.

Figure 60A:
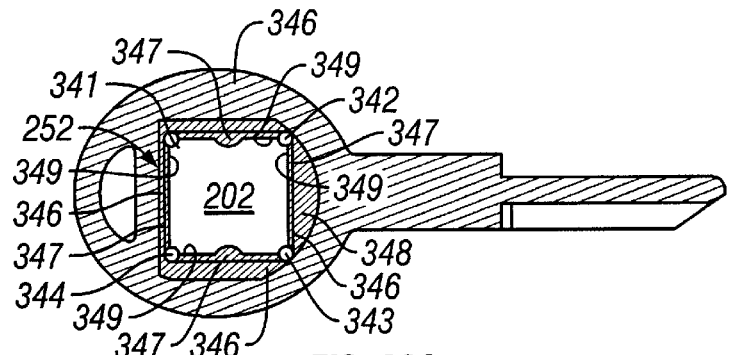
FIGS. 60A–60D are key assemblies with alternative frame structures, with FIG. 60A illustrating an embodiment wherein tabs are interconnected by a thin band of undermold material, with FIG. 60B illustrating an embodiment wherein tabs are located in the middle of transponder side edges, with FIG. 60C illustrating an embodiment wherein the transponder is held by a single tab, and with FIG. 60D illustrating an embodiment wherein a band of undermold material extends around the transponder.

Referring to FIG. 60A, in accordance with a yet another embodiment of a key assembly, the support structure 252 of the undermold comprises a plurality of generally rectangular or cylindrical sections or portions of the frame structure, defining tabs 341–344 located at or near each corner of the transponder in the manner of the embodiments of FIGS. 57A–57G, 58A, 58C, 59A, 59C and 59E, for example. In this embodiment, the portions of the frame structure 252 that define the tabs 341–344, for example, are interconnected by thin bands or strips 346 of the undermold material that extends around the periphery of the transponder 202. Preferably, the bands or strips 346 of undermold material 201 are spaced apart from the transponder 202, defining voids 347 between the transponder 202 and the undermold material. The bands 346, in turn, are connected to the main portion, or mounting structure of the undermold material 348 which is overmolded onto the key heel portion. Although in one preferred embodiment illustrated in FIG. 60A, the bands 346 are spaced apart forming the voids 347, because of the relatively thin profile of the bands 346 of undermold material, these portions 346 of the undermold material can contact the transponder 202 along one or more of the edges 349 of the transponder.

As has been described, an important function of the tabs of the frame structure 252 of the undermold in accordance with the present invention is to minimize localized forces applied to the transponder at any location of the transponder 202 during the overmolding process. By using a number of tabs, forces on the transponder are distributed over a number of points on the transponder with the result that less force has to be carried by each tab at each of those points. For example, if tabs are located at all four corners of the transponder in the manner for the embodiments that are illustrated in FIGS. 57A–57E, 58A, 58C, 59A, 59C and 59E, each tab is required to transmit less force to those locations on the transponder than if only three tabs were located on only three corners of the transponder. Moreover, if tabs are placed at all four corners, or at three corners of the transponder, each tab is required to transmit less force to those locations on the transponder than if only two tabs were provided at only two corners of the transponder. On the other hand, it is also desirable that there be as little contact as possible between the transponder and the undermold material once the overmold has been formed. Thus, the number of tabs is selected to provide a balance between these concerns.

Figure 60B:
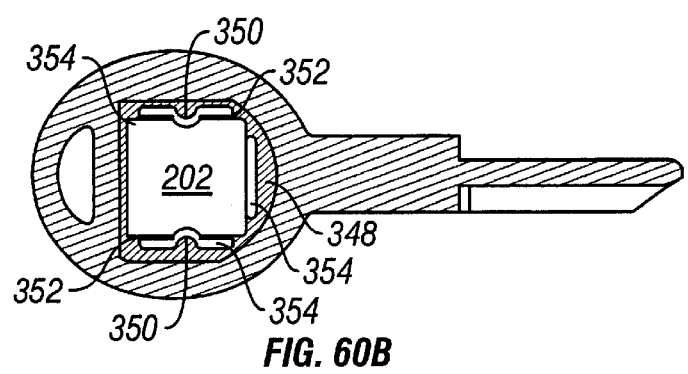

Those of ordinary skill in the art will be aware of alternative methods and the details in configuration and in location for constructing the tabs. Thus, for example, as an alternative to locating the tabs of the undermold at all four of the corners of the transponder, the tabs can be located at diametrically opposed corners, or at three of the corners, for example. Also, as shown in FIG. 60B, the tabs 350 can be located substantially at the middle of the side edges 352 of the transponder. Voids 354 can be formed in the undermold material between the sides of the transponder and the key. Locating the tabs 350 at the middle of the side edges 352 of the transponder better distributes compressive and/or torsional forces imposed on the transponder and the points of application of the forces to the transponder are located closer together. The relative locations of the tabs 350 can affect the amount of deformation of the transponder, particularly if the force distribution should at some time become unstable or unevenly distributed. Therefore, it is preferable to maintain the points at which the forces are applied to the transponder through the tabs of the undermold as close together as possible. In addition, locating the tabs 350 at the mid point of the side edges 352 of the transponder minimizes the possibility that the transponder will be deformed due to the increased leverage that results when the spacing between tabs is greater, as when the tabs are located at the corners of the transponder.

Figure 60C:
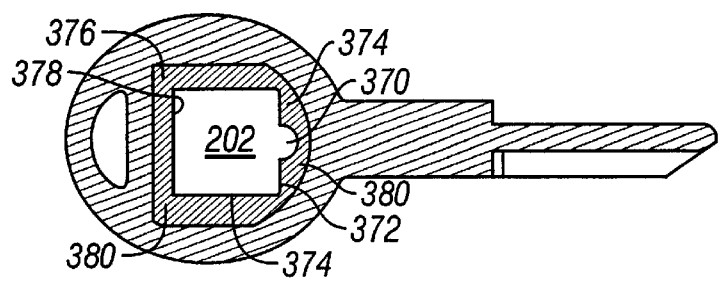

In another embodiment illustrated in FIG. 60C, the support structure comprises a single tab 370 that is located at one end 372 of the transponder and which extends between the two corners 374 of the transponder at that end for connecting one end of the transponder to the mounting structure. A thin band 376 of undermold material connects the opposite end 378 of the transponder to the mounting structure 380.

Figure 60D:
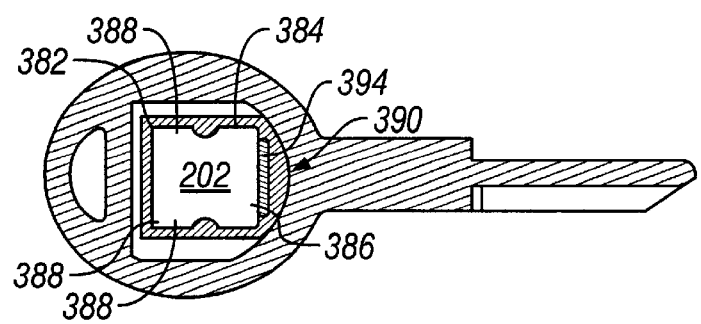

With reference to FIG. 60D, in accordance with yet another embodiment, the support structure 382 of the undermold comprises a band 384 of the undermold material that extends around the periphery of the transponder and contacts the transponder on all four sides. In this alternative embodiment of the present invention, the transponder is secured within the undermold of the present invention with a thin (0.020 inch) layer of molding which preferably encircles the periphery of the transponder entirely and extends from the top to the bottom the transponder. Voids 386 are provided along three sides 388 of the transponder, but the band 384 is connected to the main portion or mounting structure 390 of the undermold at the fourth side of the transponder 202. However, a void 394 is provided in the bulk material in the proximity of the fourth side of the transponder to provide room for expansion and contraction of the undermold material. In this embodiment, the frame structure portion 382 is coupled to the mounting portion 390 of the undermold using one of the techniques described herein above.

Alternative methods and configurations for affixing the tabs to the mounting structure include molding rectangular, cylindrical, or alternatively shaped posts at the locations of the tabs during the injection molding process. Such a method of securing the tabs facilitates an integral and one-step construction of the undermold being efficient both economically and from a time perspective. Moreover, relatively small and short pins can be inserted into the undermold mold to hold the transponder in place during the first stage of the injection molding process. Thereafter, the pins can be removed, leaving holes to be filled by the overmolding process. While in accordance with some preferred embodiments of the present invention as described above, the tabs are produced during the injection molding process as an integral portion of the undermold, the tabs can be produced as a separate structure which can also be molded in addition to the undermold.

A further embodiment of the key assembly 400, shown in FIGS. 61A–61E, includes the transponder 210 of FIG. 54B and the key 231 of FIG. 55C. In this embodiment, the transponder 210 is mounted in the notch 233 provided at one side of the key. As in the previous embodiments, the undermold 201 is formed of a relatively hard plastic material, such as a high flow polypropylene, and rigidly couples the transponder 210 to the key 231, maintaining the transponder substantially immobile within the key. The overmold 199 is formed of a material such as a soft PVC, a thermoplastic rubber, such as that commercially available under the trade name Santoprene, for example, or other similar material that is softer than the material of the undermold.

Figure 62A:
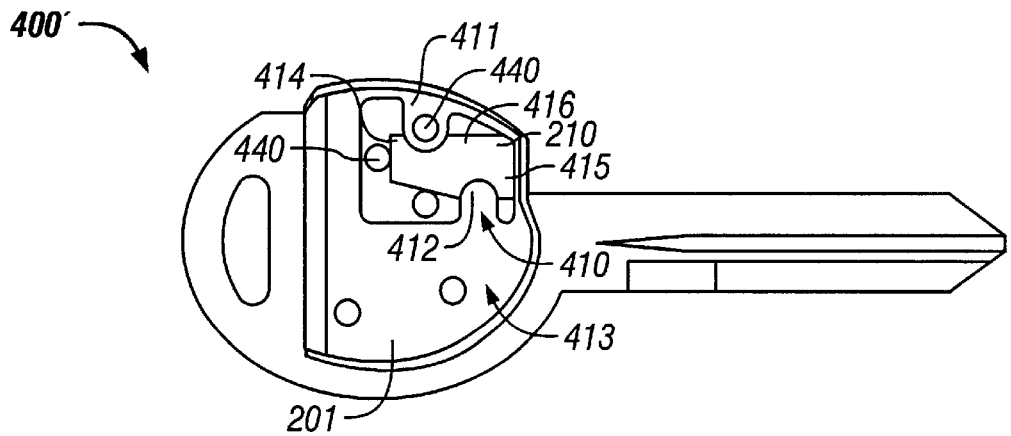
FIG. 62A is top plan view of the key assembly of FIGS. 61A–61E prior to applying the overmold.
Figure 62B:
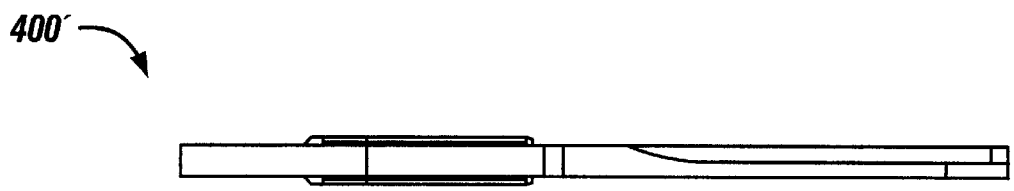
FIG. 62B is a side view of the key assembly of FIG. 61A.

More specifically, referring also to FIGS. 62A–62F, which illustrate the key assembly 400 prior to the formation of the overmold and in which the key subassembly has been given the reference numeral 400', in this embodiment, the frame structure 410 includes tabs 411 and 412 preferably located near diametrically opposed corners 414 and 415 of the planar surface 416 of the transponder 210 (FIG. 62F), and tabs 421 and 422 located near diametrically opposed corners 424 and 425 of the planar surface 426 of the transponder (FIG. 62E). The tabs 411, 412, 421 and 422 are generally semicircular in cross section and define finger-like projections extending from the undermold material in overlying relationship with the transponder on opposite sides thereof In addition, the undermold includes a mounting structure 413 formed by undermold material that couples the frame structure to a portion to the heel end of the key 231.

The design configuration of the tabs 411–412 and 421–422 of the undermold 410 in this embodiment and their locations along the sides of the transponder 210 are dictated by the configuration of the transponder as well as the shape of the key 221 of the key assembly 400. As is discussed above, the weak axis for the transponder 210 extends along the y axis as shown in FIG. 54B. Because the y axis is the weak axis for this transponder configuration, the frame structure 410 is configured to minimize the affect on the transponder of any forces directed along the y axis. As is discussed above, because the transponder is relatively thin along its x axis 214 (FIG. 54B), applying an undue amount of strain at either end of the transponder, along the y axis 212 will subject the transponder to forces capable of deforming the transponder.

The tabs 411–412 and 421–422 have relatively thin planar surfaces that extend coincident to the surface of the transponder lying along the y axis as defined in FIG. 54B. The tabs are preferably less than 0.050 inch in thickness. Preferably, the tabs are constructed such that for each pair of tabs, such as tab pair 411 and 421, one of the tabs 411 is located to engage the planar surface 416 of the transponder and the other tab 421 of the pair is located to extend along and engage the opposing planar surface 426 of the transponder as can be seen by comparing FIGS. 62E and 62F. Consequently, the tabs provide support in the planes of the opposing planar surfaces of the transponder. The tabs 411 and 412, which are positioned to engage the planar surface 416, are located adjacent opposite corners of the transponder and the tabs 421 and 422, which are positioned to engage the opposing planar surface 426, also are located adjacent corresponding corners of the transponder, each underlying the respective tab 411 and 412 of the pair. This tab configuration is preferable because it provides for a more even distribution, over a wide area of the transponder 210, of any force which is translated to or transferred to the transponder along the y axis.

The tabs 411–412 and 421–422 are formed in pairs by the injection molding process. Molding the tabs coincident to one another on the opposing planar surfaces of the transponder 210 assists in maintaining an even force distribution on the transponder. In addition, the formation of the tabs of the undermold is controlled to maintain the tabs relatively thin in cross-section to lessen the degree of expansion and contraction that the tabs undergo both during fabrication of the key assembly and in use of the key. The tabs of the undermold are small enough in cross-section, typically 0.020 inch, to minimize forces and other mechanical effects on the transponder due to expansion or contraction of the undermold material as the result of environmental thermal excursion.

Figure 62C:
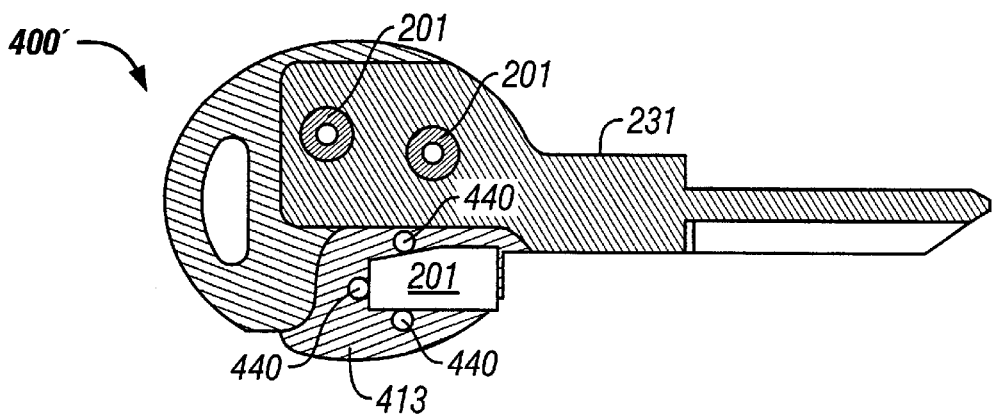
FIG. 62C is a transverse section view of the key assembly of FIG. 62A.
Figure 62D:
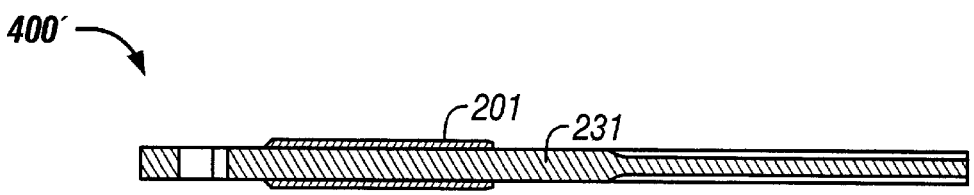
FIG. 62D is a vertical section view of the key assembly of FIG. 62A.

In accordance with a further aspect of the invention, spaces or voids 440 are provided between the mounting structure 413 of the undermold and the transponder for permitting the undermold and/or the over mold to expand and/or contract with changes in ambient conditions. For example, as shown in FIG. 62C, voids 440 are formed in portions of the undermold between the sides of the transponder and the bulk portion 413 of the undermold material. These voids 440 are formed during the injection molding process, and are produced by a plurality of locators provided in the mold tools as will be described. The locators locate the transponder within the mold during the undermolding process and prevent movement of the transponder 210 during the undermolding process.

Figure 61A:
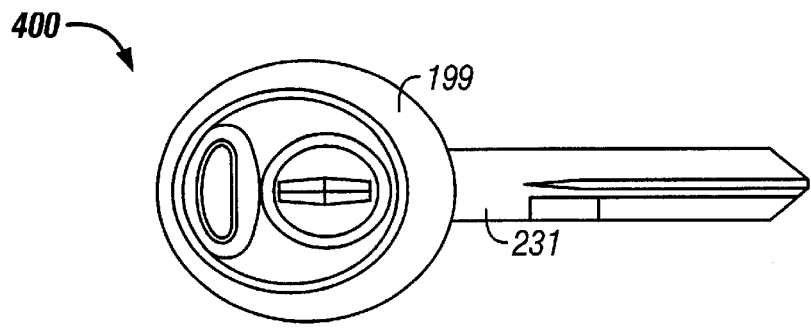
FIG. 61A is a plan view of a further embodiment of the key assembly provided by the invention wherein a wedge-type transponder is mounted in a cutout in one side the key.
Figure 61B:
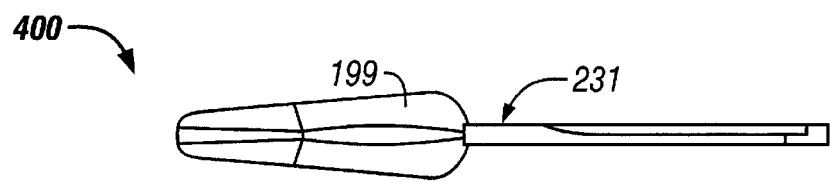
FIG. 61B is a side view of the key assembly of FIG. 61A.
Figure 61C:
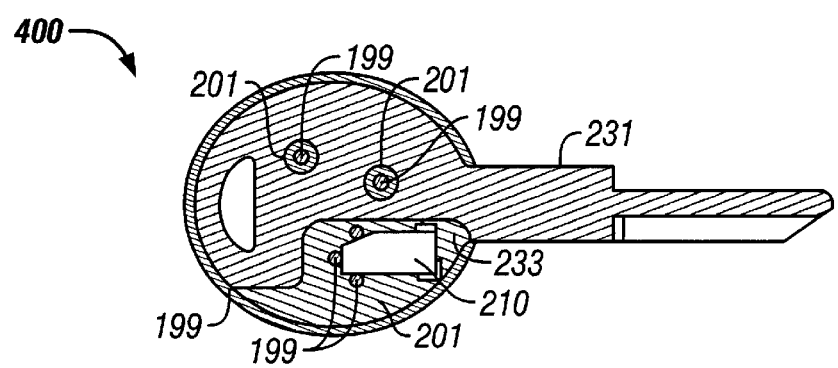
FIG. 61C is a transverse section view of the key assembly of FIG. 61A.
Figure 61D:
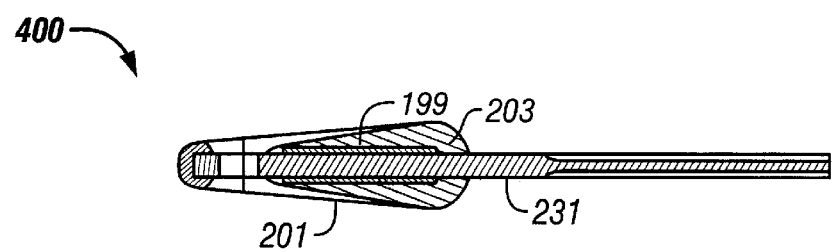
FIG. 61D is a vertical side section view of the key assembly of FIG. 61A.
Figure 61E:
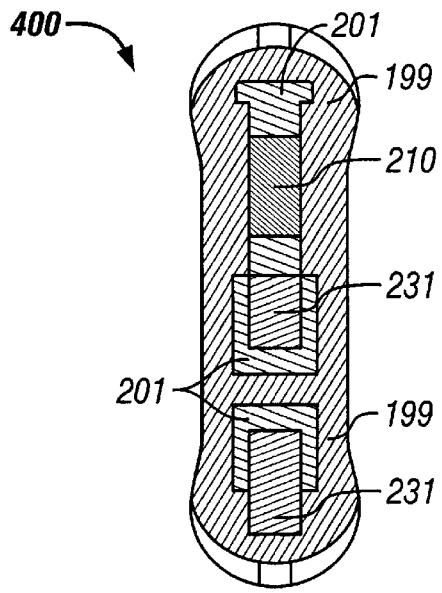
FIG. 61E is an enlarged top vertical section view of the key assembly of FIG. 61A.
Figure 61F:
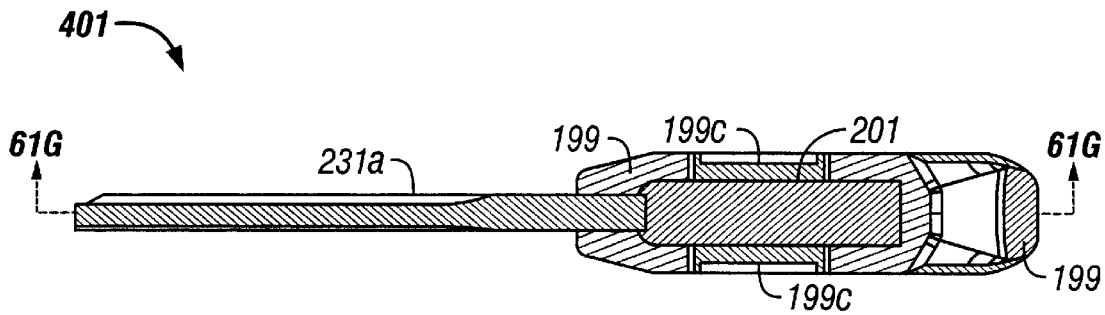
FIG. 61F is a side section view of a key assembly in accordance with an alternative arrangement of the embodiment of FIGS. 61A–61E.
Figure 61G:
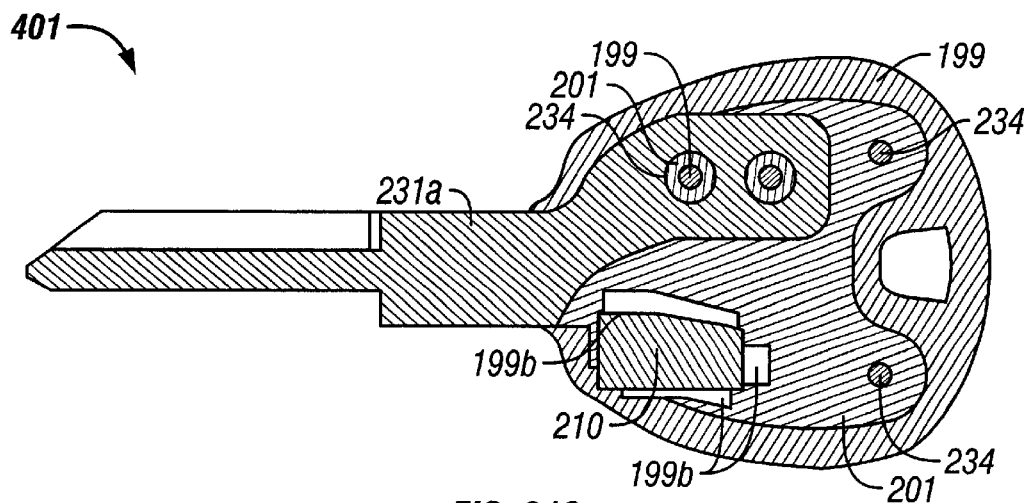
FIG. 61G is a transverse section view of the key assembly of FIG. 61F.

A further embodiment of the key assembly 401, shown in FIGS. 61F–61G, includes the transponder 210 of FIG. 54B and a key 231a. As in the previous embodiments, the undermold 201 is formed of a relatively hard plastic material, such as a high flow polypropylene, and rigidly couples the transponder 210 to the key 231a, maintaining the transponder substantially immobile within the key. The overmold 199 is formed of a material such as a soft PVC, a thermoplastic rubber, such as that commercially available under the trade name Santoprene, for example, or other similar material that is softer than the material of the undermold.

As shown in FIG. 61G, elongated strips of overmold material 199b, fill voids formed in portions of the undermold along the periphery of the transponder and the bulk portion of the undermold material. These voids are formed during the injection molding process, and are produced by a plurality of locators provided in the mold tools as has been described. Also, the holes 234 provided through the metal portion of the key are filled with overmold material as the result of the overmolding process. Preferably, a layer of the undermold material 201 is allowed to be formed on the inner circumference of the holes to enhance the ability of undermold material to be connected to the key in the regions of these holes. The overmold material covers the heel portion of the key 231a as well as the undermold material and the transponder 210 that is coupled to the heel portion of the key by the undermold material. As shown in FIG. 61F, a relatively thin portion 199c of overmold material is formed at the center of the head of the key. This portion of the overmold material interconnects the portions of the overmold on one side of the key with the overmold material on the opposite side of the key.

Alternative Embodiments for Tabs Referring to FIG. 63A, there is shown a simplified representation of the transponder 210 and the frame structure of the undermold in accordance with a further embodiment, and which are shown enlarged to illustrate the relationship between the frame structure 252 and the transponder 210 of FIG. 54B. In FIG. 63A, each of the generally trapezoidally-shaped solids represents a portion of the frame structure 252. The frame structure includes four frame structure portions identified by reference numbers 252a–252d. Each of the frame structure portions 252a–252d, such as portion 252a shown in FIG. 63B, includes a lower arm 291 and an upper arm 292 interconnected by upright portion 295. The frame structure portion 252a is configured to conform to the shape of the transponder 210 at its side 216 which has a tapered edge surface 293 along its side 216. Thus, the upper arm 292 of frame structure portion 252a has a tapering lower surface 294 that conforms to the tapered edge surface 293. The other three frame structure portions 252b–252d can have generally parallel upper and lower arms which engage upper and lower surfaces of the transponder as shown in FIG. 63A to conform to the shape of edges 213, 211 and 215 of the transponder. Frame structure portions 252b and 252d are located at opposite ends 213 and 215 of the transponder. Frame structure portion 252c is located at side 211 of the transponder near the corner thereof Each frame structure portions defines a pair of tabs that engage opposing planar surfaces of the transponder. For example, frame structure portion 252b includes tabs 296 and 297, and frame structure portion 252a includes tabs 298 and 299. The frame structure portions 252a–252d are formed integrally with the mounting structure 254 in the manner of tabs 411 and 412 as shown in FIG. 62A, for example.

The transponder 210 can be mounted in the key 231 using any of the arrangements illustrated for the transponder 202. For example, as shown in FIGS. 31–35, the transponder 210 can be mounted in the open head portion of the key 221 (FIG. 53) with the undermold filling all or a part of the opening and the overmold being molded around the head portion covering the transponder, the undermold material and the metal portion of the head. Tabs extend into engagement with the transponder. The top and bottom surfaces are not covered by or engaged by the undermold material except for the tabs at the thin end of the transponder. In addition, in these embodiments, voids are formed in the undermold material by locators in the mold. The voids created during the undermold are filled with overmold material to hold the center portions of the overmold together. Moreover, molding a portion of the overmold material through the key ring opening 228, as is shown in FIG. 57D, for example, assists in securing together the front and back sides of the overmold.

Further Embodiments

In accordance with other embodiments for the key assembly, both the undermold and the overmold comprise a relatively hard material. In these embodiments, contact between the relatively "hard" undermold material and the transponder is minimized by using a compressible material as an interface between the hard material and the transponder during the undermold and/or overmold process.

Figure 64A:
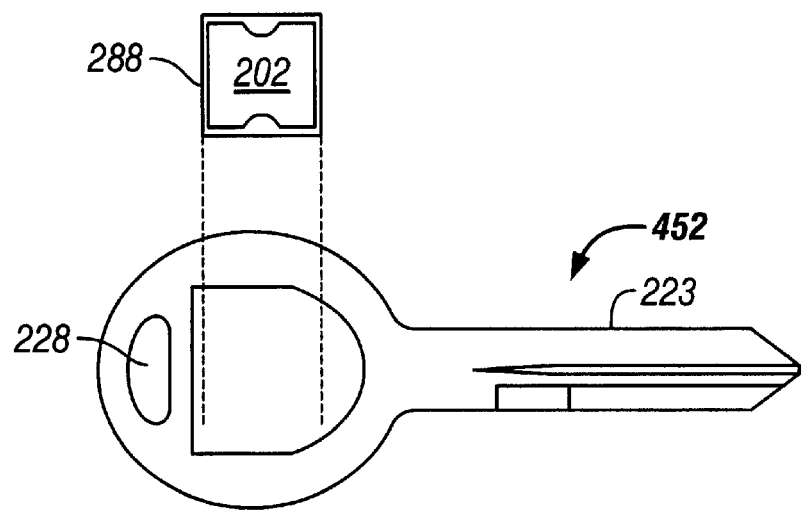
FIGS. 64A and 64B illustrate an embodiment of a key assembly, shown prior to overmolding in which the undermold includes compressible material.
Figure 64B:
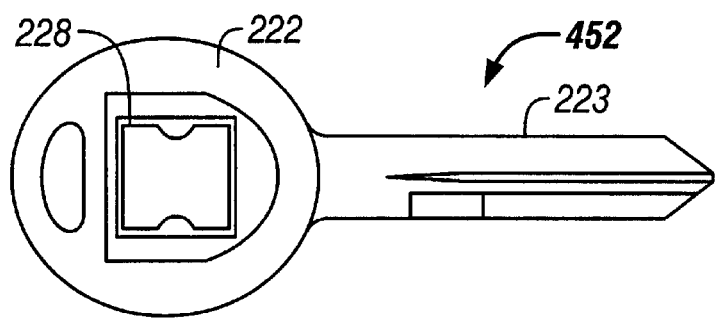

For example, in one embodiment of a key assembly 452 illustrated in FIGS. 64A and 64B, a thin membrane 288 is wrapped or molded around the transponder prior to forming the undermold. The membrane 288 can be of a compressible material and can be approximately 0.020 inch in thickness. The transponder 202 can be held in place in the mold by pins while the hard undermold material is introduced into the mold, the hard material being in contact with the membrane, but out of contact with the transponder.

In another embodiment, cork, or some other compressible material can be mixed into the undermold material prior to molding the undermold material around the transponder. The undermold material secures the transponder in place on the key, with the impregnated compressible material that forms the undermold capable of absorbing mechanical forces.

Figure 64C:
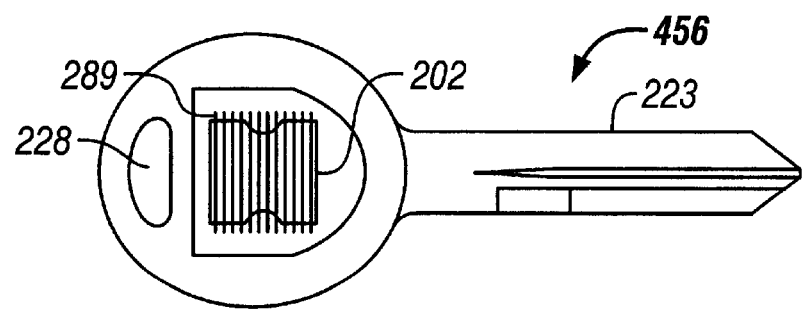
FIG. 64C is a top plan view of an embodiment of a key assembly, shown without undermolding material, including deformable undermold material in the form of strips.
Figure 64D:
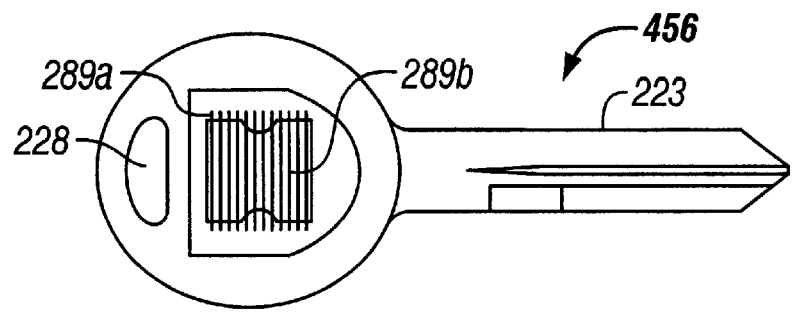
FIG. 64D is a view similar to FIG. 64C and showing the deformable strips of undermold material after the overmolding process has been carried out.

Referring to FIGS. 64C and 64D, in yet another embodiment for a key assembly 456, the frame structure that maintains the transponder in place during formation of the undermold comprises a plurality of thin strips 289 (FIG. 64C) of a hard material or other material that shrinks during over molding, leaving voids. The strips extend over and under the transponder and are molded integrally with the body of the hard undermold material that fills the spaces between the transponder and the metal portion of the head. The strips 289 can be arranged in a variety of shapes or patterns, but preferably define a porous-like structure at the upper and lower surfaces of the transponder, The material is selected such that some of the strips, such as strips 289a, shrink and become thinner or break completely as shown for strips 289b in FIG. 64D. Because the undermold material is needed only during the overmolding process to keep the transponder from moving within the mold, it is desirable that it decrease in size following the overmolding process and leave voids. However, the porous material can withstand the overmold process without disentegrating or losing its properties that enable the porous-like structure to protect the transponder from impact forces. During the overmolding process, the porous-like structure substantially prevents the overmold material from penetrating the well in which the transponder is located. This structure, along with selection of the mold configuration and the undermold material, serve to keep hard overmold material structures of significant size out of contact with the transponder during overmolding. Consequently, the voids in the porous-like structure minimize transfer of mechanical forces to the transponder.

Figure 64E:
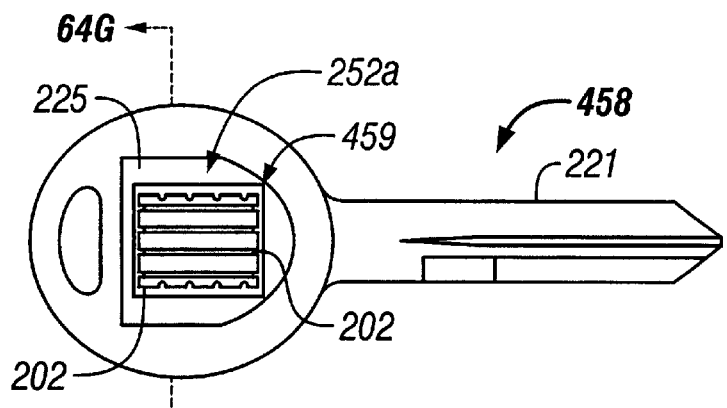
FIG. 64F is a plan view of a key assembly including a support structure for supporting the transponder during the overmolding process, the key assembly being shown without the overmold material.
FIG. 64G is a vertical section view taken along the line 64G—64G of FIG. 64E and with a transponder shown in phantom.
Figure 64F:
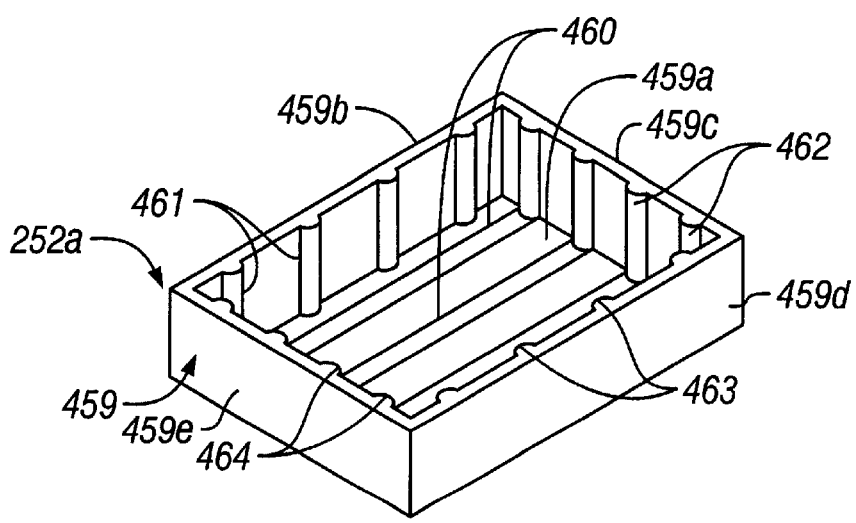
Figure 64G:
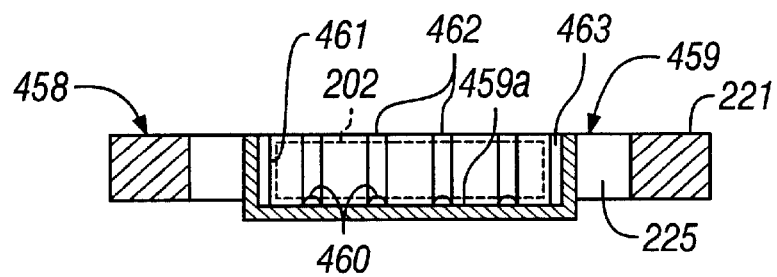

Referring to FIGS. 64E–64G, in a further embodiment of the key assembly 458, the portion of the undermold which corresponds to the frame structure 252a is formed as a rigid, box-like support structure 459 which has a bottom or base 459a, four sides 459b–459e, and is open at the top. In this embodiment, the transponder 202 is inserted into the support structure after the undermold, i.e. support structure 459, has been formed.

The support structure 459 includes a plurality of ribs 460–464 which support and cushion the transponder 202, represented by the dashed lines in FIG. 64G, on the bottom and sides thereof during the overmolding process. The ribs 460 and 461–464 are formed on the base 459a and sides 459b–459e, respectively, of the support structure. As shown in FIGS. 64E and 64F, the ribs 460 extend in a parallel spaced relation along the length of the base 459a. The ribs 461 and 463 extend upwardly in a parallel spaced relation from the base to the upper edge of the sides 459b and 459d. The ribs 462 and 464 extend upwardly in a parallel spaced relation from the base to the upper edge of the sides 459c and 459e. Ribs 462 and 464 can converge with the ends of ribs 460 on the base 459a. In one embodiment, shown in FIGS. 64E–64F, the support structure includes four ribs 460, with four vertically extending ribs 462 and 464 at each end thereof. In addition, four ribs 461 and 463 extend vertically at the both of the sides of the support structure, such that four ribs engage the lower surface of the transponder and four ribs engage each side surface of the transponder. The lower surface of the transponder rests on the support ribs 460 and the ribs 461–464 engage the sides of the transponder, with the transponder being held in place by an interference fit. However, fewer or more ribs can be provided at any of these transponder surfaces. Although the box-like structure is generally rigid, the ribs are sufficiently thin as to enable the ribs to deform or crush somewhat during the overmold process and when stress is applied during environmental conditions while maintaining a cushion between the transponder and the relatively hard overmold material. Moreover, a compressible material, such as compressible membranes 288, cork 288 (FIG. 64B) or other forms of compressible material, can be used in combination with or to replace the support structure 459, the compressible material being located below and/or along the sides of the transponder that is located within the frame 459. Compressible material can also be placed above the box-like structure to close it off at its upper end.

Thus, this embodiment of the key assembly 458 is formed using a process in which the box-like support structure is formed first and connected to the key. The portion of the undermold that defines the support structure 459 can include portions that couple to the head of the key in the manner described above for the key 200, as shown in FIG. 57D. Then, the transponder is inserted into the support structure 459. The sub-assembly of the key, the support structure and the transponder is then overmolded.

In this process, a relatively hard undermold material is formed for supporting the transponder, with a compressible material being used to interface the undermold material and the transponder. A hard overmold material is used to enclose the formation of the undermold and the compressible/shrinkable material. Alternatively, the compressible material can be embodied as a sheath in which the transponder is placed. The sheath can be formed of a compressible material, such as ribbed material, for spacing the transponder from the inner surface of the sheath and can be extruded if desired. In this embodiment, the ribs of the sheath can deform or crush somewhat during the overmold process maintaining a cushion between the transponder and the overmold material.

Figure 65A:
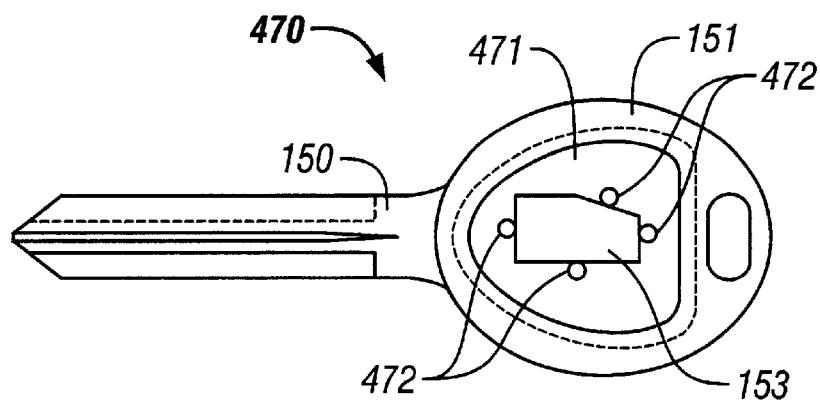
FIG. 65A is a top plan view of a key assembly in accordance with a further embodiment, shown prior to forming the overmold.
Figure 65B:
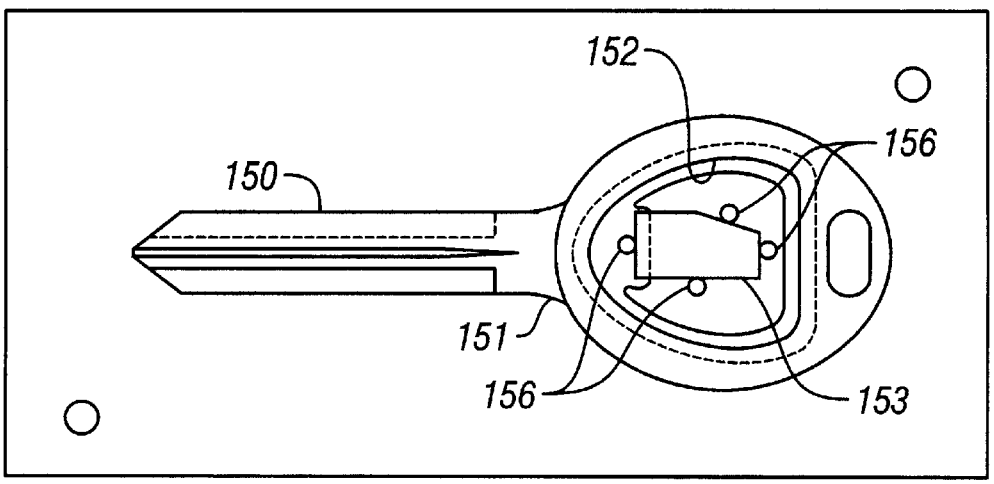
FIG. 65B shows the key assembly of FIG. 65A in a mold plate prior to forming the undermold.

Referring to FIGS. 65A and 65B, in a further embodiment, a key assembly 470 is formed with both soft undermold material 471 and a soft overmold material (not shown). The key assembly 470 includes a transponder 153 mounted on a key having a key shank 150 and a heel end 151 with central opening 152 which are similar to those for the key assembly illustrated in FIG. 32, for example.

In the embodiment of FIG. 65A, the transponder 153 is supported during the undermolding process. One way of doing this is to use an insert molding process with the transponder 153 being held by retractable pins 156 (FIG. 65B) during forming of the undermold 471. FIG. 65B illustrates the key assembly in a mold tool prior to forming of the undermold. When the undermold has been formed, the pins 156 are retracted and the transponder 153 is held by the undermold material 471 during the overmold process. In this embodiment, retraction of the pins forms voids 472 in the undermold material as shown in FIG. 65A. These voids 472 are filled with the overmold material (not shown) during the overmold process, to interconnect the center portions of the undermold material.

A similar process can be used in forming a key assembly having a hard undermold material and soft overmold material, which is a variation on the key assembly shown in FIGS. 56A–56G, for example.

Figure 65C:
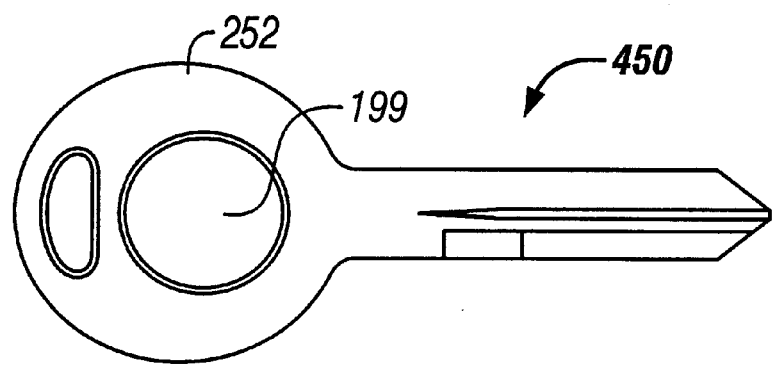
FIG. 65C is a top plan view of an embodiment of a key assembly wherein the undermold is maximized and the overmold is minimized.
Figure 65D:
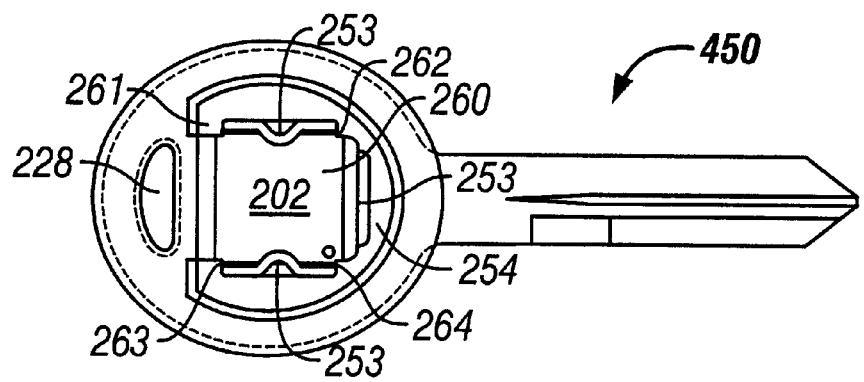
FIG. 65D is a transverse section view of the key assembly of FIG. 65C.
Figure 65E:
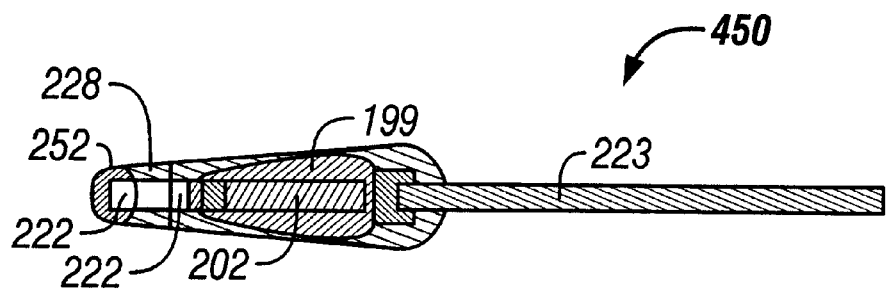
FIG. 65E is a vertical section view of the key assembly of FIG. 65C.

In another embodiment, the amount of relatively hard undermold material is maximized while maintaining a minimum of contact between the transponder and the undermold material. With reference to FIGS. 65C–65E, in this embodiment of a key assembly 450, a portion of the undermold material is used to form paired tabs (similar to the tabs 261–264 and tabs 271–274 shown in FIGS. 57D and 57E) in such a way as to minimize the points of contact between the relatively hard undermold material 252 and the transponder 202. However, in key assembly 450, the balance of the undermold material covers substantially all of the key portions located away from the transponder with the tabs 261–264 (and 271–274) being connected to the bulk portion of the undermold material. In key assembly 450, the overmold material 199 is used to fill the regions above, below and around the frame and surfaces of the transponder, such that the center portion of the head of key, in which the transponder is located, is defined by the relatively soft overmold material 199. Thus, in this embodiment, the majority of the key 221 is covered with the relatively hard undermold material 252 and only the portion of the key in which the transponder is located is covered with the relatively soft overmold material 199. This arrangement provides increased strength for the key assembly because the undermold 252 forms most of the outer coating of the key assembly 450. In an alternative embodiment of the key assembly 450 in which the undermold is maximized, the undermold material 252 can be formed to include a box-like recess (with or without compressible ribs), which can be similar to the box-like structure 459 (FIG. 64F), and which is open to the top. The recess is sized to receive the transponder and after the transponder has been positioned in the recess, the open upper end of the recess, and the transponder, can be covered with overmold material, which can be similar to, or softer than the undermold material.

Figure 65F:
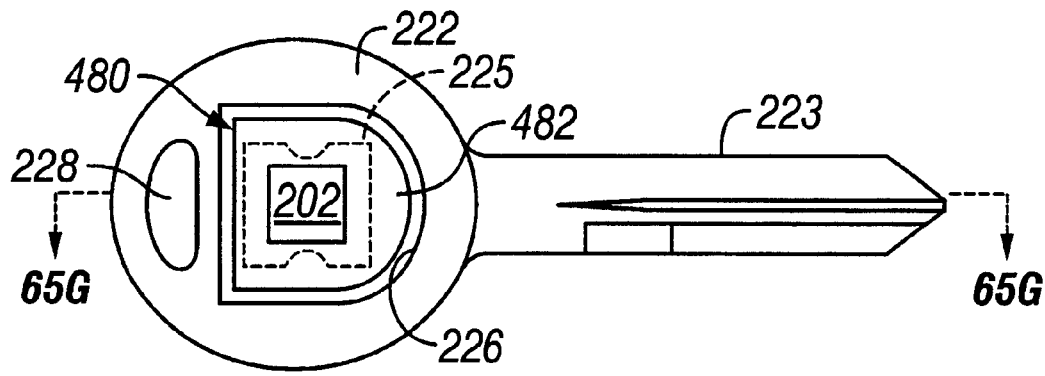
FIG. 65F is a top plan view of a key assembly, shown prior to forming the undermold, and in which the transponder is supported on the key by a membrane like undermold.
Figure 65G:
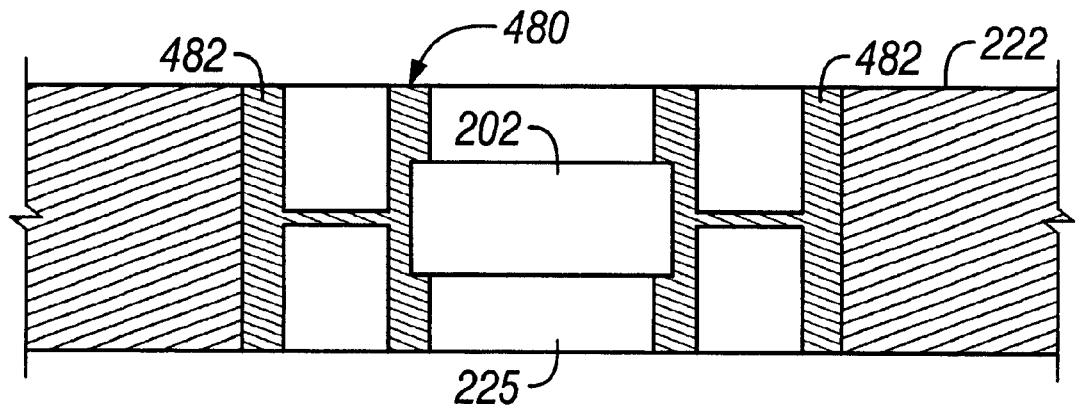
FIG. 65G is a vertical section view taken along the line 65G—65G in FIG. 65F.

An alternate method for supporting the transponder 202 on a key 221 during the overmolding process is illustrated in FIGS. 65F–65G. In this embodiment, the undermold 480 which supports the transponder 202 on the key is a relatively thin membrane-like member which extends within the opening 225 in the head 222 of the key and is fixed to the key along the peripheral edge 226 of the opening. In one embodiment, the membrane-like member 480 conforms substantially to the shape of the opening and has its peripheral edge portion 482 fixed to the key along the peripheral edge 226 of the opening. Alternatively, the membrane-like member can be generally rectangular in shape and can be fixed to the key at opposite ends of the opening in the head of the key.

In one preferred embodiment, the transponder 202 is partially enclosed within the membrane-like member as shown in FIG. 65F, but the transponder 202 can be completely enclosed as well. The membrane-like member 480 is of a material that is sufficiently rigid to support the transponder, but which allows the center portion of the membrane-like member 480 to flex slightly within the opening of the key.

Process

As is indicated above, the present invention addresses a number of concerns that affect operation of the transponder. One concern is breakage or other degradation of the transponder due to mechanical forces that are applied to the transponder during the molding processes. As is discussed above, these problems are addressed by minimizing contact between the transponder and the relatively hard material that forms part of the molded key head, and including molding the key assembly in two stages.

Another concern is degradation of the transponder that could result due to the heat that is applied to the transponder during the molding process. To address this problem, the mold plates of the mold used in producing the undermold, as well as the mold plates of the mold used in producing the overmold, comprise a relatively massive material with good heat transfer characteristics.

A further concern is degradation that can be caused by shrinking or contracting of the undermold and/or overmold material during cooling of the key assembly following the molding operation. A further benefit gained in molding the key assembly in two stages, using a relatively hard undermold material and a relatively soft overmold material, is a substantial reduction in the amount of compressive force imposed on the transponder while the plastic undermold material is cooling following the injection molding process. Although the relatively hard undermold material can exert higher compression forces during cooling because of its greater hardness, the impact on the transponder is minimized because a lesser amount of the relatively hard material is used in forming the undermold.

First Stage Processing-Key Assembly 200

In general, the process for making the key assemblies described above is similar although some of the process steps can vary as a function of the shape of the key, the transponder used and the configuration of the molded portion of the key head. Accordingly, the process will be described with reference to producing the key assembly 200 (FIGS. 56A–56G).

Figure 66A:
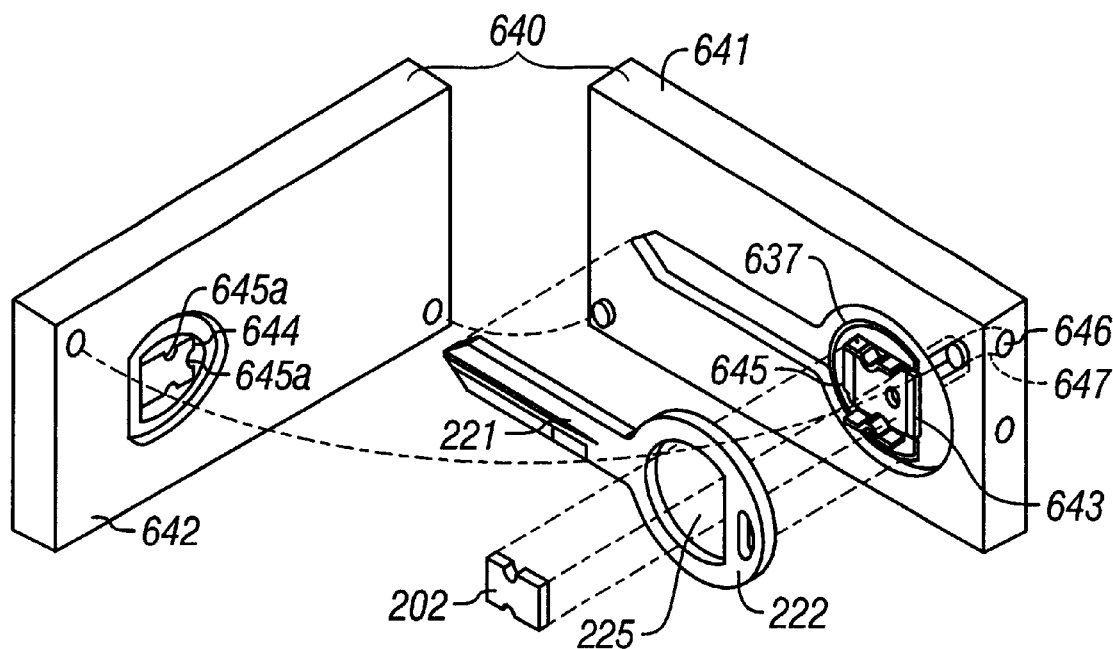
FIGS. 66A–66E illustrate molds for use in producing the key assembly of FIGS. 56A–55E.
Figure 66B:
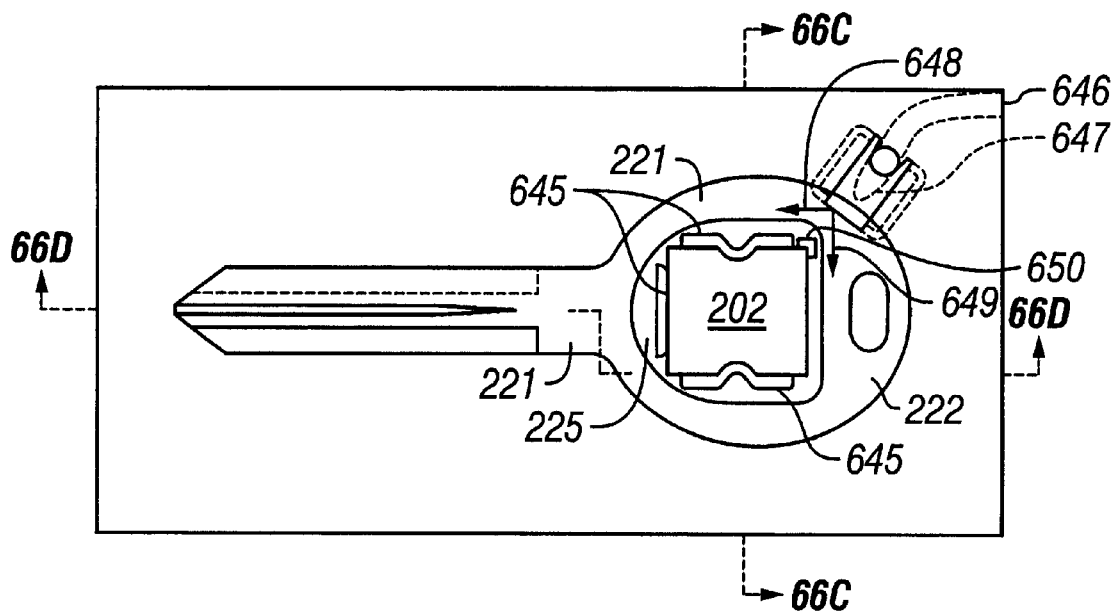
Figure 66C:
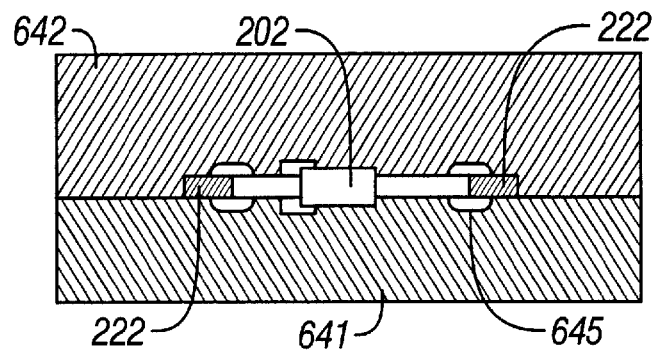
Figure 66D:
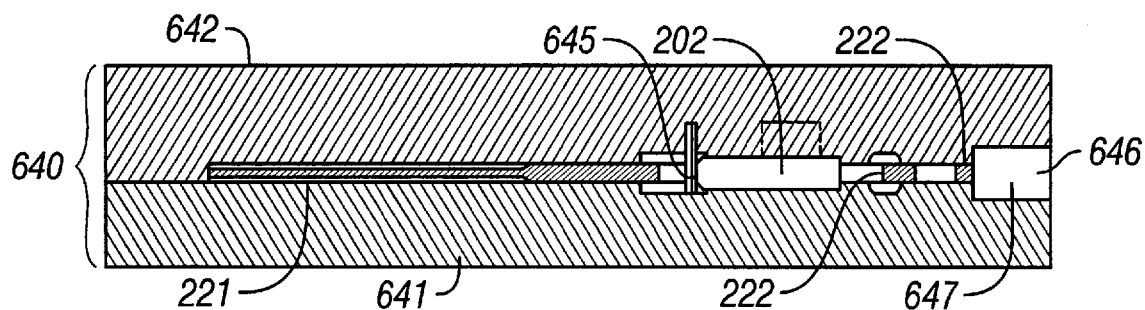

Referring to FIGS. 66A–66E, the following is a description of one process for producing the key assembly 200 (FIG. 56A) in accordance with one embodiment of the present invention. First, the key 221 is positioned in a recess 637 of one of the mold plates 641 of a mold 640 (FIG. 66A). Then, the transponder 202 is positioned in the mold plate 641, located in the open portion 225 of the heel end 222 of the key as shown in FIG. 66B. The mold plate 641 includes a mold surface 643 that defines the configuration for a portion of the undermold. The mold includes a plurality of locators 645 which hold the transponder in position in the mold to prevent the transponder from moving in the mold during the injection of the first plastic material into the mold. After the transponder is placed in the opening in the head of the key, a second mold plate 642 is closed on the first mold plate 641 to encompass the key and the transponder as shown in FIGS. 66C and 66D. As shown in FIG. 66A, the mold plate 642 includes a mold surface 644 that is generally a mirror image of the mold surface of mold plate 641 and defines the remaining portion of the undermold. Mold surface 644 can include openings 645a for receiving distal ends of the locators 645 of mold plate 641.

In the next step of the process, a first plastic material, such as a high flow polypropylene, is injected into the first mold 640 through an inlet 646 of the mold 640 to form the undermold 201 that surrounds a portion of the transponder 202 and the heel end 222 of the key 221 with the first plastic material and which integrally couples the transponder to the heel end of the key. The presence of the locators 645 in the mold 640 causes voids 253 to be formed in the undermold material 201 as shown in FIGS. 57D and in FIG. 66E, for example.

The voids 253 also serve to alleviate the affects of molding thermal excursion that can occur during the manufacturing process, such that, should molding thermal excursion affect some part of the key assembly during the manufacturing process, the voids allow for expansion to minimize compressive forces on the transponder. The undermold process of the present invention permits the voids 253 to be located strategically between the front and back of the head portion the key assembly. These voids also serve to eliminate the potential for a pressure differential which might otherwise develop in the mold during the overmold process. Eliminating the potential for a pressure differential permits the transponder from being moved within the key assembly during the overmold process. Subsequently, when the key assembly is overmolded, these holes provide a space for the overmold plastic to fill, thus securing the centers of the front and back sides of the overmold thereby increasing the integrity of the overmold and ensuring that the overmold of the key assembly does not expand to disfigure the key assembly.

As has been indicated, an important consideration is the prevention of damage to the electrical circuit by both impact forces and compressive forces while the key assembly is manufactured, especially during the molding processes. The injection molding process is conducted in a manner as to minimize the affect of impact forces applied to the transponder during the molding process. To this end, in accordance with a preferred method used during the injection molding process for forming the undermold, the liquid plastic material that forms the undermold 201 is directed around the transponder so that it does not apply an undistributed force to the transponder. Preferably, the undermold material is injected through a gate 647, mounted on one of the two mold plates 641 and 642. The gate 647 can be conventional, but is configured such that the liquid plastic material being introduced into the mold 640 is directed substantially against a corner of the transponder 202 as shown in FIG. 66B. A right angle plate 650, which extends the thickness of the transponder at the corner thereof, protects the transponder while the undermold material is being injected into the mold. The right angle plate 650 also forms a void at the corner which subsequently will be filled with overmold material during the overmold process. Consequently, the material is split into two flow portions as indicated by the arrows 648 and 649. The material is not directed to the upper and lower planar surfaces of the transponder, but rather flows along the sides of the transponder. In addition, the material flow is laminar rather than turbulent, further reducing the likelihood of impact forces being directed onto the planar surfaces of the transponder. The gate 647 forces the liquid plastic, which will eventually harden to form the undermold, to move in a substantially circular pattern around the transponder. Causing the liquid plastic material to encircle the transponder as the material is being injected into the mold, results in substantially even hydrostatic pressures which prevents the application of direct impact forces on the weak axes of the transponder which could result in breakage of the transponder.

Second Stage Processing-Key Assembly 200

Figure 66E:
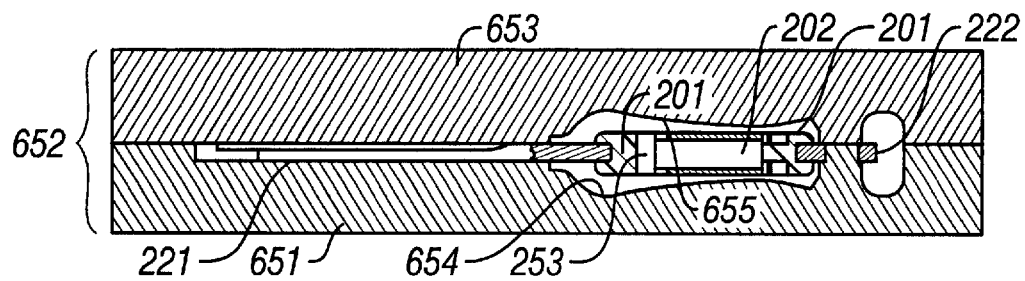

Referring to FIG. 66E, after the first material has been injected into the mold and allowed to cool, the heel end of the key, and the undermold and the transponder which now are integrally coupled to the heel end of the key, are removed as a unit from the first mold 640 and positioned in a mold plate 651 of a second mold 652 which together with a second mold plate 653 define mold cavities 654 and 655 of the second mold 652 which forms the overmold material to the shape of the key head as shown in FIG. 56F and 56G, for example. After the second mold plate 653 of the mold 652 is closed on the first mold plate 651, a second plastic material, in liquid form is injected into the mold cavities 654 and 655 of the mold 652 to produce the overmold as an outer shell over the transponder 202, the heel end 222 of the key 221, and the first plastic material that forms the undermold 201. The undermold material 201 also forms a base for molding the overmold material 199 and as such, aids in securing the overmold material 199 to the key 221. In addition, the overmold fills the voids 253, interconnecting the center portions of the overmold. In some embodiments, such as the embodiments illustrated in FIGS. 53 and 61A–61E, for example, the second plastic material is a material such as thermoplastic rubber or similar material, which is softer than the material that forms the undermold. However, in other embodiments, such as the embodiments illustrated in FIGS. 64D–64J, for example, the second plastic material can be of the same material that forms the undermold or a material other than thermoplastic rubber or similar material.

Mold Heat Transfer Characteristics

The mold plates 641 and 642 of the mold 640 that is used in producing the undermold 201, as well as the mold plates 651 and 653 of the mold 652 that is used in producing the overmold 199, comprise a relatively massive material with good heat transfer characteristics. The mold plates of the molds 640 and 652 minimize thermal excursion by allowing the molds to function as heat sinks, absorbing auxiliary heat and thermal energy so that the effects of the heat on the transponder and on both the undermold and overmold are substantially reduced.

The mold tooling absorbs a relatively large portion of heat which would otherwise cause excessive thermal excursion when liquid plastic material at a temperature sufficiently high as to liquefy the material, is injected into the mold in the regions surrounding the transponder and associated metal portions of the key. Thus, temperature changes, which occur while the liquid plastic is being injected into the mold and as the liquid plastic subsequently hardens during both the undermolding process and the overmolding process, could effectively deteriorate or damage the transponder, without the heat sink characteristic of the molds. In addition, the multiple stage process decreases the amount of material being introduced in each stage of the process, thereby lessening the heat impacting the transponder in each process stage and in the overall process.

Process for Key Assembly 400

Referring to FIGS. 67A–67E, the process for producing the key assembly 400 (FIG. 61A) of the present invention is similar to that described above. The key 231 is positioned in one of the mold plates 661 of a mold 660. The transponder 210 positioned in the mold plate 661 is located in the cut out portion 233 of the heel end of the key. The mold plate 661 includes a mold surface 664 which defines the configuration of the undermold. The mold plate 661 includes a plurality of locators 665 which hold the transponder 210 in position in the mold 660 to prevent the transponder from moving in the mold during the injection of the first plastic material into the mold. The locators 665 can be provided as inserts in the mold 660. After the transponder is placed in the cut out portion 233 in the heel end of the key, a second mold plate 662 of the mold 660 is closed on the first mold plate 661 to encompass the heel end of the key and the transponder. The second mold plate 662 includes a mold surface 667 that defines the configuration for the balance of the undermold.

In the next step of the process, a first plastic material is injected into the first mold 660 to form the undermold or carrier that surrounds a portion of the transponder and the heel end of the key with the first plastic material and which integrally couples the transponder to the heel end of the key. In addition, the locators 665 form the voids 640 in the undermold material.

Preferably, the undermold material is injected through a gate 647 in the manner described above with reference to FIG. 66B. The gate 647 is conventional and is configured such that the liquid plastic material being introduced into the mold is directed against a corner of the transponder 210, having disposed thereat a plate 650 (FIG. 66B) to cause the undermold material to be split into two flow portions. The undermold material is not directed to the upper and lower planar surfaces of the transponder 210, but rather flows along the edges of the transponder. In addition, the material flow is laminar rather than turbulent, further reducing the likelihood of impact forces being directed onto the planar surfaces of the transponder.

Figure 67A:
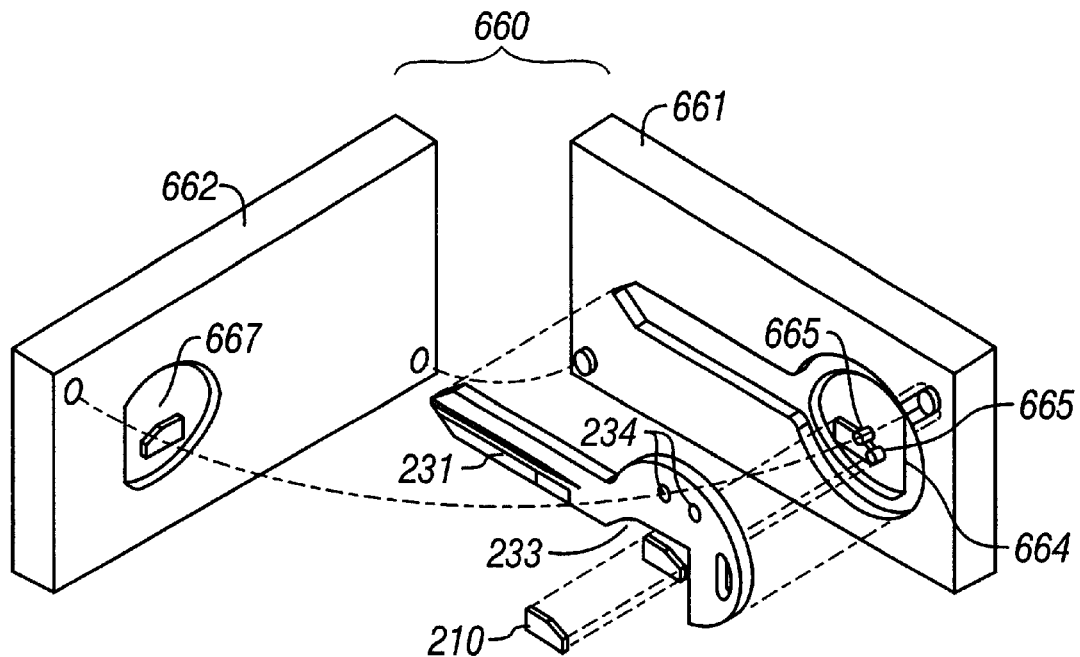
FIGS. 67A–67E illustrate molds for use in producing the key assembly of FIGS. 65A–65E.
Figure 67B:
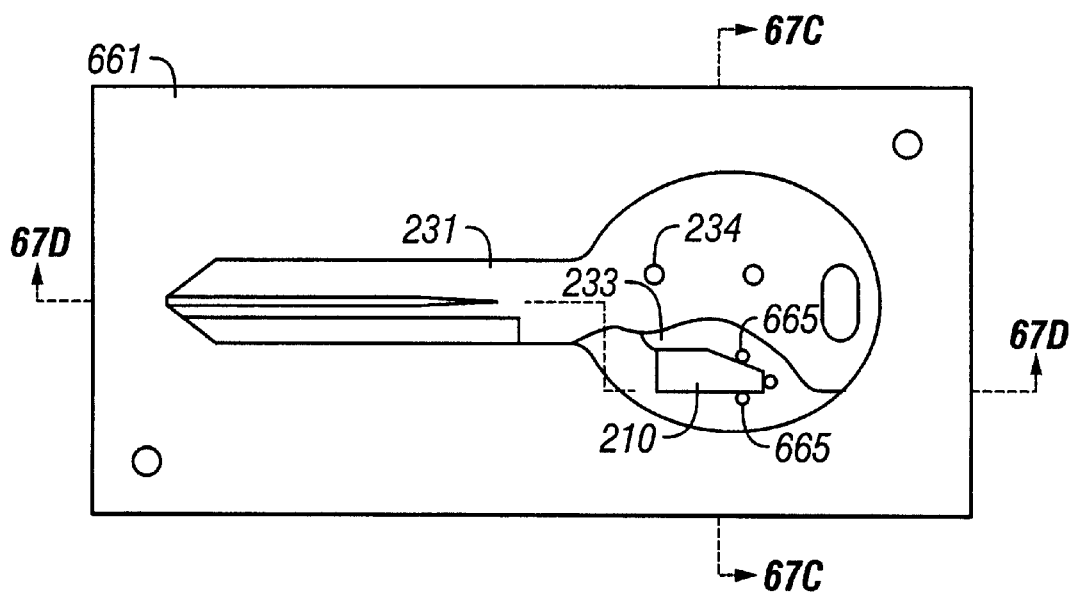
Figure 67C:
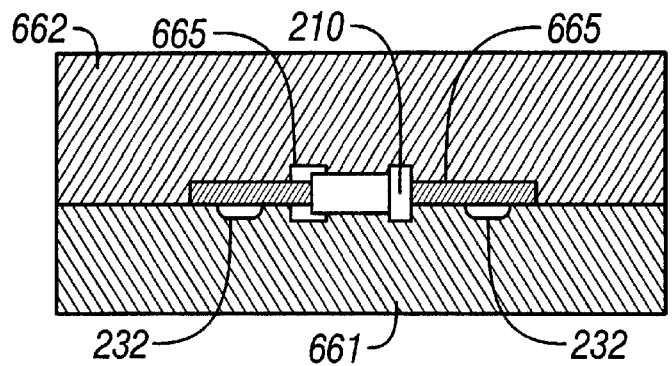
Figure 67D:
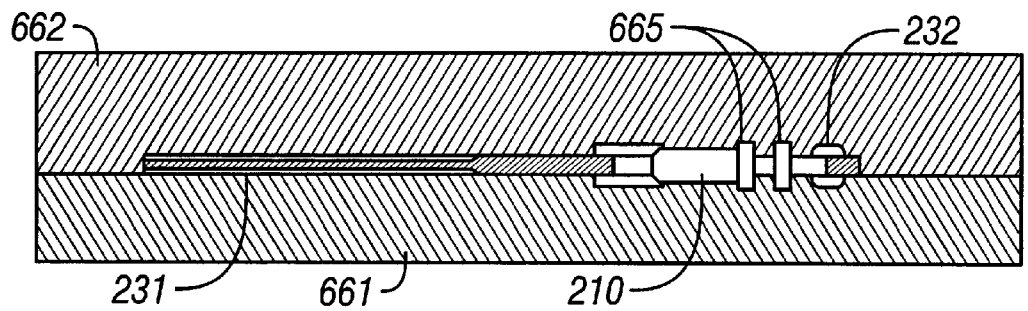
Figure 67E:
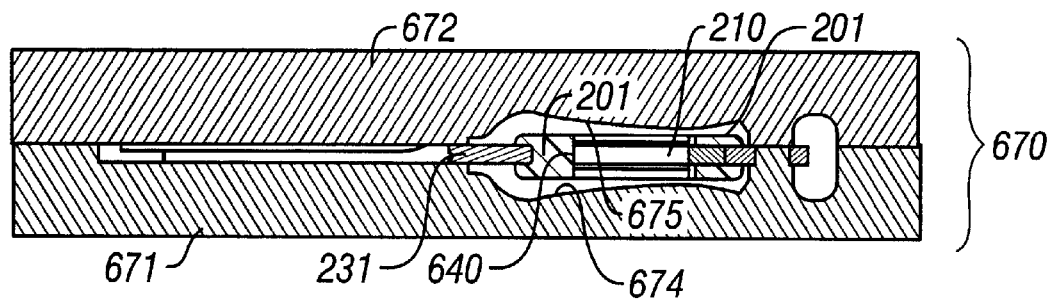

Referring to FIG. 67E, then after a sufficient cooling time, the assembly of the heel end of the key, with the transponder integrally coupled to the heel end of the key by the undermold, is removed from the first mold 660 and positioned in a mold plate 671 of a second mold 670, which includes a second mold plate 672. The mold 670 has mold cavities 674 and 675 formed in respective mold plates 671 and 672 of the mold. After the mold plate 672 of the mold 670 is closed on the mold plate 671, a second plastic material is injected into the mold cavities of the mold 670 to mold the overmold 199. The overmolding process surrounds the transponder 210 with the overmold material. The holes 234 provided through the heel end of the key 231 are filled with a portion of the overmold material during the overmold process for interconnecting the centers of the overmold.

Key assemblies incorporating the undermold configurations shown in FIGS. 59C–59F can be produced in a manner similar to that described above with reference to the molding apparatus illustrated in FIGS. 66A–66E.

SUMMARY

In summary, the thermal component tending to cause a shift in the resonance of a transponder used in a key assembly for an RFID system is substantially eliminated using the combined undermolding/overmolding process. Thermal expansion and contraction are preferable minimized by carefully designing the undermold and the overmold of the key assembly of the present invention so that the materials have an insignificant reaction to temperature changes and so that the design allows space for these state changes to occur without having to encroach on the space reserved for the transponder.

The softer plastic overmold material which is used to construct the key head tends to abate thermal problems because the overmold material is less inclined to exert pressure and contort the transponder to the degree that harder material does. However, the softer overmold material is more prone to mechanical deformation by shear and torsional forces.

Moreover, the combined undermold/overmold structure along with the frame structure and mounting structure provided by the invention, alleviate the mechanical component tending to cause a shift resonance of transponders of key assemblies that are used in RFID systems.

While the benefits of the undermolding and overmolding process and method of manufacturing the key assembly of the present invention have been described herein above, the details and benefits of the design of the key assembly itself also have preferable characteristics. The key is assembled so that the potential for resonant frequency shift due to a change in inductance of the coil and capacitance of the capacitor of the transponder's resonant circuit is decreased. Resonant frequency shift can result from severe temperature changes, a damaged transponder, or proximity to metal or other conductive components located too near the coil of the transponder of the present invention.

While particular embodiments of the invention have been shown and described, it will be obvious to those skilled in the art that changes and modifications may be made without departing from the invention, its broader aspects and, therefore, the aim in the appended claims is to cover all such changes and modifications as fall within the true spirit and scope of the invention.

We claim:

1. The combination comprising:
   a substantially rigid vehicle key including a blade portion and a head portion;
   a transponder having first and second surfaces; and
   apparatus for mounting the transponder on the key, said apparatus comprising:
      a frame including a mounting portion of a first substantially rigid non-metallic material, and a support structure of said first material for supporting the transponder, said support structure including a first series of individual tabs contacting said first surface of the transponder only near corners of the transponder and a second series of individual tabs contacting said second surface of the transponder only near corners of the transponder; and
      an overmold of a second material for containing said frame, the transponder and the head portion of said key.

2. The combination as defined in claim 1, wherein said frame is constructed and arranged to enable said second material to contact said transponder for retaining said transponder on said key.

3. The combination as defined in claim 1, wherein said second material is softer than said first material.

4. The combination as defined in claim 1, wherein said mounting portion is spaced from the transponder on a plurality of sides of the transponder, defining voids between the transponder and the mounting portion, said voids extending substantially the length of the sides of the transponder, and wherein said second material fills said voids.

5. A vehicle key assembly comprising:
   a substantially rigid key having a blade portion and a head portion;
   a transponder; and
   a molded structure including a frame of a non-metallic material for mounting the transponder on said head portion of said key, said frame including a support structure supporting the transponder at sides of the transponder while allowing a majority of opposing planar surfaces of the transponder to be located adjacent mold surfaces during molding of the frame and support structure to reduce thermal shock due to contact with liquid molding material for said frame, said planar surfaces having a length and a width, said support structure including a plurality of finger-like projections overlying said planar surfaces of the transponder, each of said projections contacting one of said planar surfaces of the transponder over only a portion of the length and width of the planar surface, providing substantially point contact with the transponder; and
   an overmolded structure including overmolding material at least partially enclosing said frame and the transponder.

6. The vehicle key assembly as defined in claim 5, wherein said overmolded structure substantially encloses said frame, the transponder and said head portion of the key, and wherein said frame is configured to enable said overmolding material to contact and retain the transponder.

7. The vehicle key assembly as defined in claim 5, wherein said overmolding material is softer than said frame material.

8. The vehicle key assembly as defined in claim 5, wherein said support structure contacts the transponder with support portions thinner than a height of a side of the transponder.

9. The vehicle key assembly as defined in claim 8, wherein at least one of said support portions helps contain the transponder on one side of said one support portion and contacts said overmolding material on another side of said one support portion.

10. The combination comprising:
    a substantially rigid vehicle key including a blade portion and a head portion;
    a transponder including an electrical circuit; and
    apparatus for mounting the transponder on the key and decreasing resonant frequency shifting of the electrical circuit of the transponder when mounted on the substantially rigid vehicle key, said apparatus comprising:
       a frame including a mounting portion of a first substantially rigid non-metallic material coupled to the key and spaced apart from the transponder on a plurality of sides of the transponder, and a support structure of said first material interposed between said mounting portion and the transponder in contact with the transponder, the frame supporting the transponder while lessening forces produced on the transponder by thermal expansion and contraction of the head portion of the key, thereby decreasing resonant frequency shifting of said electrical circuit, said support structure including at least a first series of thin individual support tabs and a second series of thin individual support tabs contacting the transponder on first and second surfaces, respectively, only at corners of the transponder and the thickness of said thin support tabs being less than the thickness of the transponder; and an overmold of a second material for containing said frame, the transponder and the head portion of said key.

11. The combination as defined in claim 10, wherein at least a second one of said thin support tabs is contacted by said second material.

12. A vehicle key assembly comprising:

a substantially rigid key having a blade portion and a head portion, a transponder including a coil at one end thereof, the transponder having a first generally planar surface and a second generally planar surface extending parallel to said first planar surface;

a molded structure including a non-metallic frame mounting the transponder on said head portion of said key in a transponder mounting region that is at least partially defined by a metal portion of the key head that at least partially encircles the transponder and which absorbs torsional and bending forces applied to the vehicle key in use;

said frame including a support structure supporting the transponder at sides of the transponder and with said coil at said one end of the transponder spaced from a metal portion of the key by a portion of said support structure, said portion of said support structure including a void which extends at least between said first and second planar surfaces at said one end of the transponder substantially the length of said one end of the transponder; and an overmolded structure enclosing said frame and the transponder with a portion of said overmolded structure filling said void.

13. A vehicle key assembly comprising:

a substantially rigid key including an integral blade portion and head portion;

a transponder, the transponder being generally rectangular in shape and having a first generally planar surface and a second generally planar surface extending parallel to said first planar surface; and an undermold structure of a first material supporting said transponder on said key, said undermold structure defining a plurality of individual tabs contacting the transponder, including a first series of tabs located only at corners of the first planar surface and a second series of tabs located only at corners of the second planar surface; and an overmold structure of a second material, said overmold structure substantially enclosing said undermold structure, said transponder and said head portion.

14. The vehicle key assembly as defined in claim 13, wherein the undermold structure defines a plurality of pairs of matched tabs, first and second tabs of each matched pair of tabs extending along said first and second planar surfaces, respectively, of the transponder, with the tab pairs being located along the sides of the transponder near diametrically opposed corners thereof.

15. The vehicle key assembly as defined in claim 14, wherein the plurality of pairs of matched tabs comprise four pair of matched tabs, each tab pair being located at a different corner of the transponder.

16. The assembly as defined in claim 13, wherein the transponder is offset relative to the axis of the blade of the key.

17. The vehicle key assembly as defined in claim 13, wherein the second material is softer than the first material, and wherein the material of the overmold structure comprises the majority of material that contacts the transponder.

18. The assembly as defined in claim 13, wherein the undermold structure includes a compressible material.

* * * * *